US012763094B2

(12) United States Patent
Biswas et al.

(10) Patent No.: US 12,763,094 B2
(45) Date of Patent: Oct. 13, 2026

(54) ROBUST INTRUSIVE PERCEPTUAL AUDIO QUALITY ASSESSMENT BASED ON CONVOLUTIONAL NEURAL NETWORKS

(71) Applicant: DOLBY INTERNATIONAL AB, Dublin (IE)

(72) Inventors: Arijit Biswas, Schwaig bei Nuernberg (DE); Guanxin Jiang, Erlangen (DE)

(73) Assignee: DOLBY INTERNATIONAL AB, Dublin (IE)

( * ) Notice: Subject to any disclaimer, the term of this patent is extended or adjusted under 35 U.S.C. 154(b) by 332 days.

(21) Appl. No.: 18/254,244

(22) PCT Filed: Nov. 30, 2021

(86) PCT No.: PCT/EP2021/083531
§ 371 (c)(1),
(2) Date: May 24, 2023

(87) PCT Pub. No.: WO2022/112594
PCT Pub. Date: Jun. 2, 2022

(65) Prior Publication Data

US 2025/0140281 A1 May 1, 2025

Related U.S. Application Data

(60) Provisional application No. 63/119,318, filed on Nov. 30, 2020.

(51) Int. Cl.
*G10L 25/60* (2013.01)
*G06N 3/044* (2023.01)
(Continued)

(52) U.S. Cl.
CPC .............. *G10L 25/60* (2013.01); *G06N 3/044* (2023.01); *G06N 3/0499* (2023.01); *G10L 25/30* (2013.01)

(58) Field of Classification Search
CPC ......... G10L 25/60; G10L 25/30; G06N 3/044; G06N 3/0499; G06N 3/045; G06N 3/08
See application file for complete search history.

(56) References Cited

U.S. PATENT DOCUMENTS 9,640,194 B1 * 5/2017 Nemala ............... G10L 21/0232
10,224,058 B2 * 3/2019 Variani ................. G10L 19/008
(Continued)

FOREIGN PATENT DOCUMENTS

CN 109993280 B 5/2021
EP 3671739 A1 6/2020
(Continued)

OTHER PUBLICATIONS

Arias-Londono, J. D., et al., Multimodal and Multi-Output Deep Learning Architectures for the Automatic Assessment of Voice Quality Using the GRB Scale, IEEE Journal of Selected Topics in Signal Processing, 413-422 pp, vol. 14, No. 2, U.S.
(Continued)

*Primary Examiner* — Michael N Opsasnick

(57) ABSTRACT

Described herein is a computer-implemented deep-learning-based system for determining an indication of an audio quality of an input audio frame. The system comprises at least one inception block configured to receive at least one representation of an input audio frame and to map the at least one representation of the input audio frame into a feature map; and at least one fully connected layer configured to receive a feature map corresponding to the at least one representation of the input audio frame from the at least one inception block, wherein the at least one fully connected layer is configured to determine the indication of the audio quality of the input audio frame. Described are further respective methods of operating and training said system.

20 Claims, 51 Drawing Sheets

(51) Int. Cl.
*G06N 3/0499* (2023.01)
*G10L 25/30* (2013.01)

(56) References Cited

U.S. PATENT DOCUMENTS

| | | | | |
|---|---|---|---|---|
| 10,777,188 | B2 * | 9/2020 | van Hout | G06F 40/242 |
| 2010/0189290 | A1 | 7/2010 | Choi | |
| 2013/0297299 | A1 * | 11/2013 | Chakrabartty | G10L 15/02 704/211 |
| 2015/0255062 | A1 * | 9/2015 | Penn | G10L 15/16 704/232 |
| 2016/0111107 | A1 | 4/2016 | Erdogan | |
| 2016/0307572 | A1 | 10/2016 | Avilés-Casco | |
| 2017/0140260 | A1 * | 5/2017 | Manning | G06F 16/683 |
| 2018/0040333 | A1 * | 2/2018 | Wung | G10L 21/0232 |
| 2018/0075343 | A1 * | 3/2018 | van den Oord | G10L 15/16 |
| 2019/0066713 | A1 * | 2/2019 | Mesgarani | G10L 25/30 |
| 2019/0172476 | A1 * | 6/2019 | Wung | G10L 21/0232 |
| 2019/0180771 | A1 | 6/2019 | Yin | |
| 2019/0355347 | A1 * | 11/2019 | Arik | G10L 13/02 |
| 2019/0392823 | A1 | 12/2019 | Li | |
| 2019/0394568 | A1 * | 12/2019 | Sen | G06N 3/045 |
| 2020/0057932 | A1 * | 2/2020 | Gao | G06N 3/0464 |
| 2020/0066296 | A1 | 2/2020 | Sargsyan | |
| 2020/0104701 | A1 | 4/2020 | Lee | |
| 2020/0152179 | A1 * | 5/2020 | van Hout | G06F 40/242 |
| 2020/0168208 | A1 | 5/2020 | Mitra | |
| 2020/0272409 | A1 | 8/2020 | Vaidya | |
| 2020/0286504 | A1 | 9/2020 | Seetharaman | |
| 2020/0395036 | A1 * | 12/2020 | Kameoka | G06F 18/2134 |
| 2023/0197043 | A1 * | 6/2023 | Martinez Ramirez | G10H 3/187 381/61 |

FOREIGN PATENT DOCUMENTS

| | | | |
|---|---|---|---|
| WO | 2011129655 | A2 | 10/2011 |
| WO | 2019213021 | A1 | 11/2019 |
| WO | 2019229190 | A1 | 12/2019 |
| WO | 2020/232180 | A1 | 11/2020 |

OTHER PUBLICATIONS

Fu, S., et al., SNR-Aware Convolutional Neural Network Modeling for Speech Enhancement, Interspeech Conference paper, Sep. 2016, San Francisco, California.

Gorman, T., et al., Voice Over LTE Quality Evaluation Using Convolutional Neural Networks, 2020 International Joint Conference on Neural Networks (IJCNN), IEEE, Jul. 19, 2020, pp. 1-7.

Hu, J., et al., Squeeze-And-Excitation Networks, 2018 IEEE/CVF Conference on Computer Vision and Pattern Recognition, Jun. 1, 2018, p. 1-11.

Huang, Y., et al., Identification of VoIP Speech With Multiple Domain Deep Features, IEEE Transactions on Information Forensics and Security, Dec. 17, 2019, vol. 15, p. 2253-2267.

Huang, Z., et al., Exploiting Vocal Tract Coordination Using Dilated CNNS for Depression Detection in Naturalistic Environments, 2020 IEEE International Conference on Acoustics, Speech and Signal Processing (ICASSP), May 4, 2020, p. 6549-6553.

Jiang, G., et al., InSE-NET: A Perceptually Coded Audio Quality Model Based on CNN, Audio Engineering Society (AES) Convention Paper 10514, Oct. 13, 2021.

Jiang, G., et al., InSE-NET: A Perceptually Coded Audio Quality Model based on CNN, Aug. 30, 2021. (https://www.researchgate.net/publication/354236952_InSENET_A_Perceptually_Coded_Audio_Quality_Model_based_on_CNN).

Liu, J., et al., A Novel Two-Layer Model for Overall Quality Assessment of Multichannel Audio, China Communications, pp. 42-51, vol. 14:9, Sep. 1, 2017.

Naranjo-Alcazar, J., et al., Acoustic Scene Classification With Squeeze-Excitation Residual Networks, IEEE, Jun. 16, 2020, vol. 8, pp. 112287-112296.

Schafer, M., et al., An Extension of the Peaq Measure By a Binaural Hearing Model, IEEE International Conference on Acoustics, Speech and Signal Processing, IEEE May 26, 2013, pp. 8164-8168.

Sloan, C., et al., Objective Assessment of Perceptual Audio Quality Using VISQOLAudio, IEEE Transactions of Broadcasting, vol. 63:4, Dec. 1, 2017, pp. 693-705, Piscataway, New Jersey.

Van Hout, J., et al., Tackling Unseen Acoustic Conditions in Query-By-Example Search Using Time and Frequency Convolution for Multilangual Deep Bottleneck Features, IEEE Automatic Speech Recognition and Understanding Workshop (ASRU), IEEE Dec. 16, 2017, p. 48-54, Menlo Park, California.

Xia, W., et al., Sound Event Detection in Multichannel Audio Using Convolutional Time-Frequency-Channel Squeeze and Excitation, Interspeech 2019.

* cited by examiner

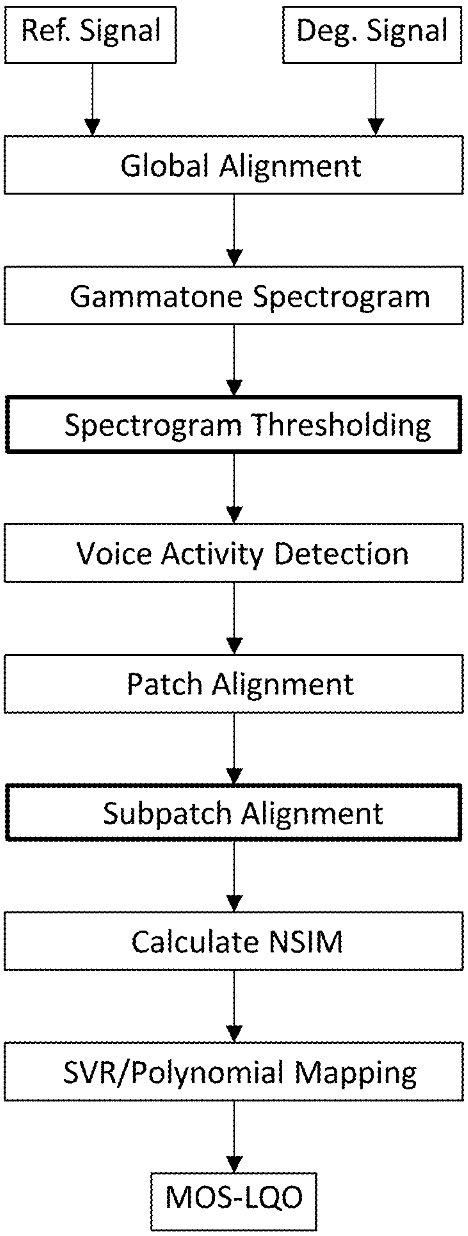
Fig. 1.1

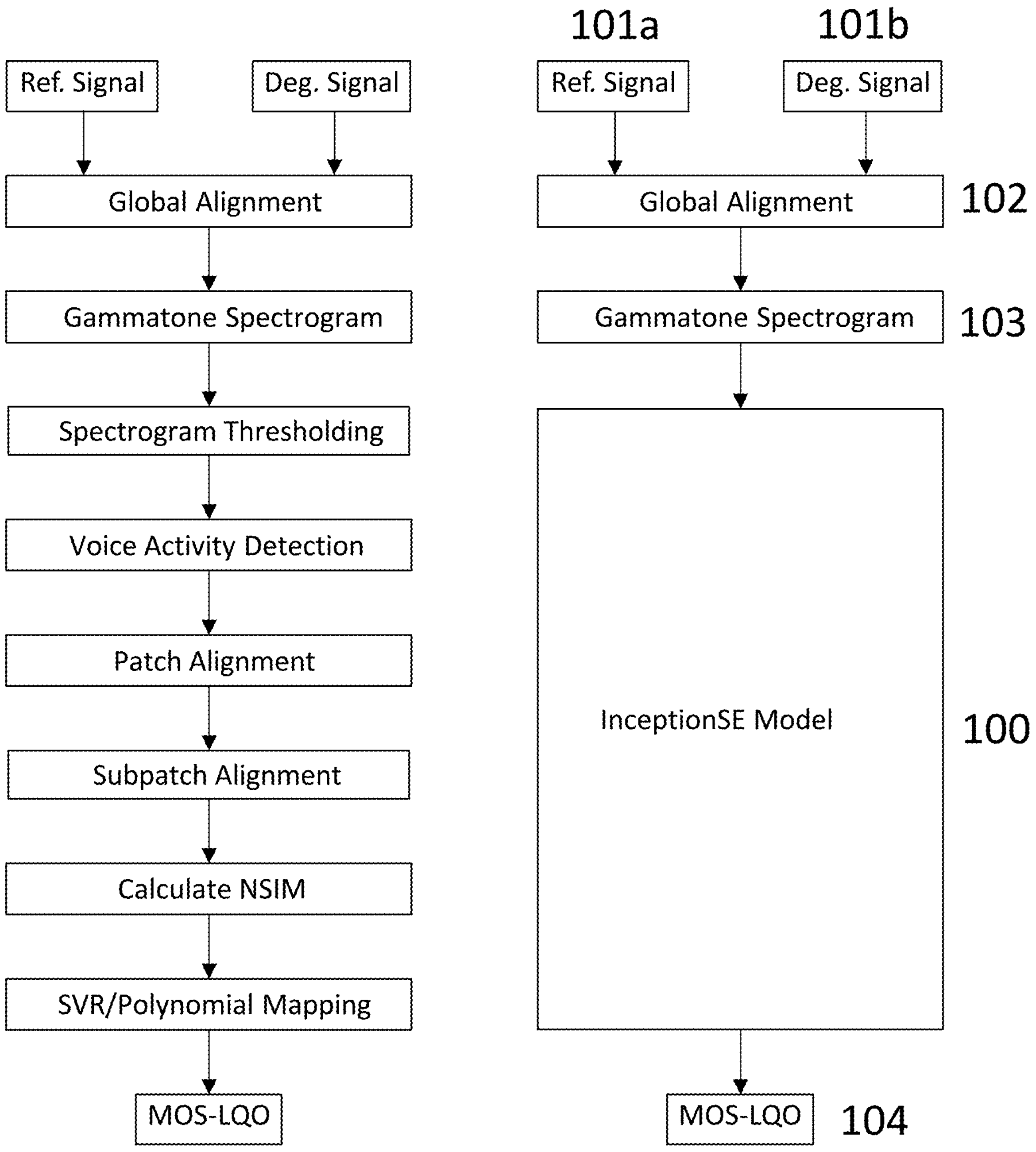
Fig. 1.2

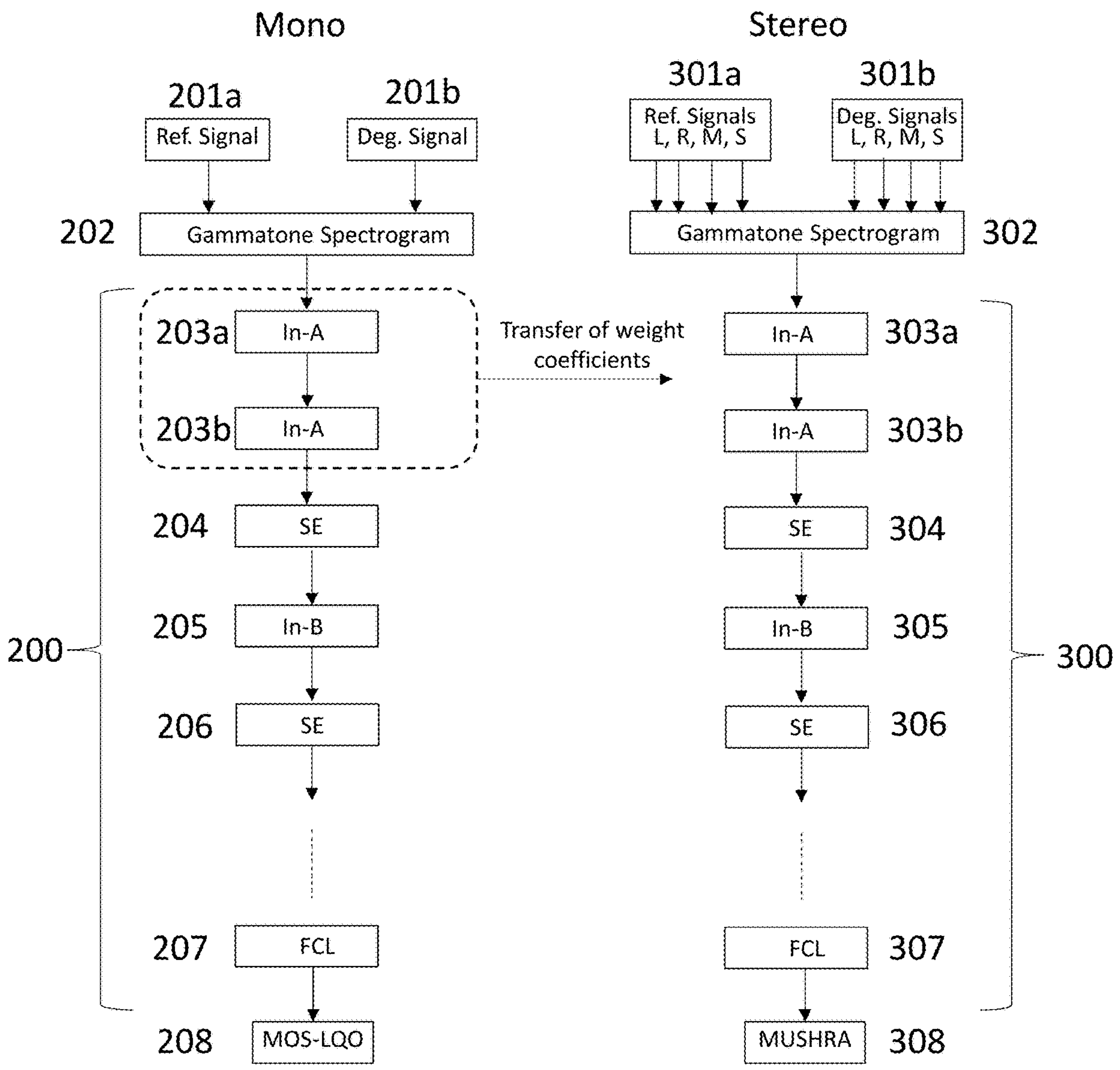
Fig. 1.3

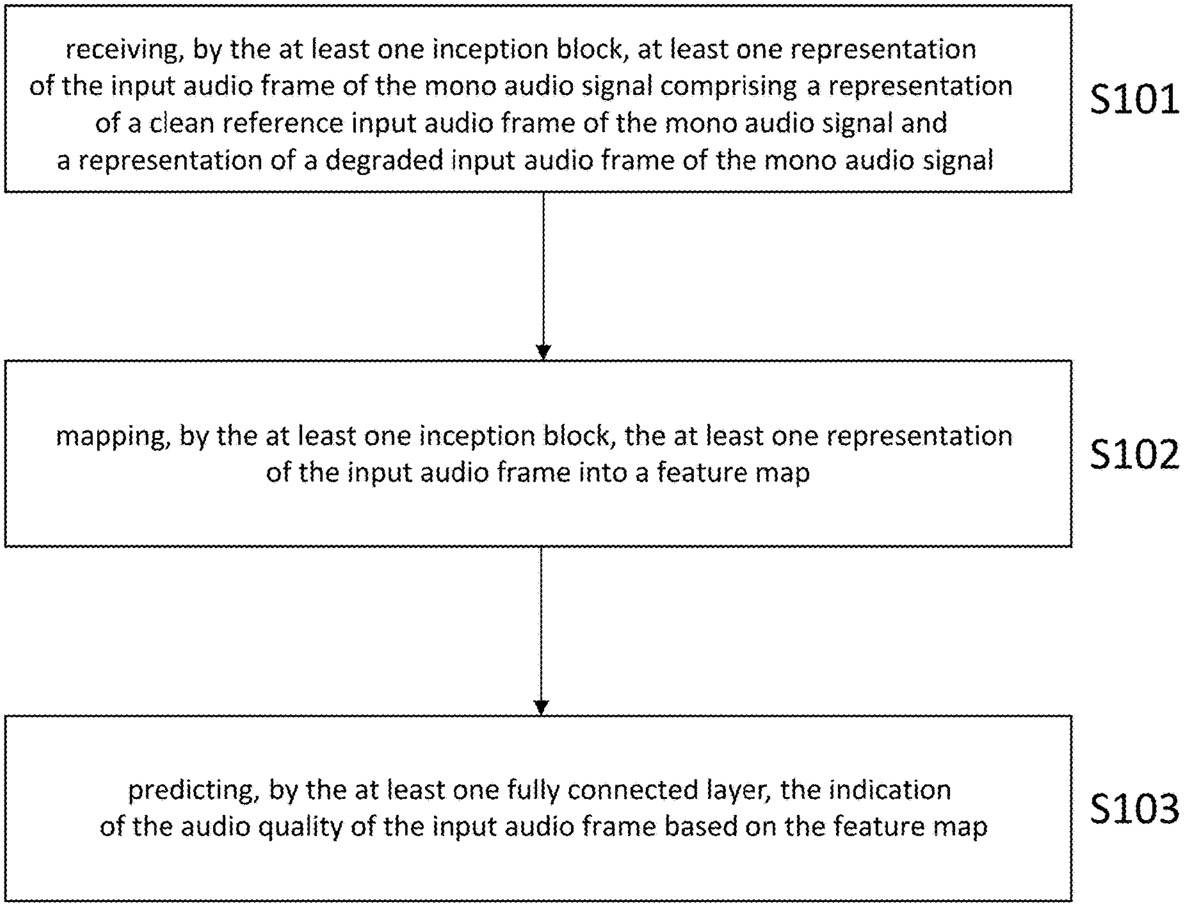
Fig. 1.4

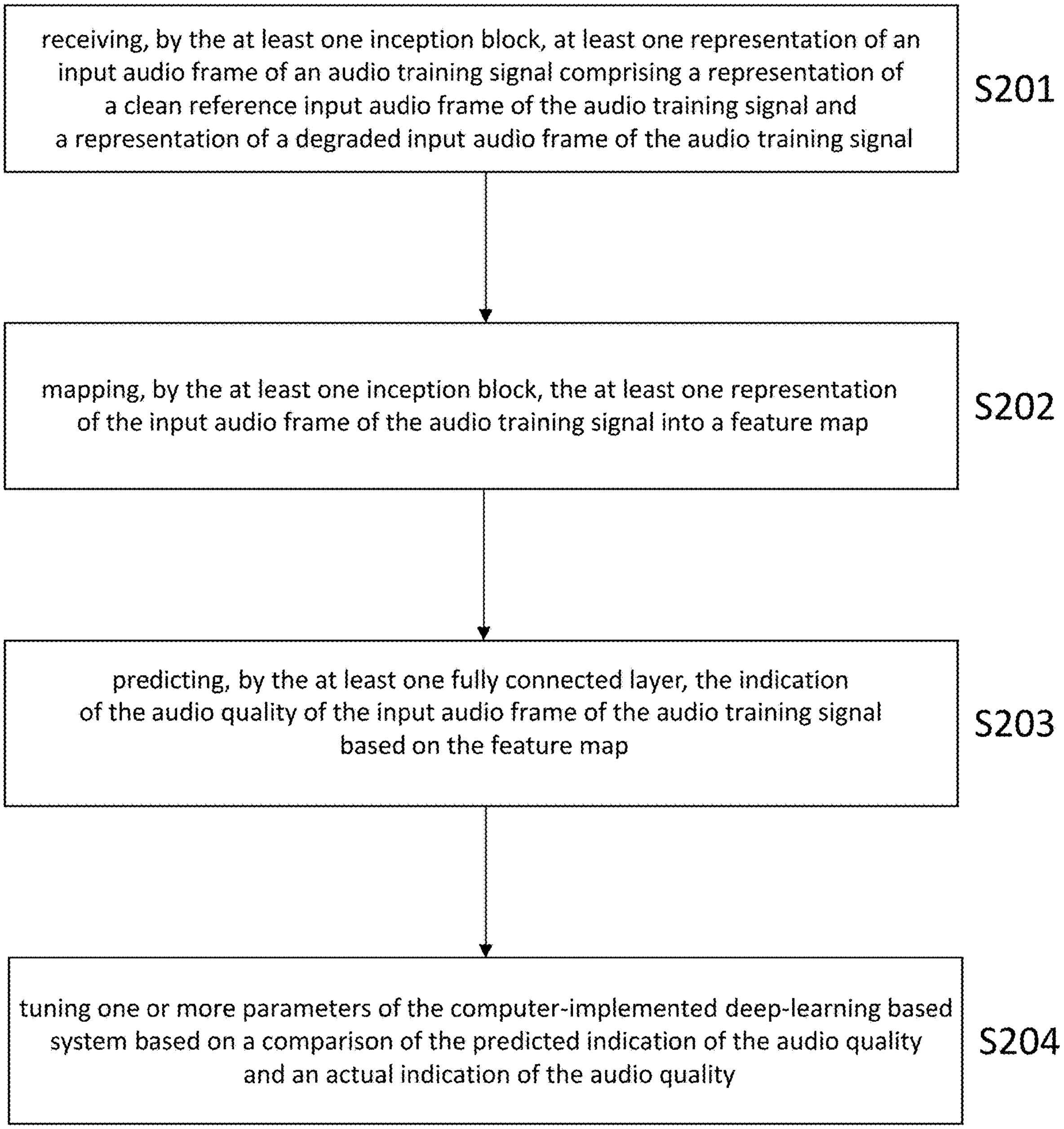
Fig. 1.5

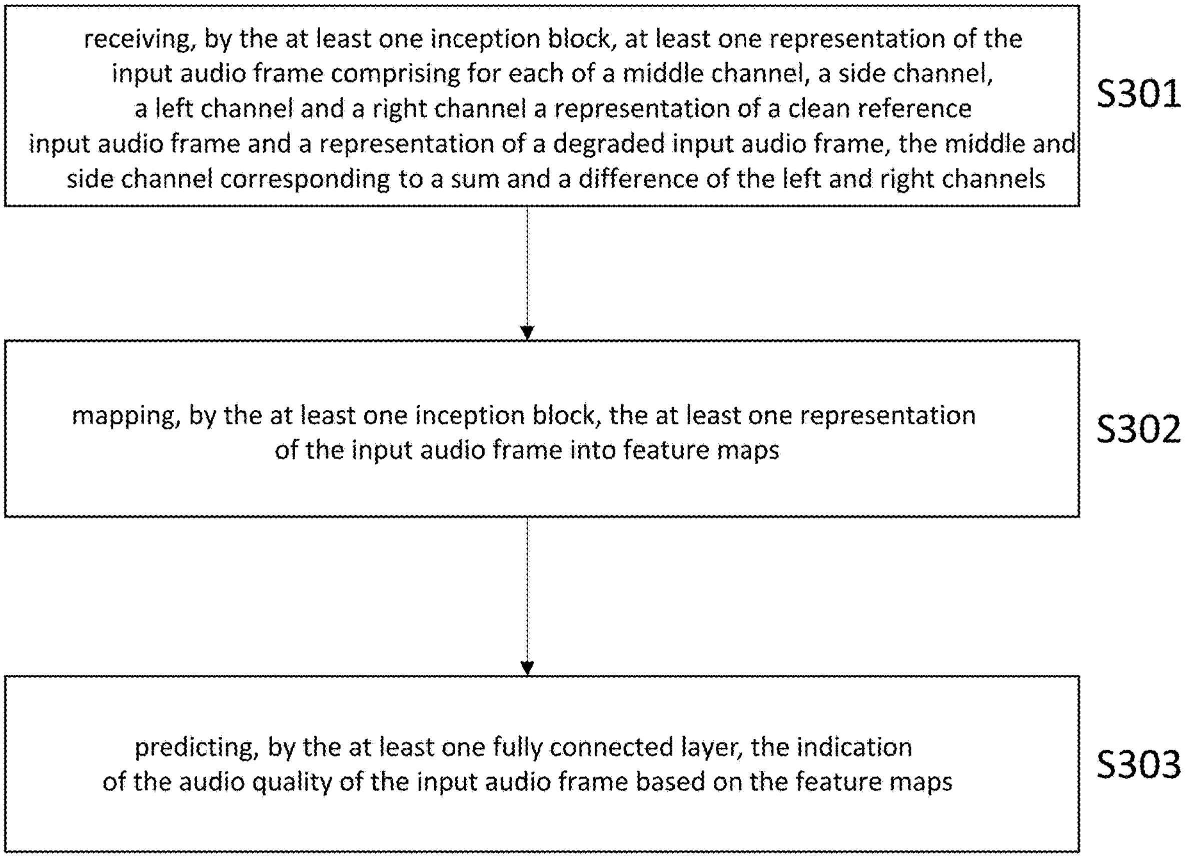
Fig. 1.6

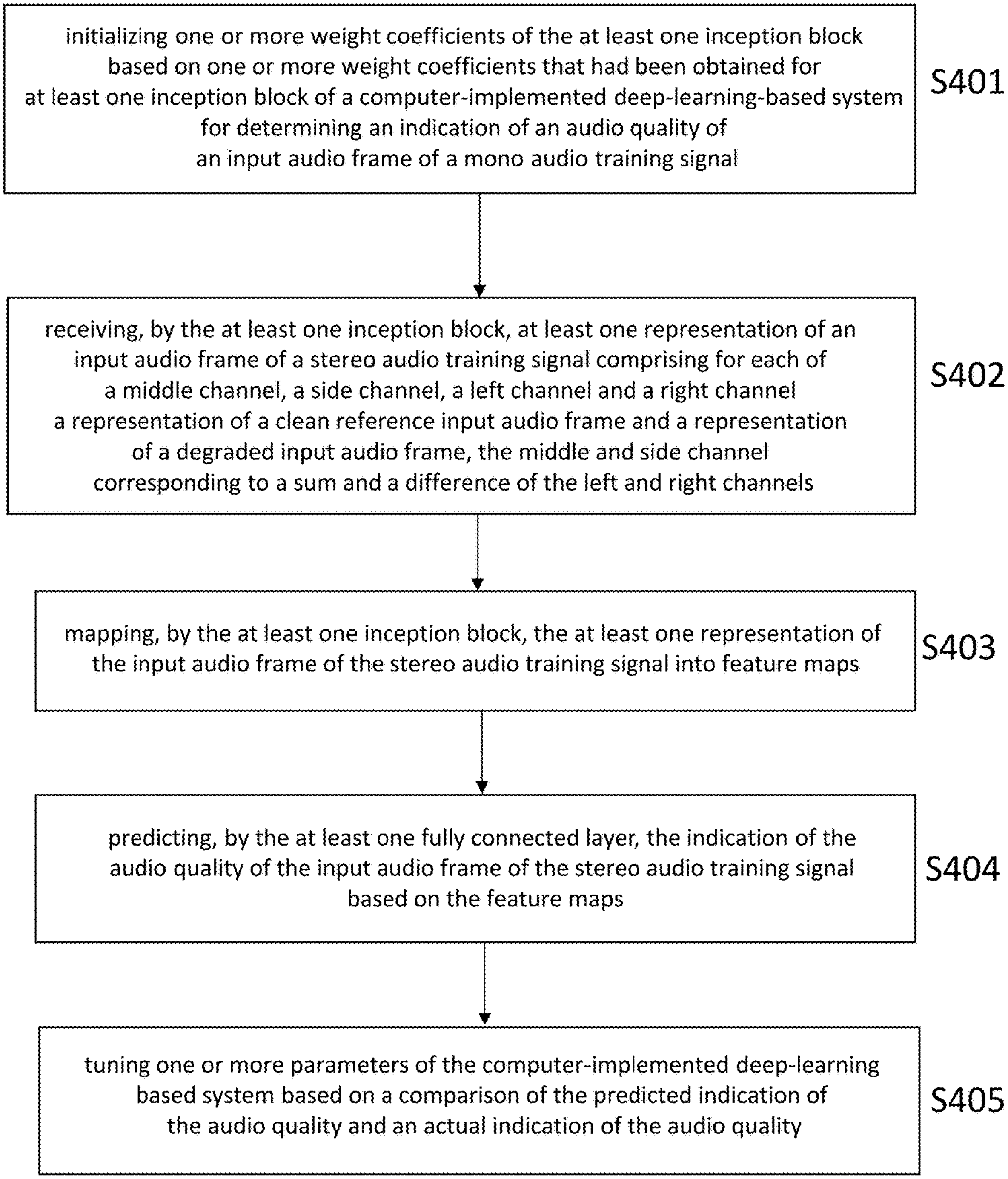
Fig. 1.7

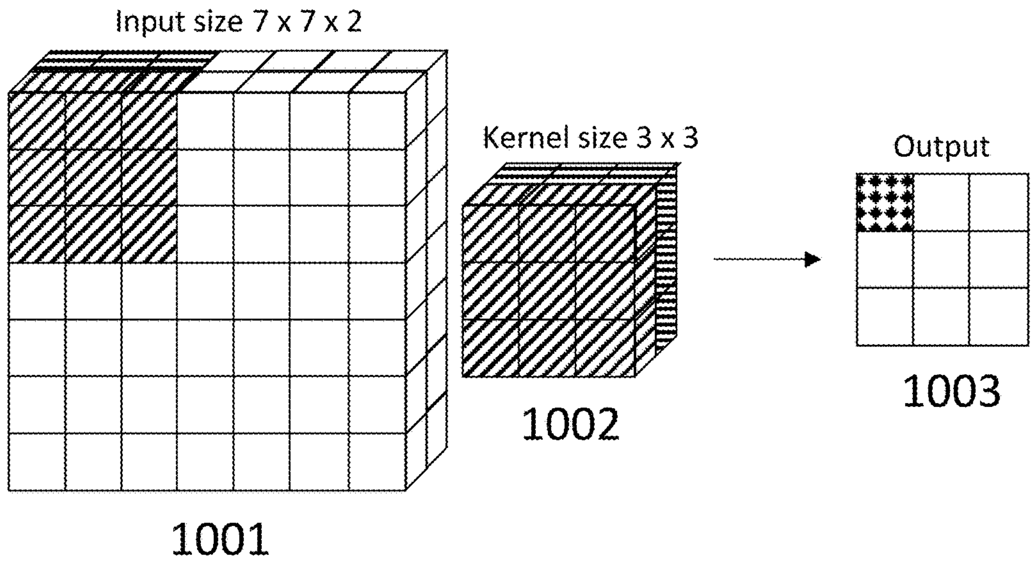
Fig. 2.1
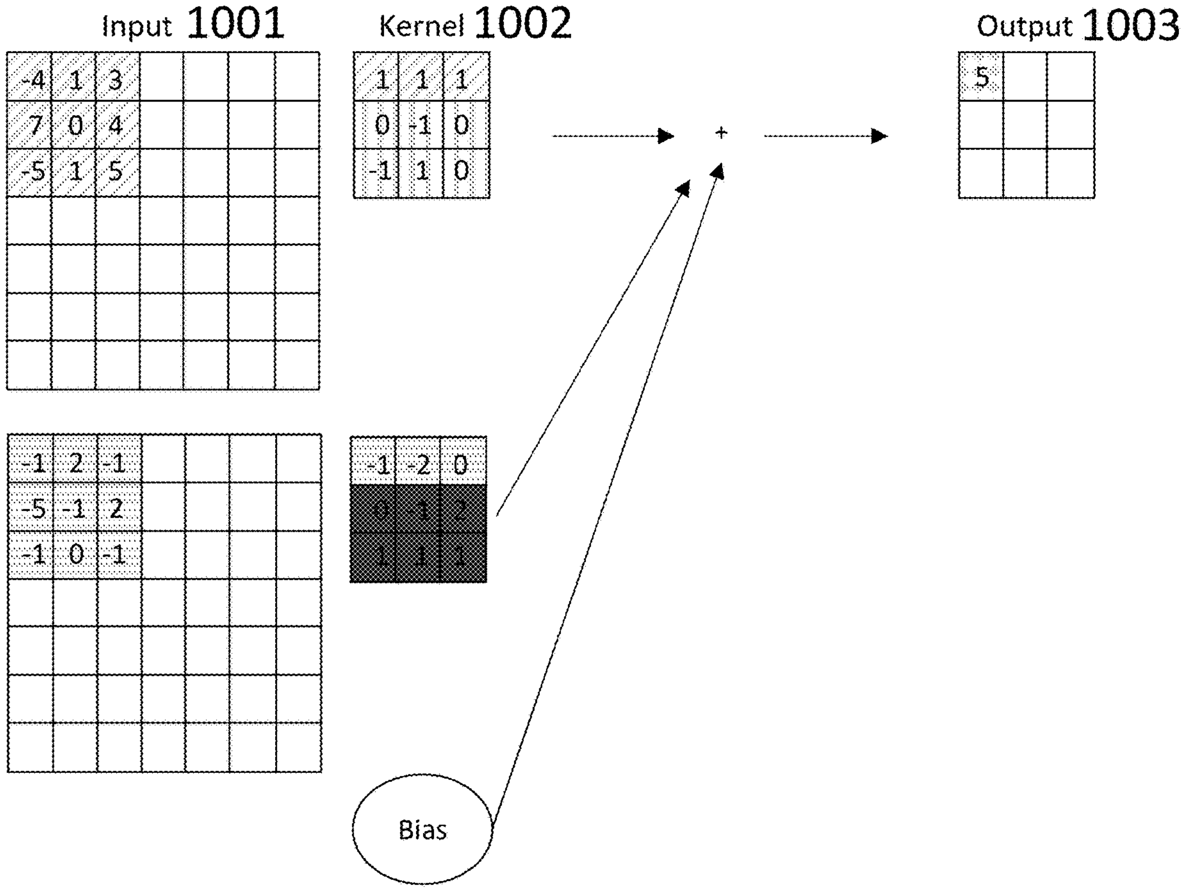
Fig. 2.2

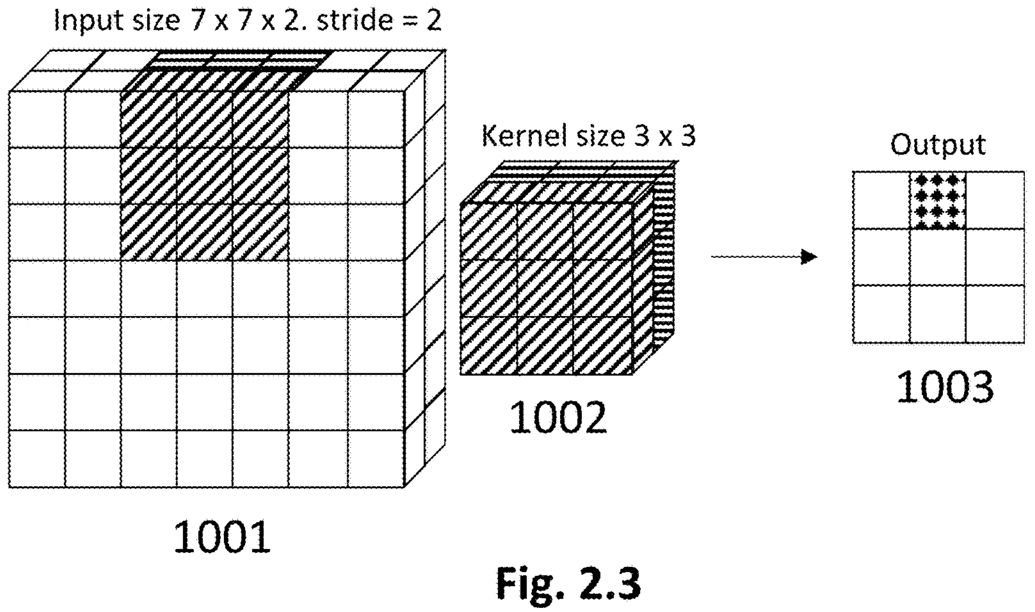
Fig. 2.3
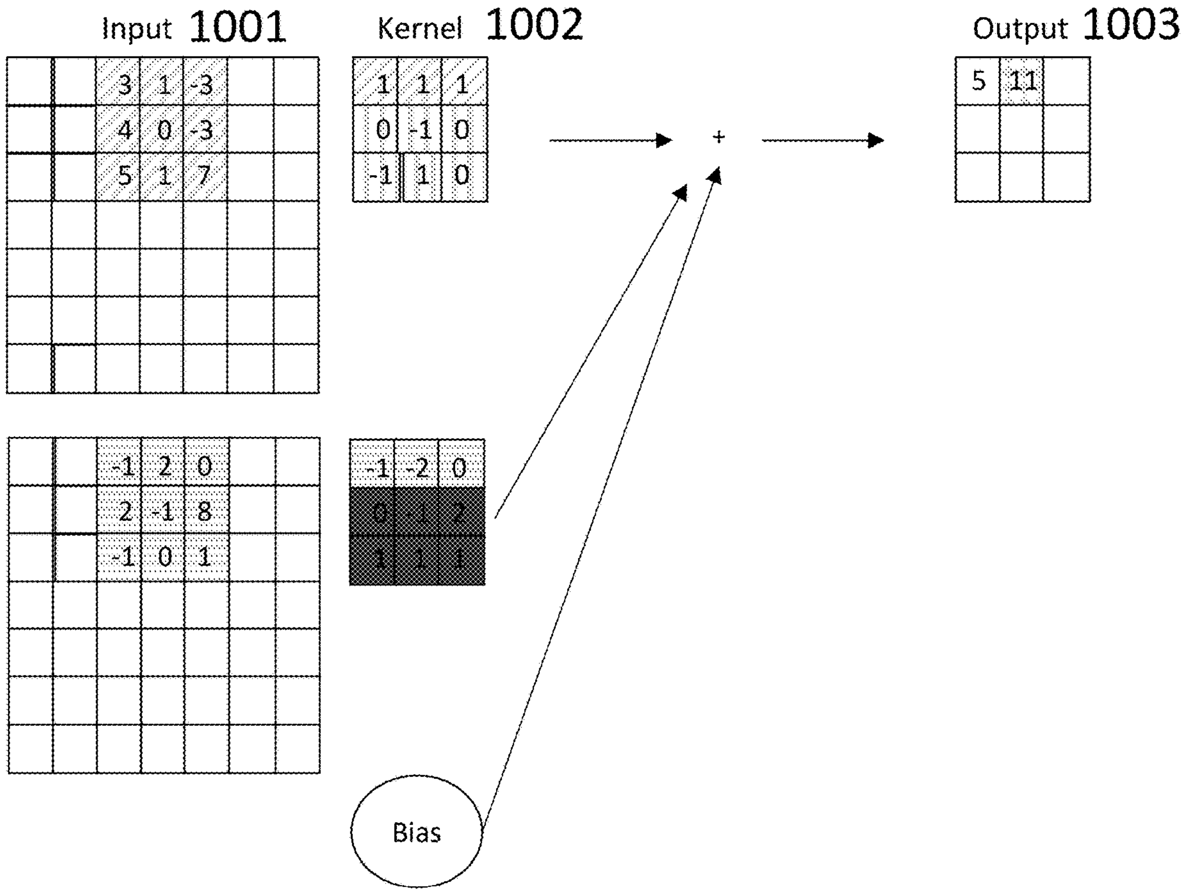
Fig. 2.4

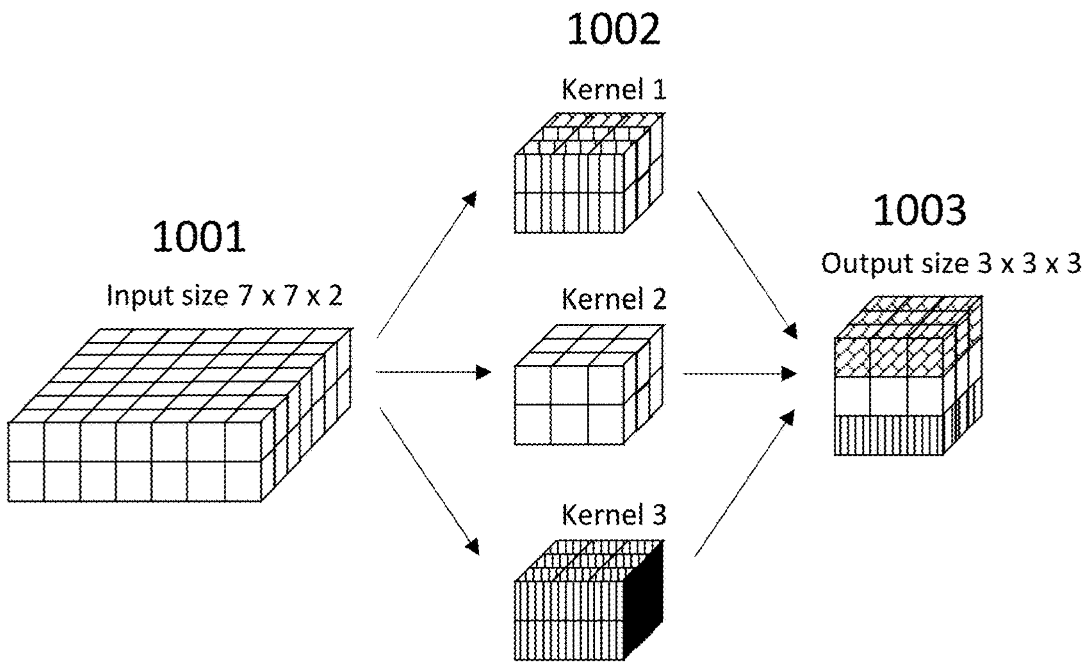
Fig. 2.5
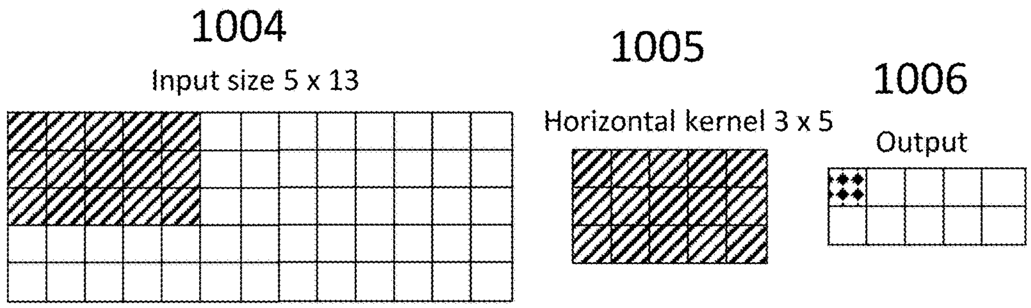
Fig. 2.6
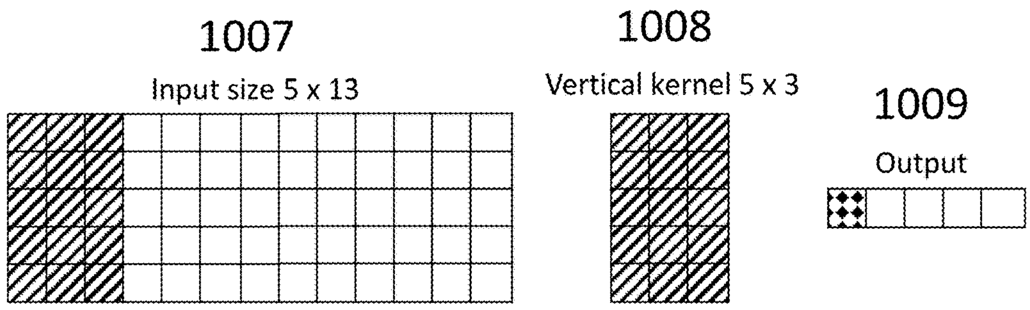
Fig. 2.7

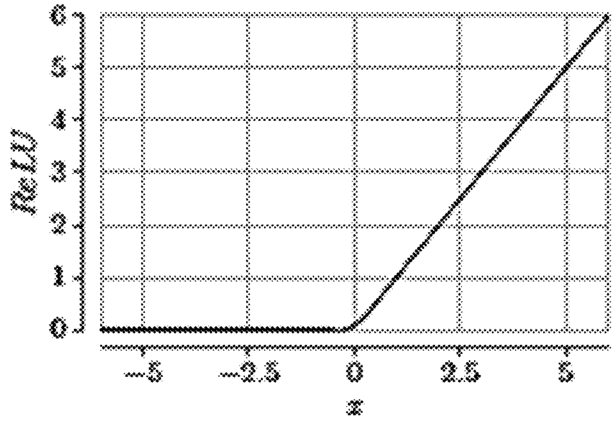
Fig. 2.8
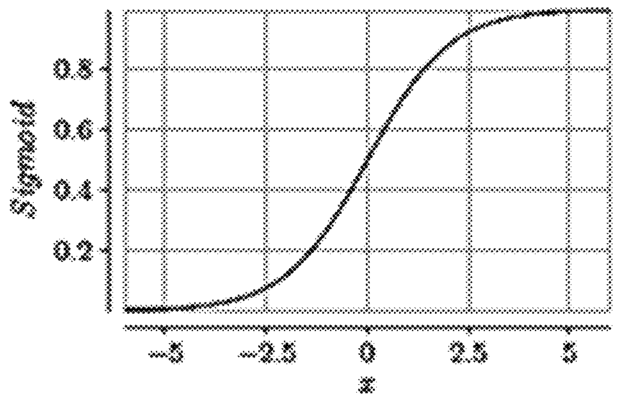
Fig. 2.9
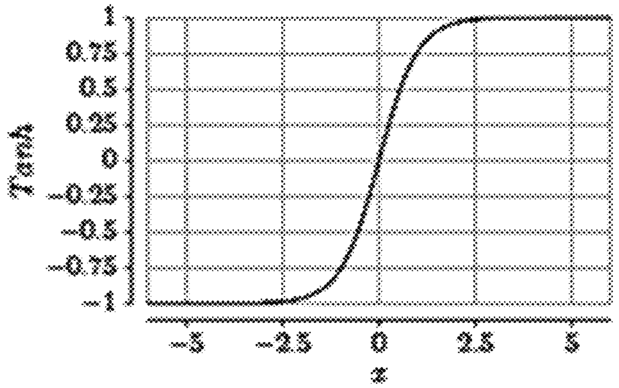
Fig. 2.10

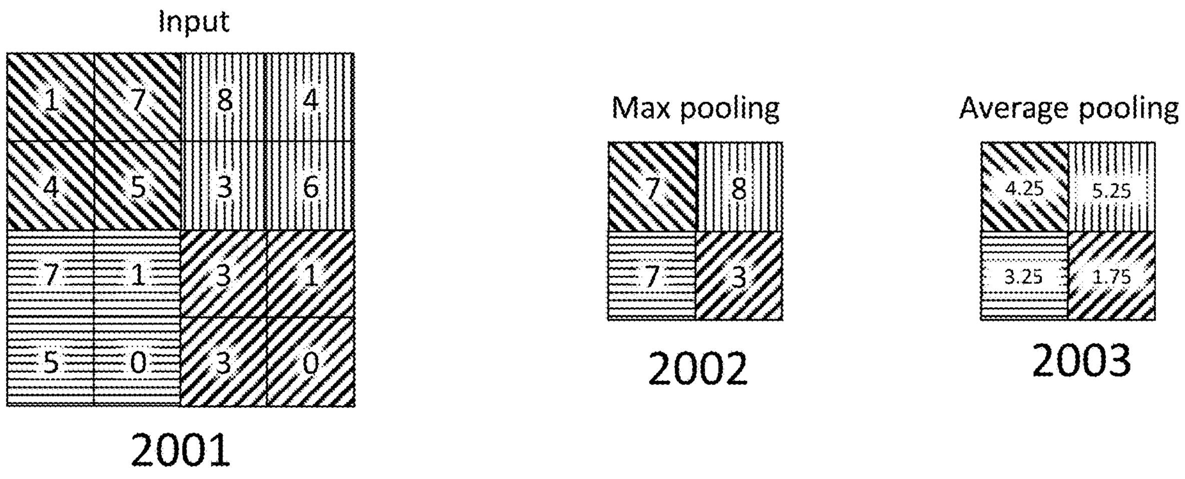
Fig. 2.11
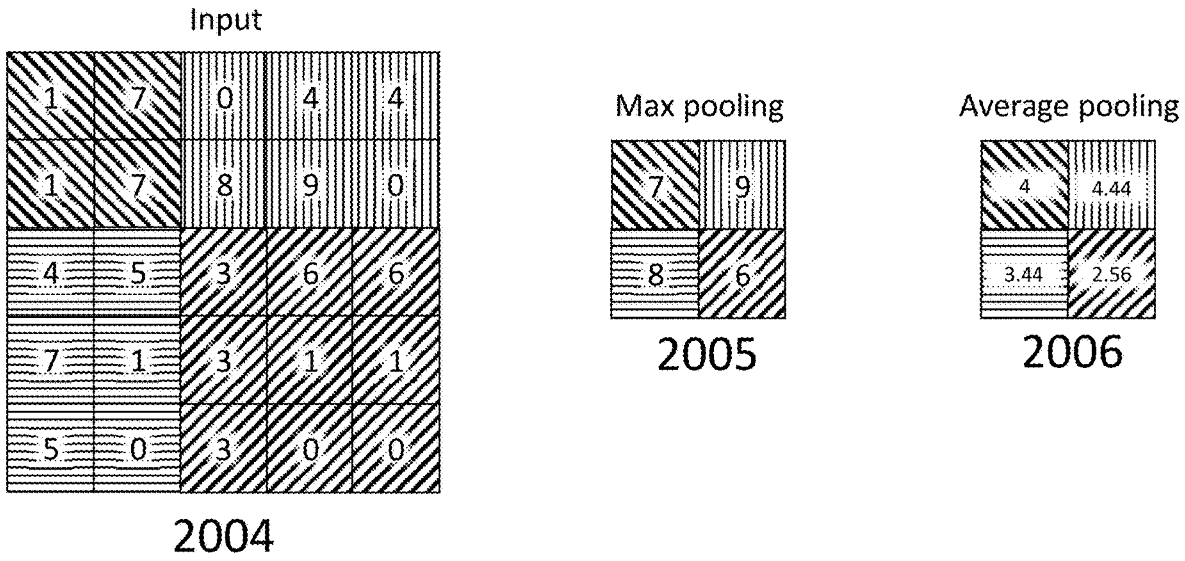
Fig. 2.12

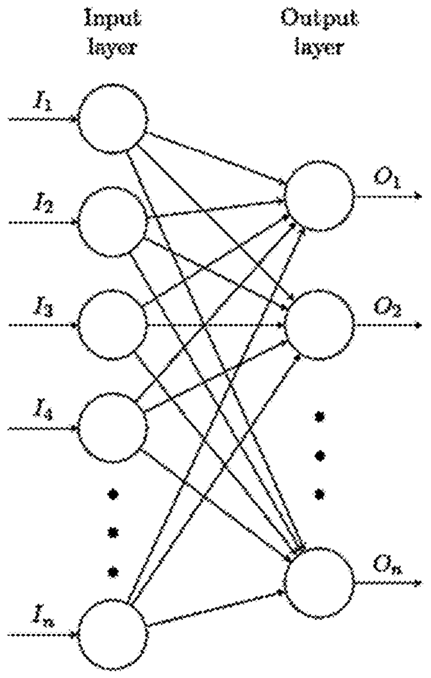
Fig. 2.13
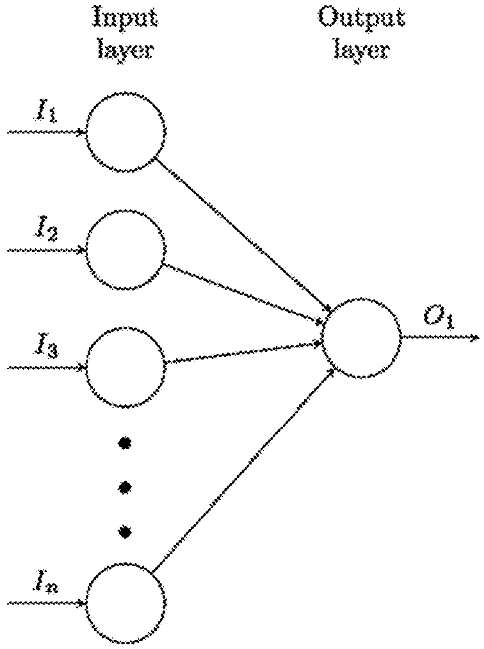
Fig. 2.14
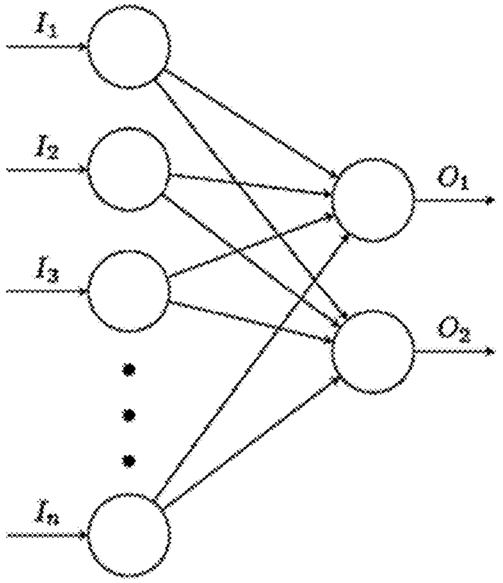
Fig. 2.15
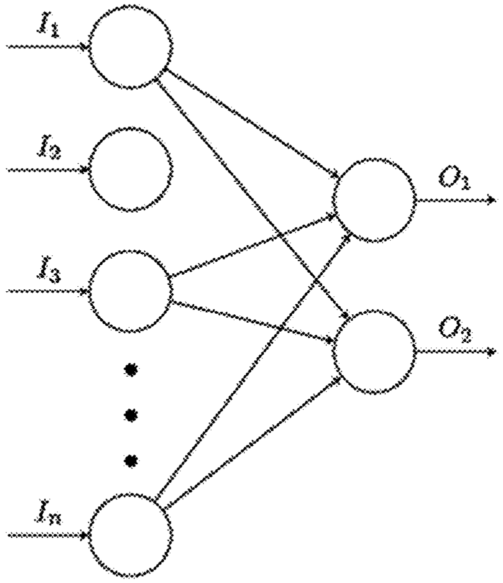
Fig. 2.16

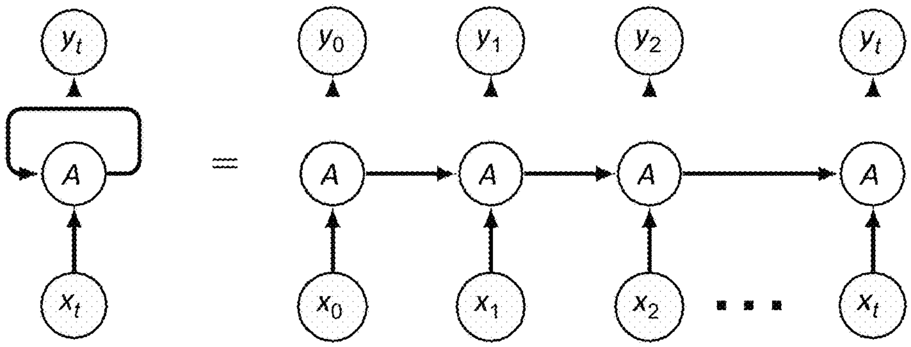
Fig. 2.17
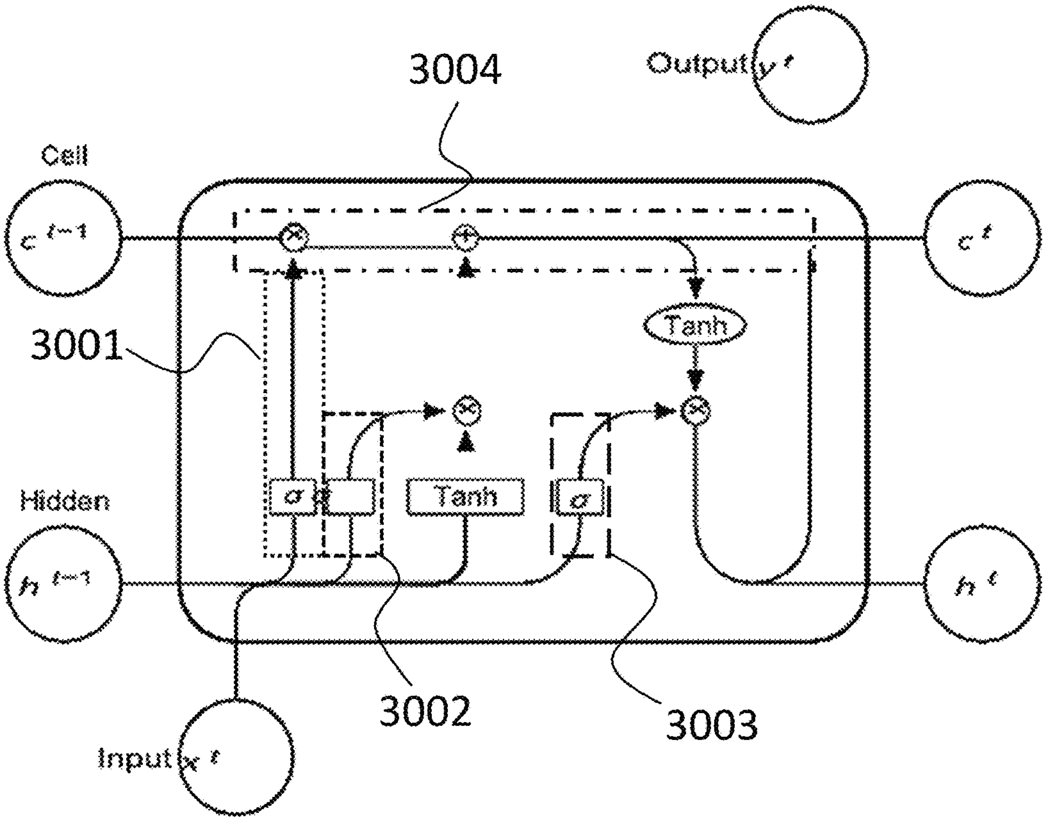
Fig. 2.18

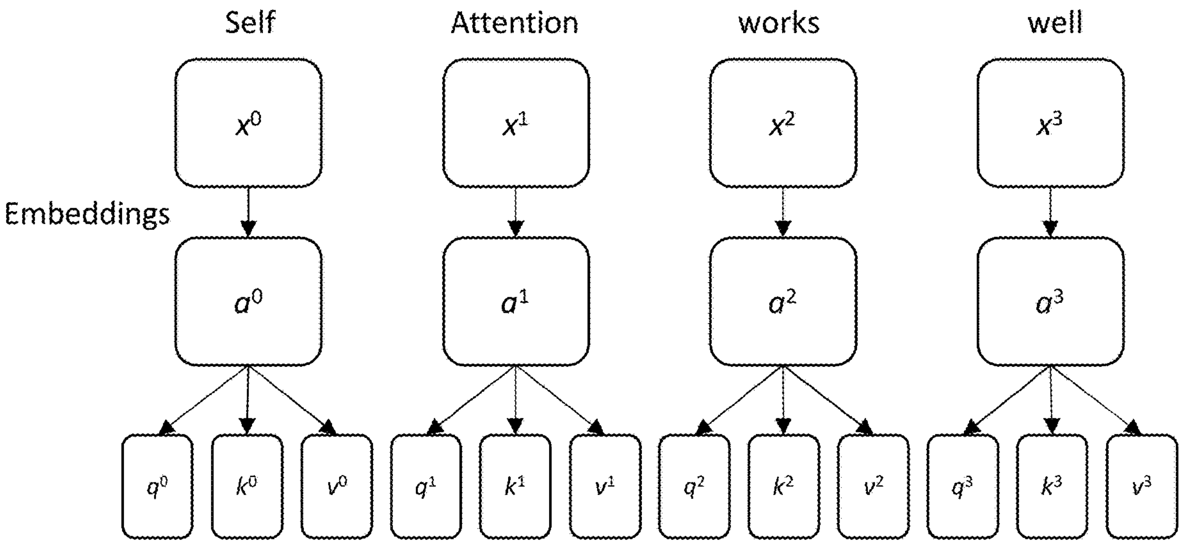
Fig. 2.19

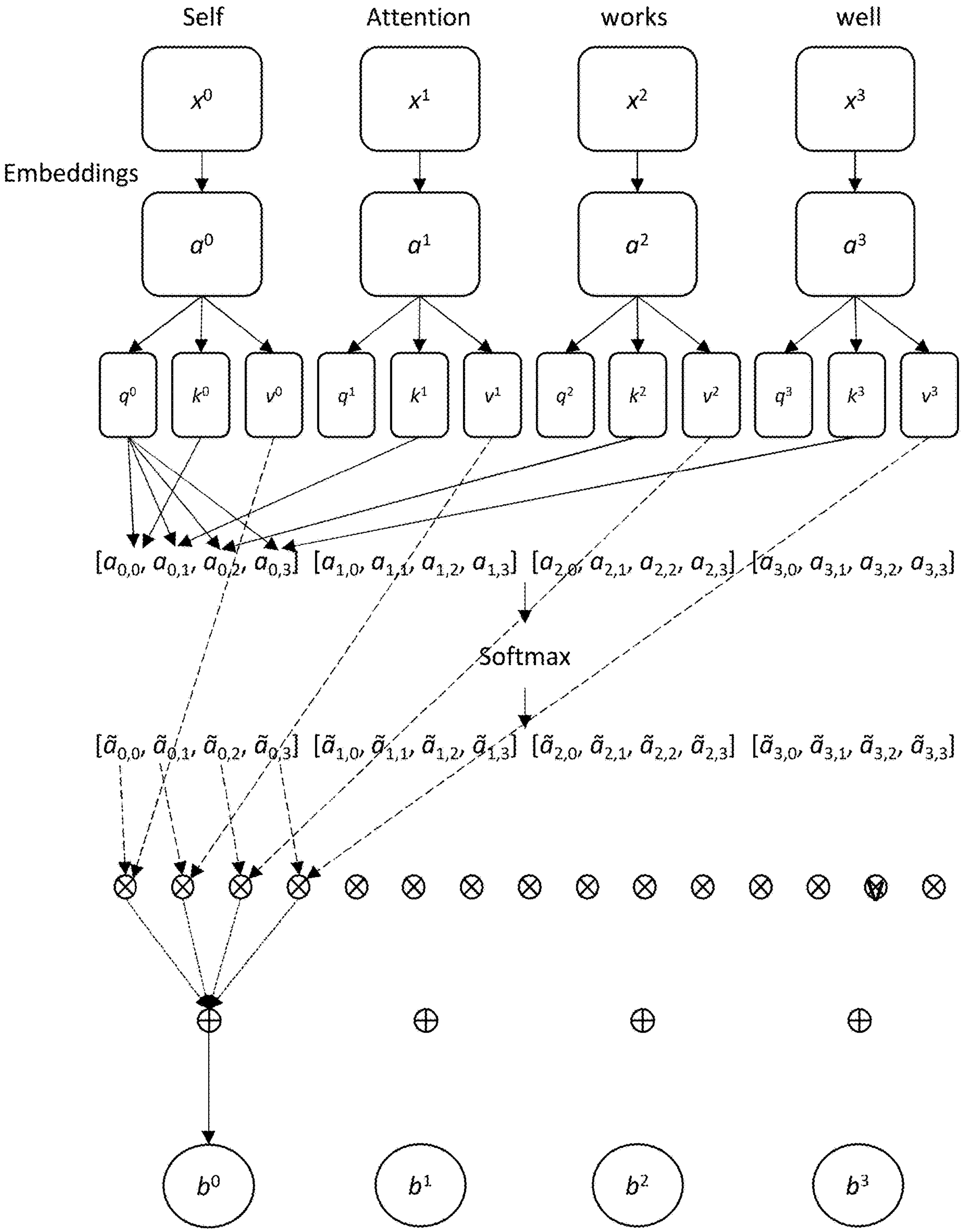
Fig. 2.20

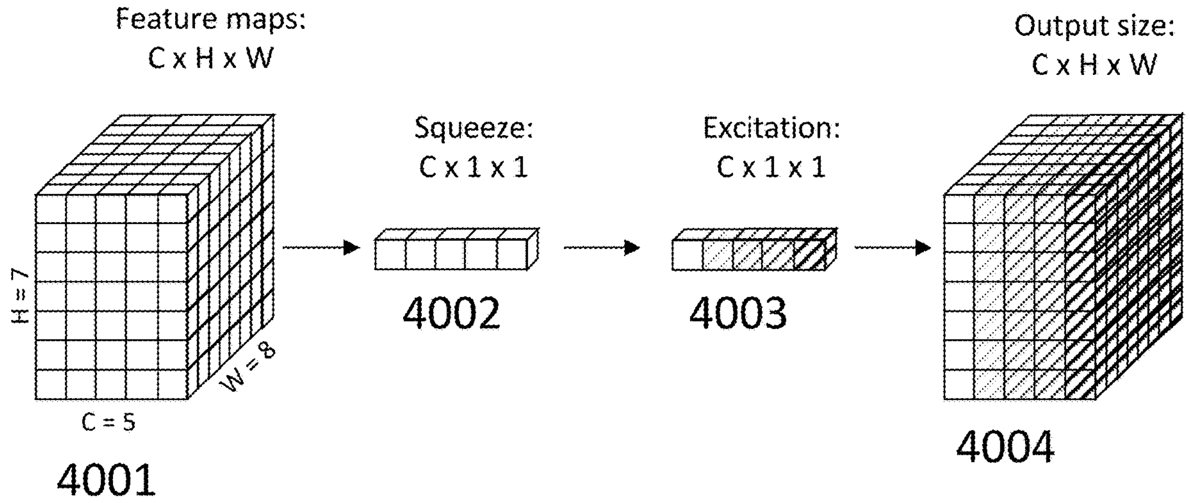
Fig. 2.21
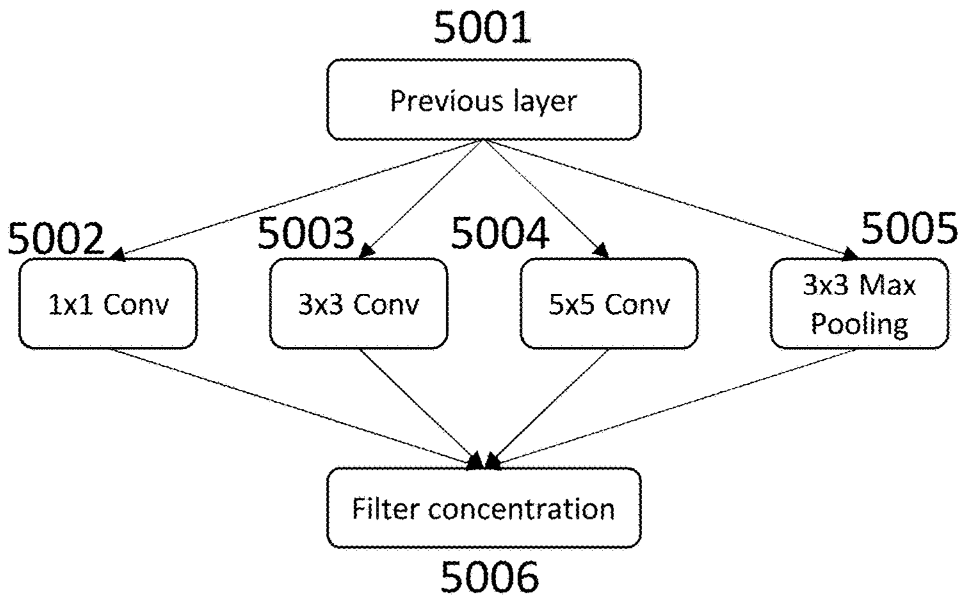
Fig. 2.22

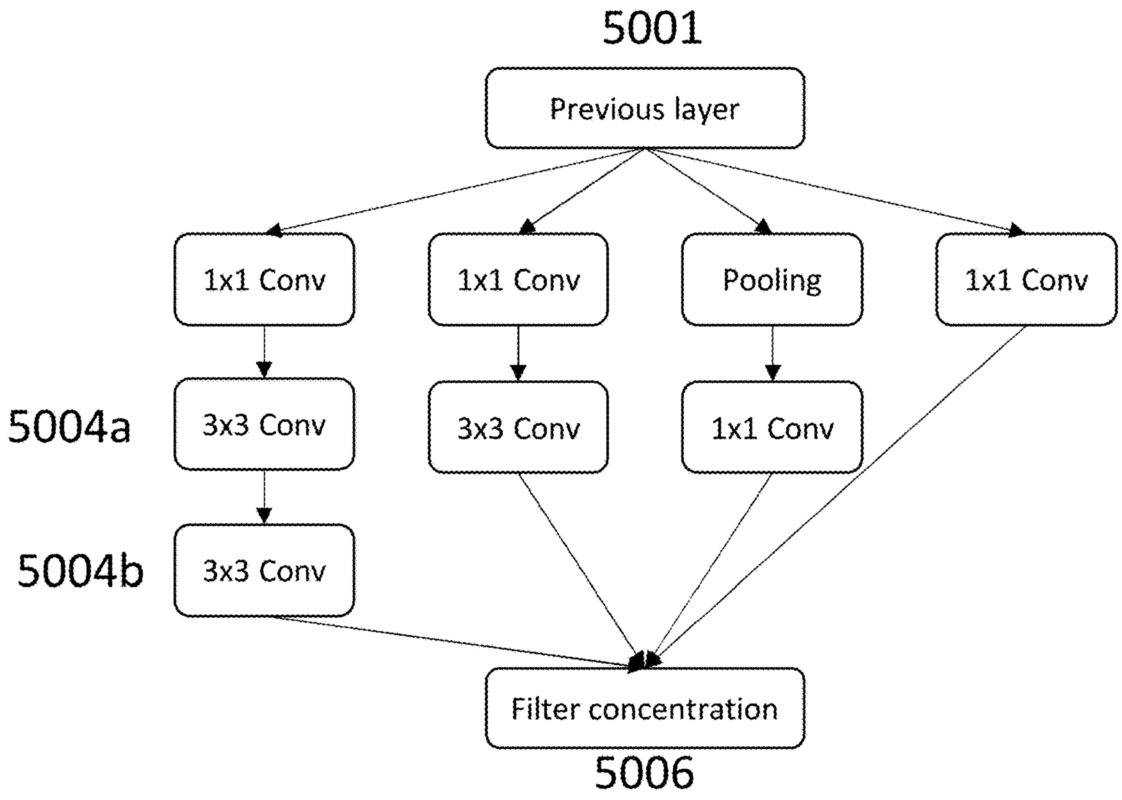
Fig. 2.23
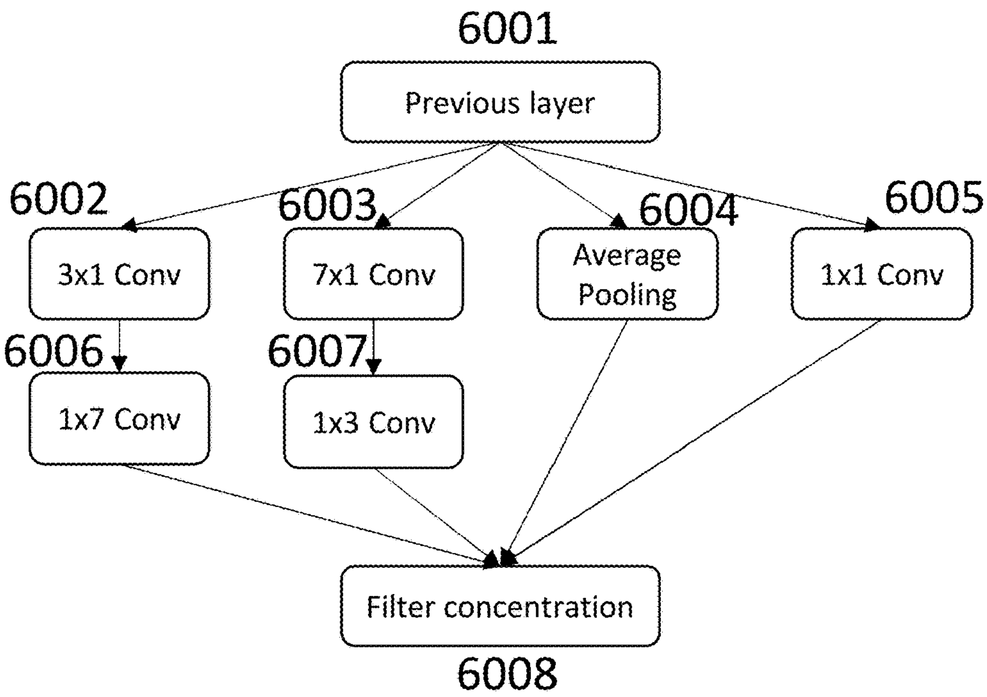
Fig. 2.24

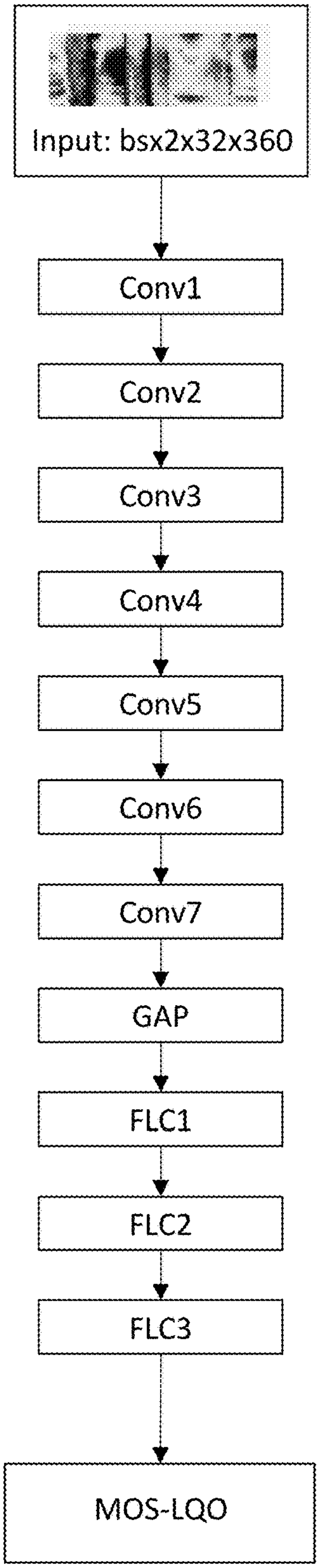
Fig. 3.1

FIG. 3.2A
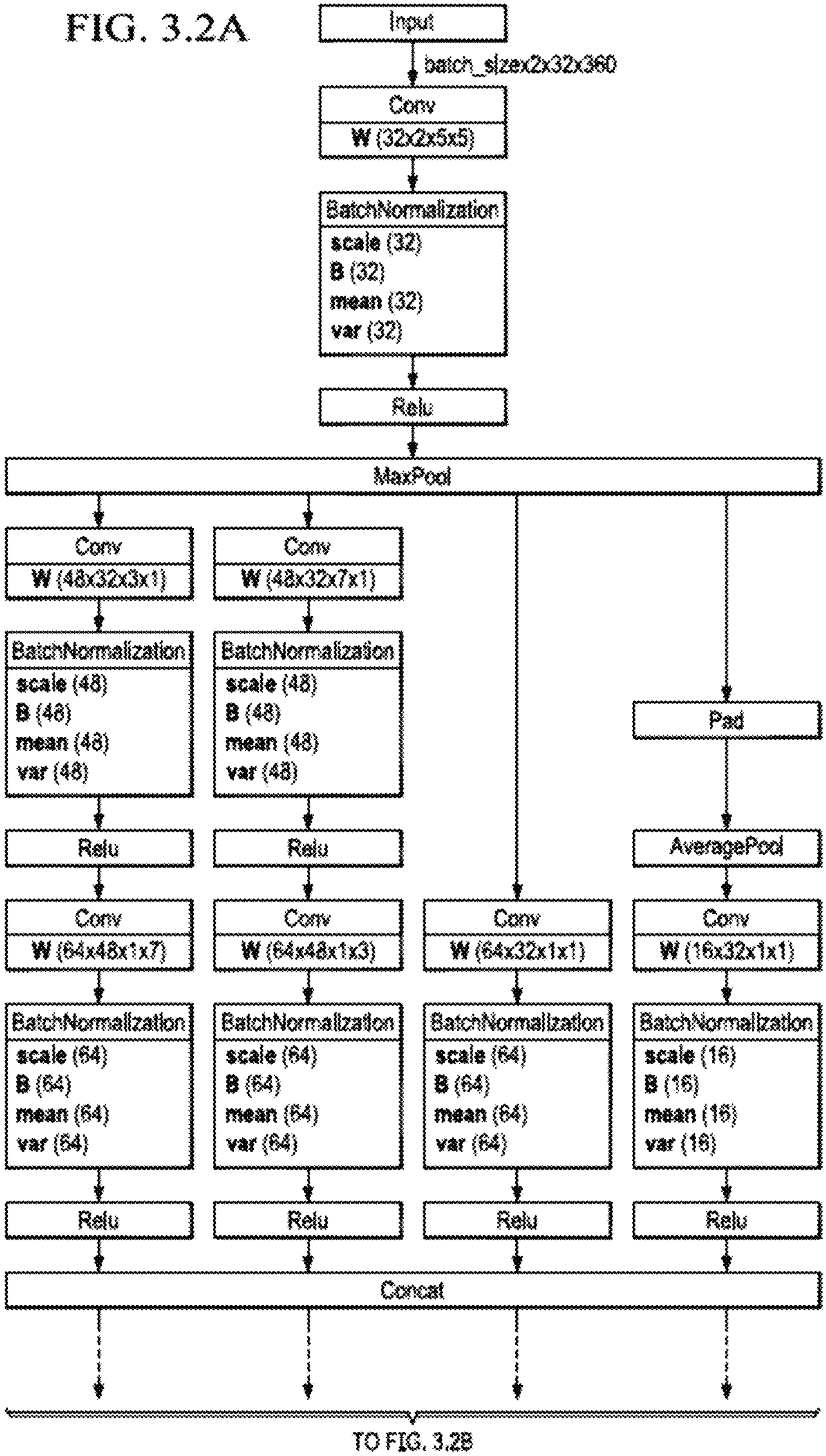
TO FIG. 3.2B

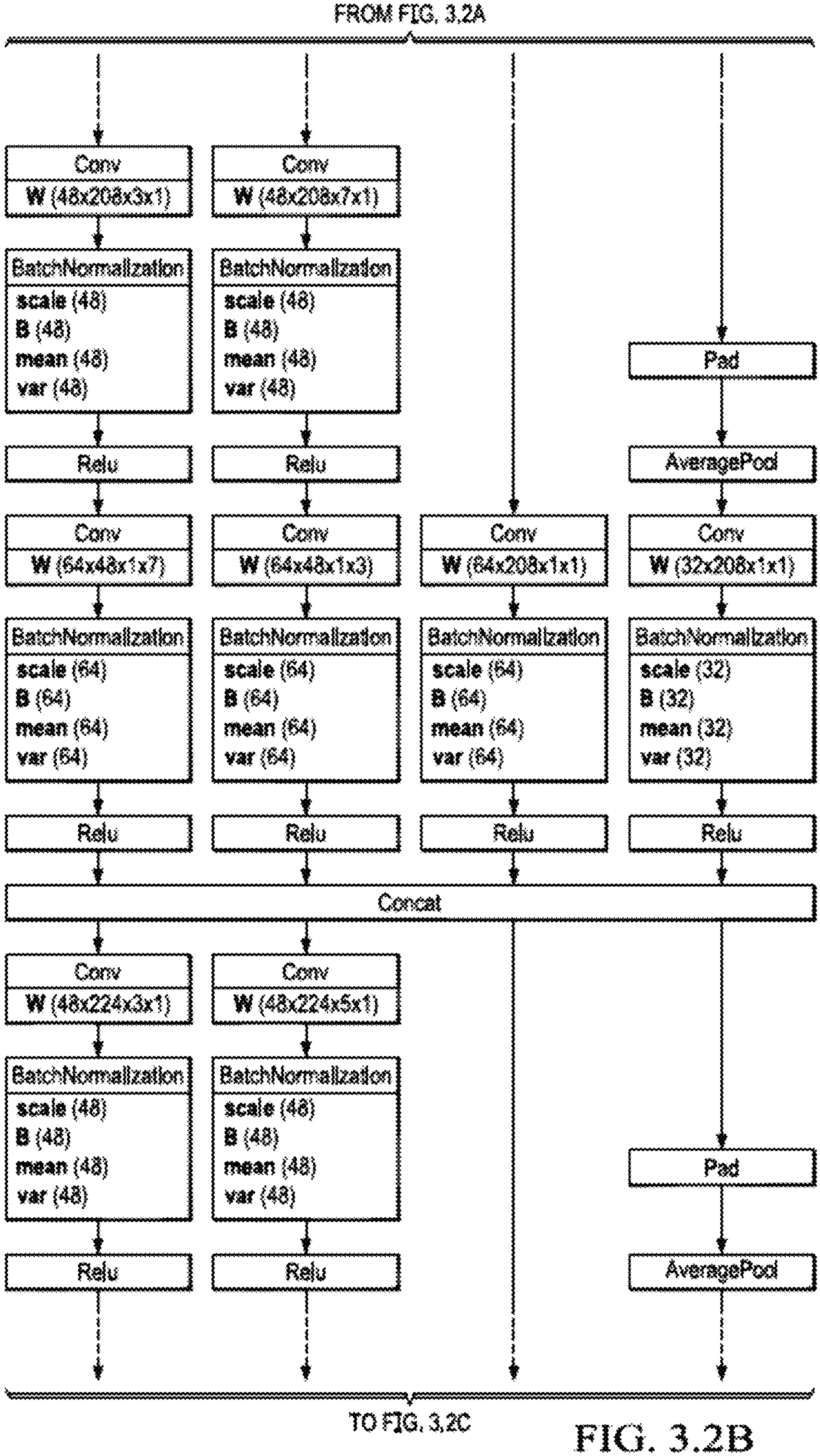
FIG. 3.2B

FROM FIG. 3.2B
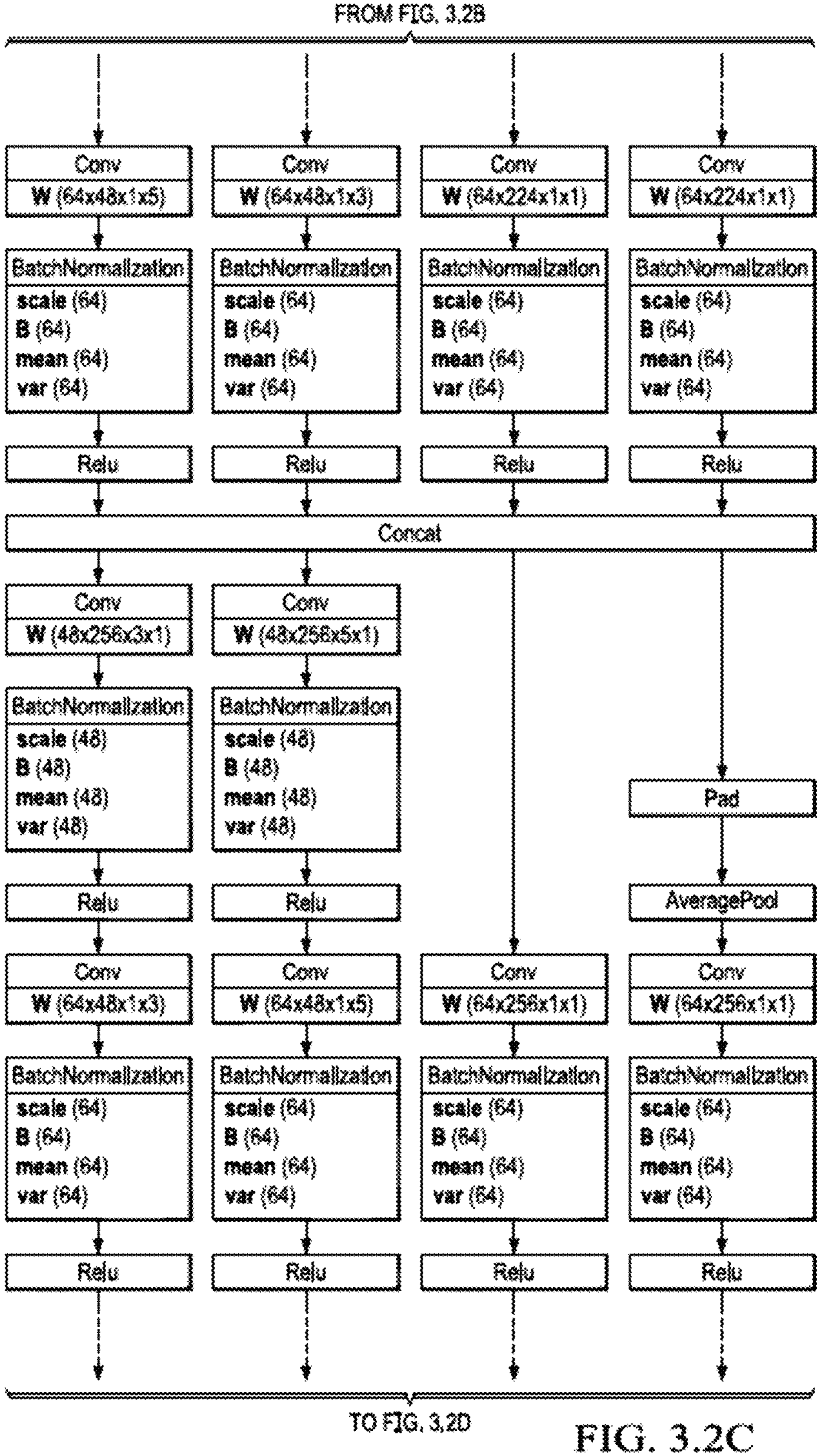
TO FIG. 3.2D
FIG. 3.2C

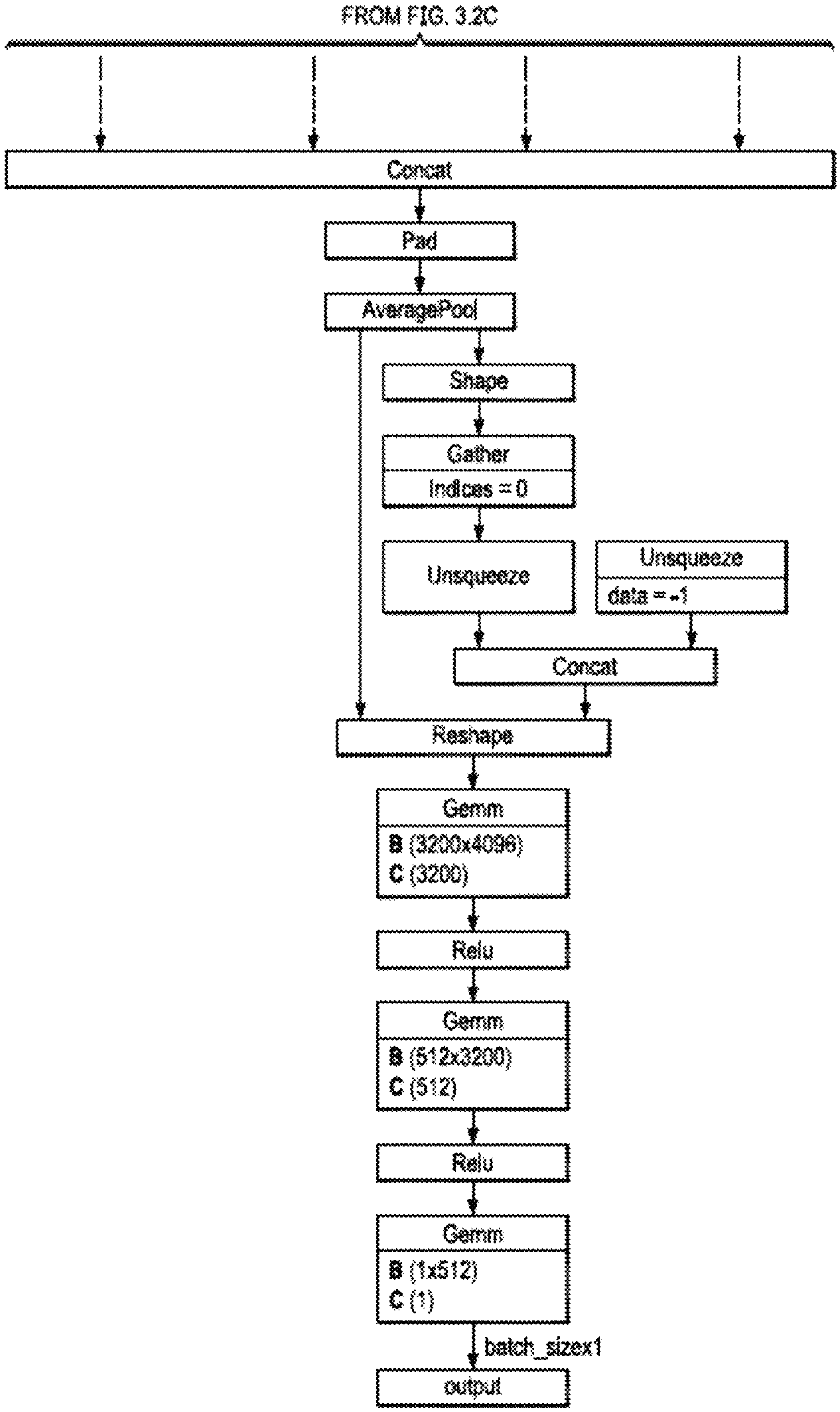
FIG. 3.2D

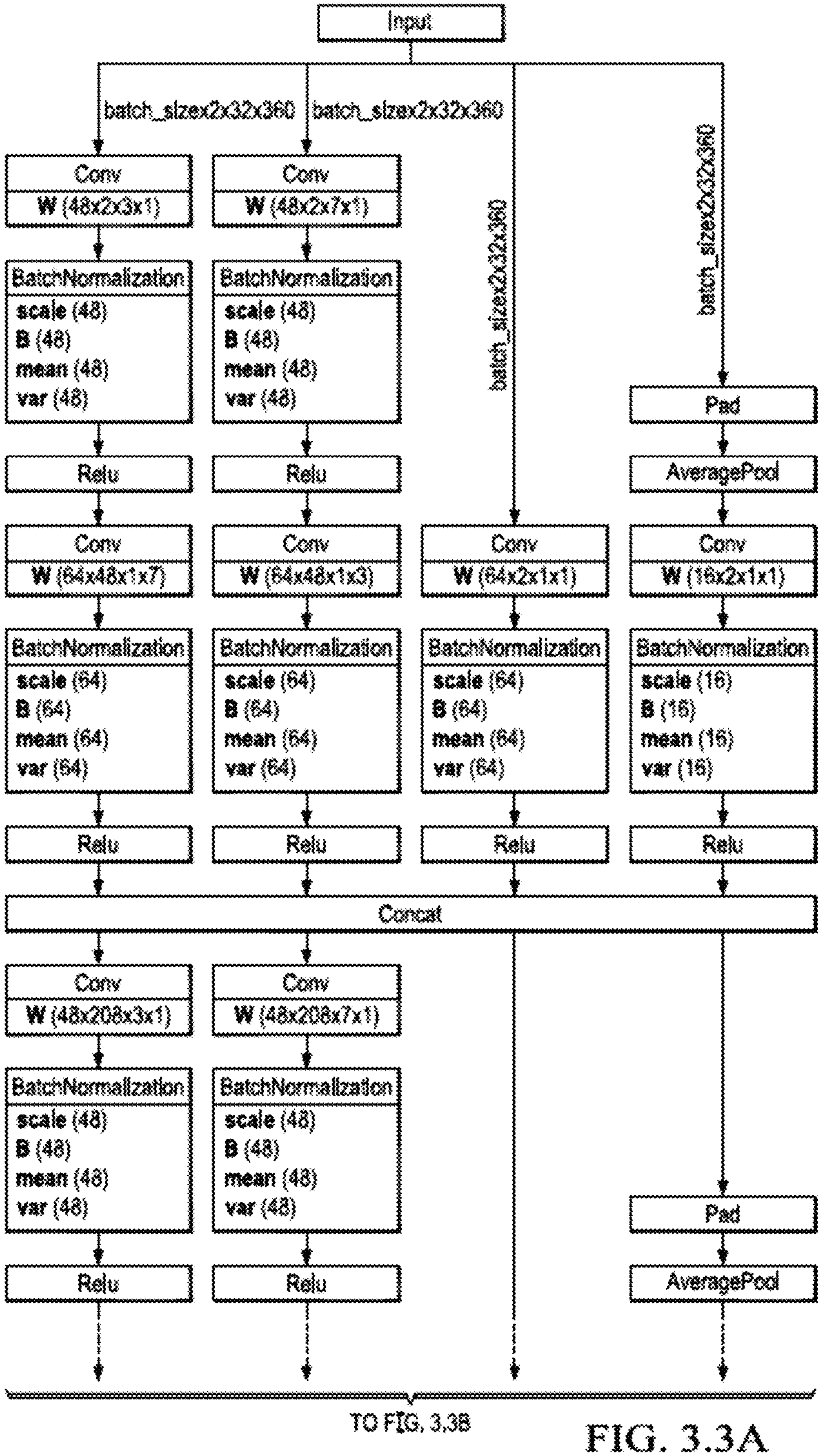
TO FIG. 3.3B
FIG. 3.3A

FROM FIG. 3.3A
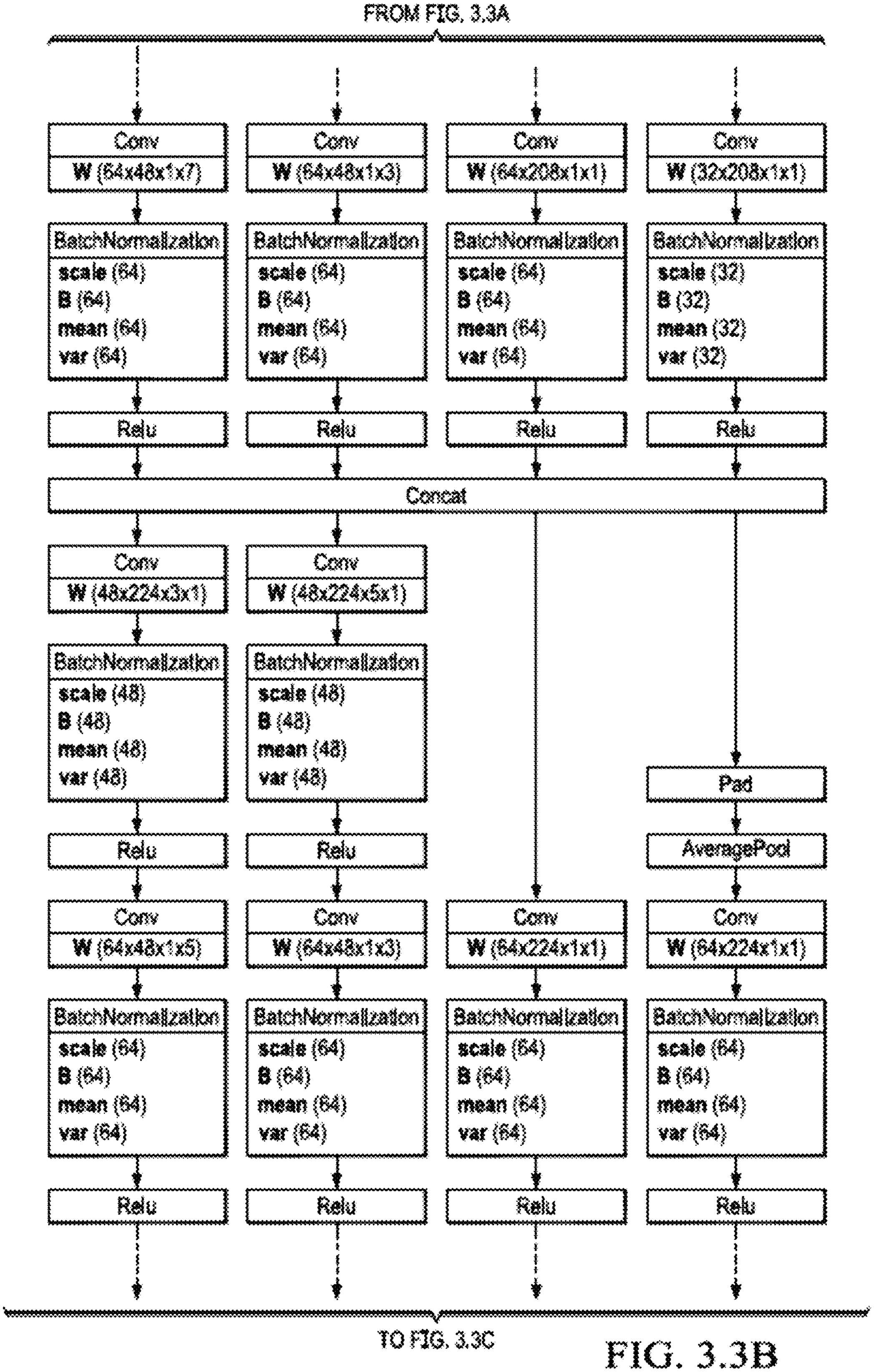
TO FIG. 3.3C
FIG. 3.3B

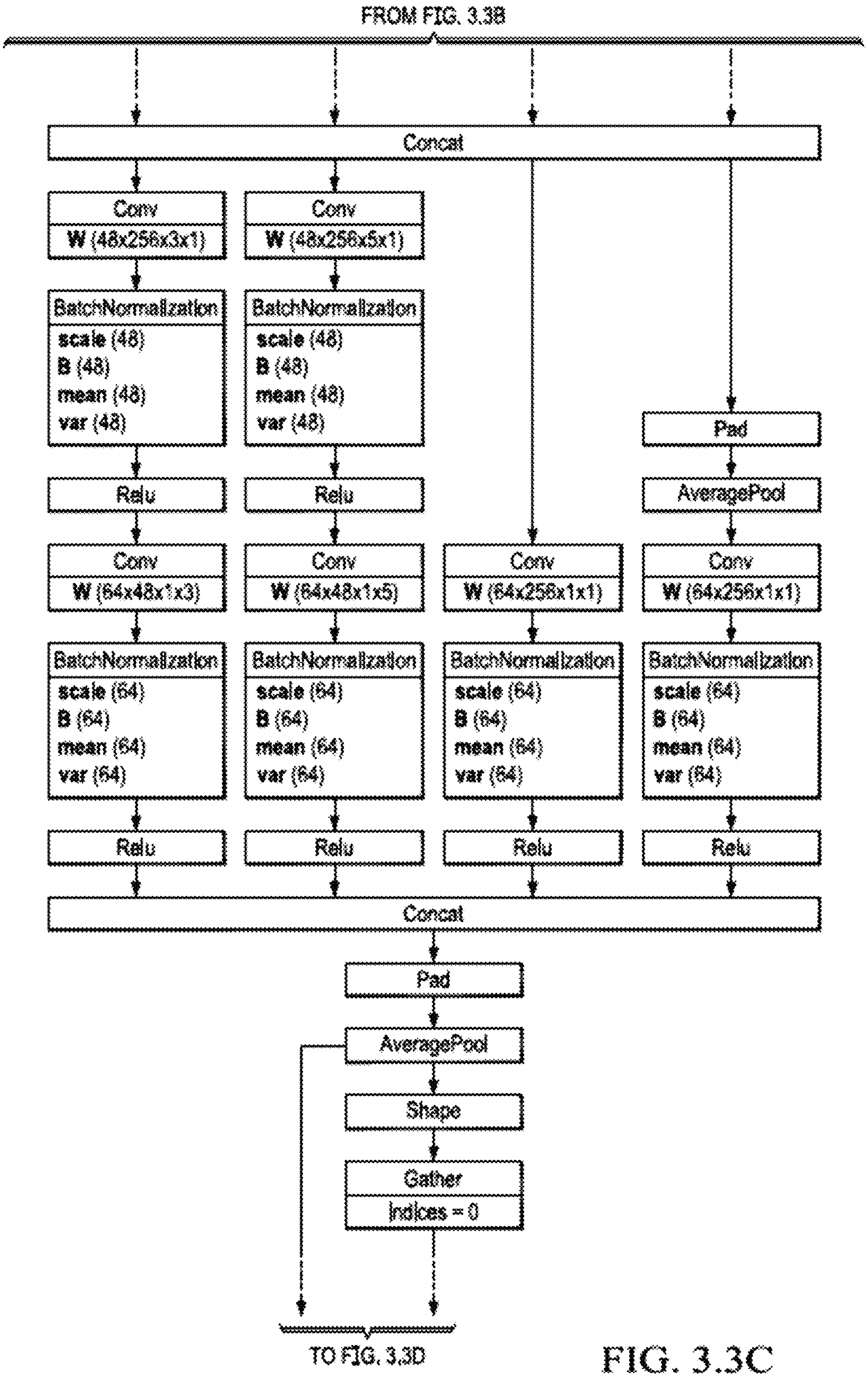
FIG. 3.3C

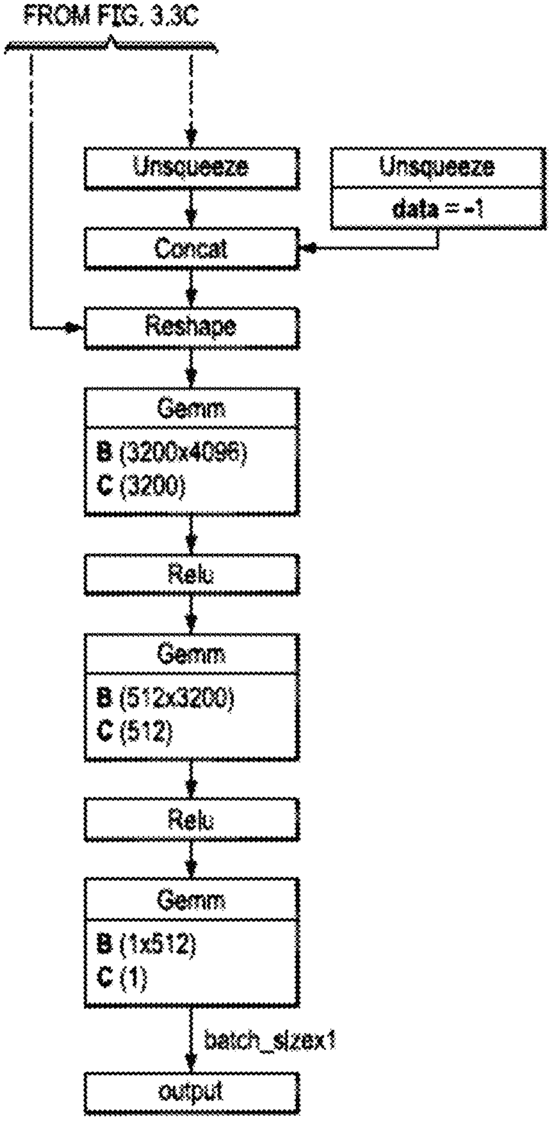
FIG. 3.3D

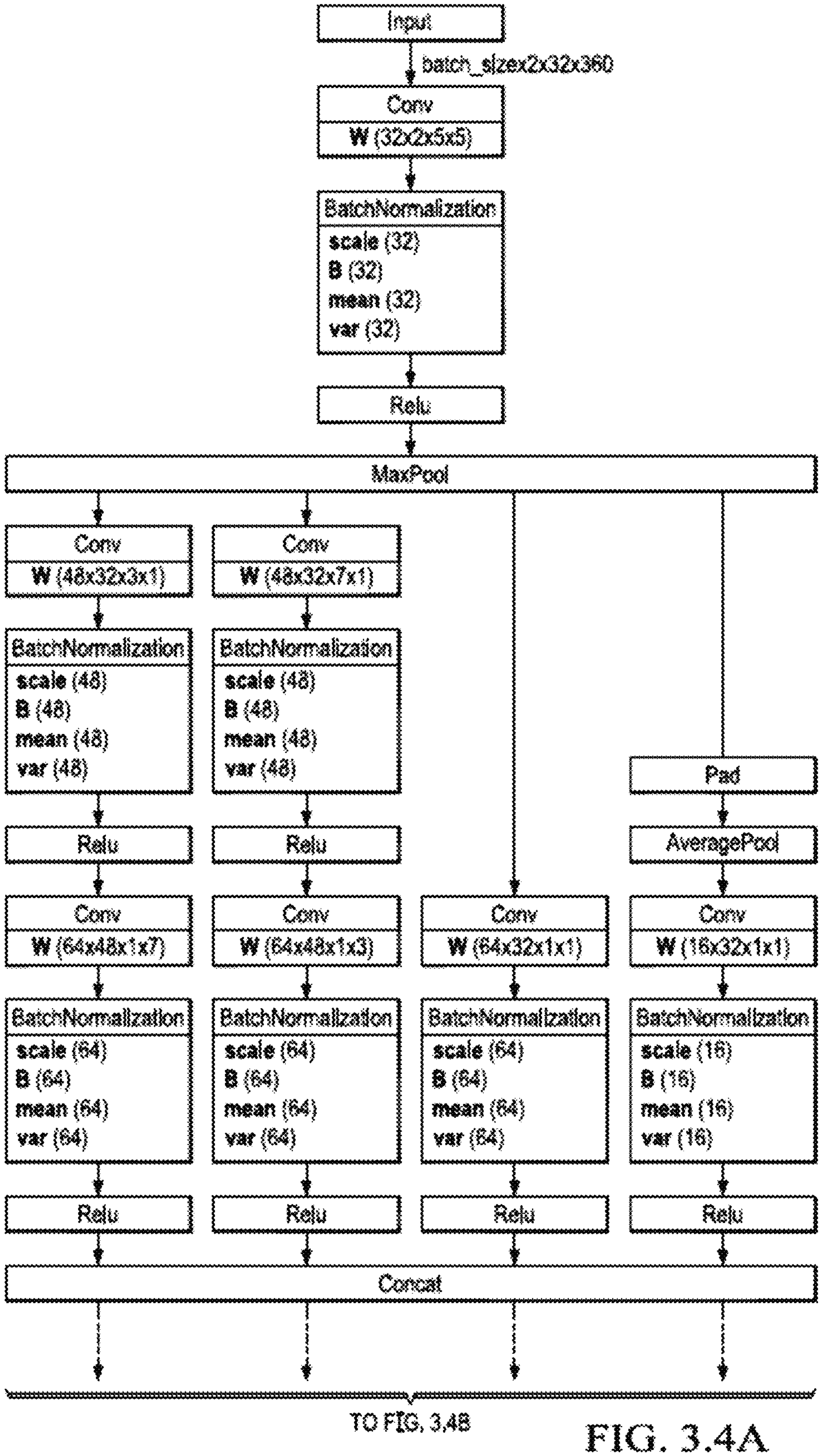
FIG. 3.4A

FROM FIG. 3.4A
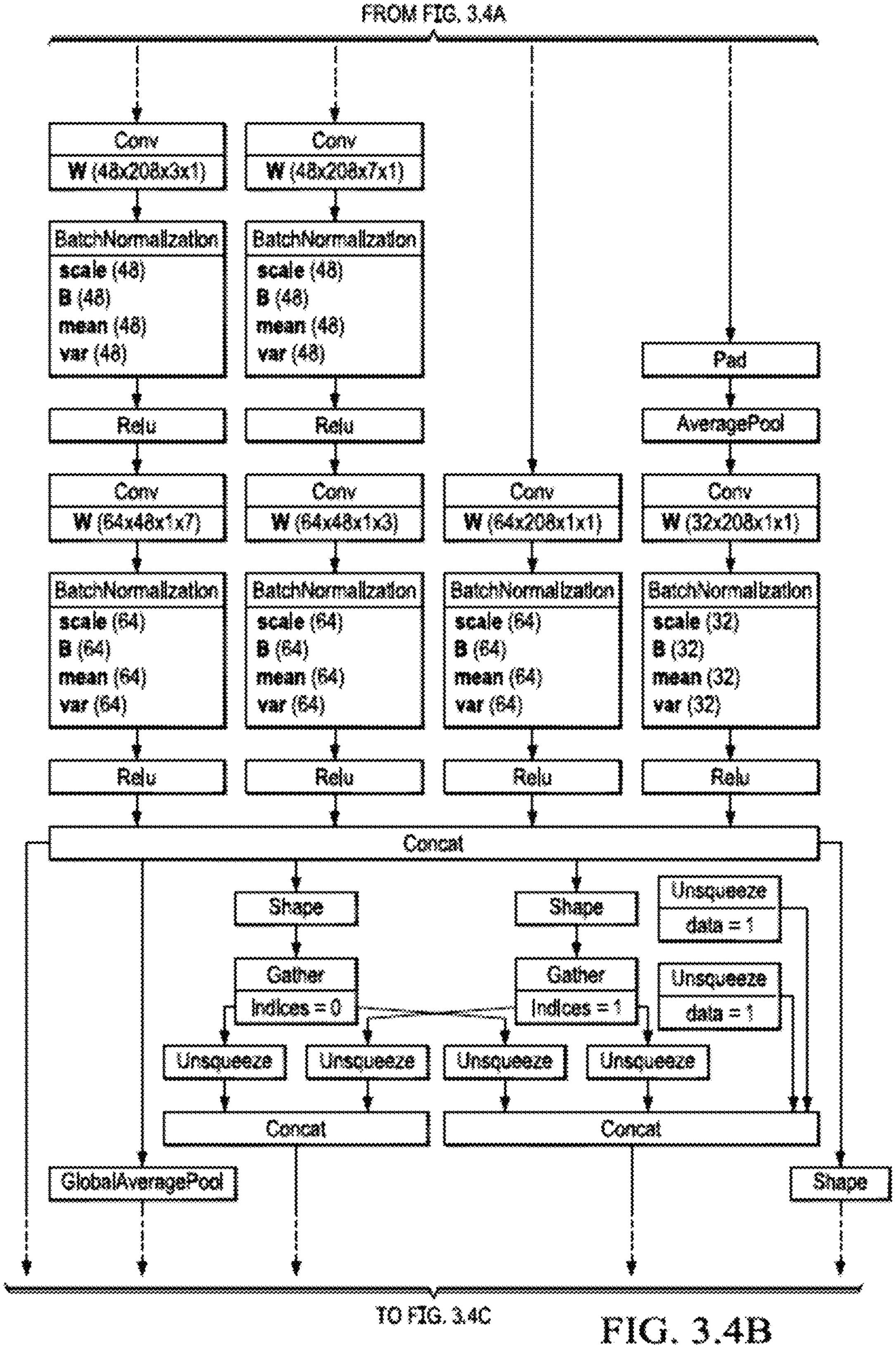
TO FIG. 3.4C
FIG. 3.4B

FROM FIG. 3.4B
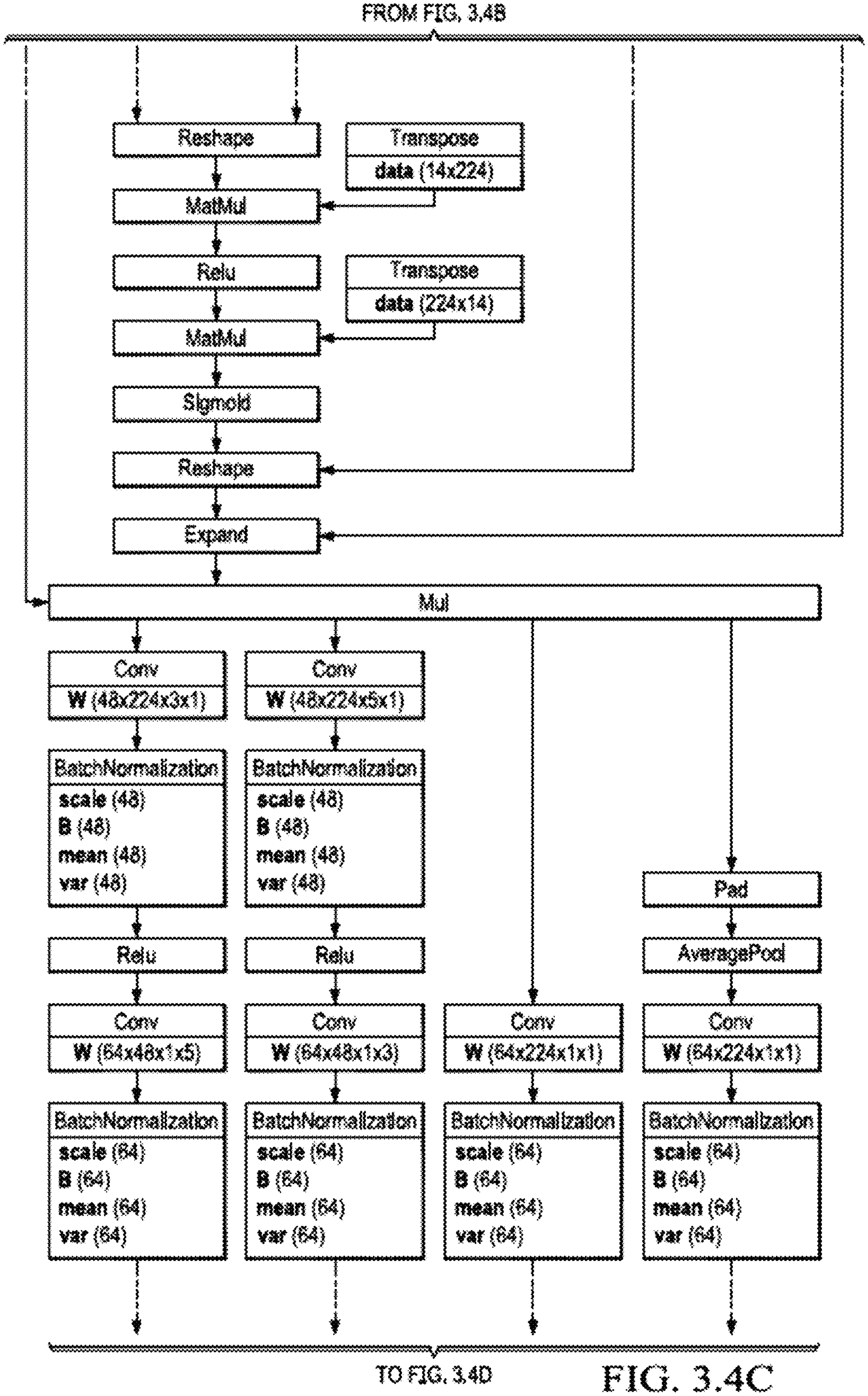
TO FIG. 3.4D
FIG. 3.4C

FROM FIG. 3.4C
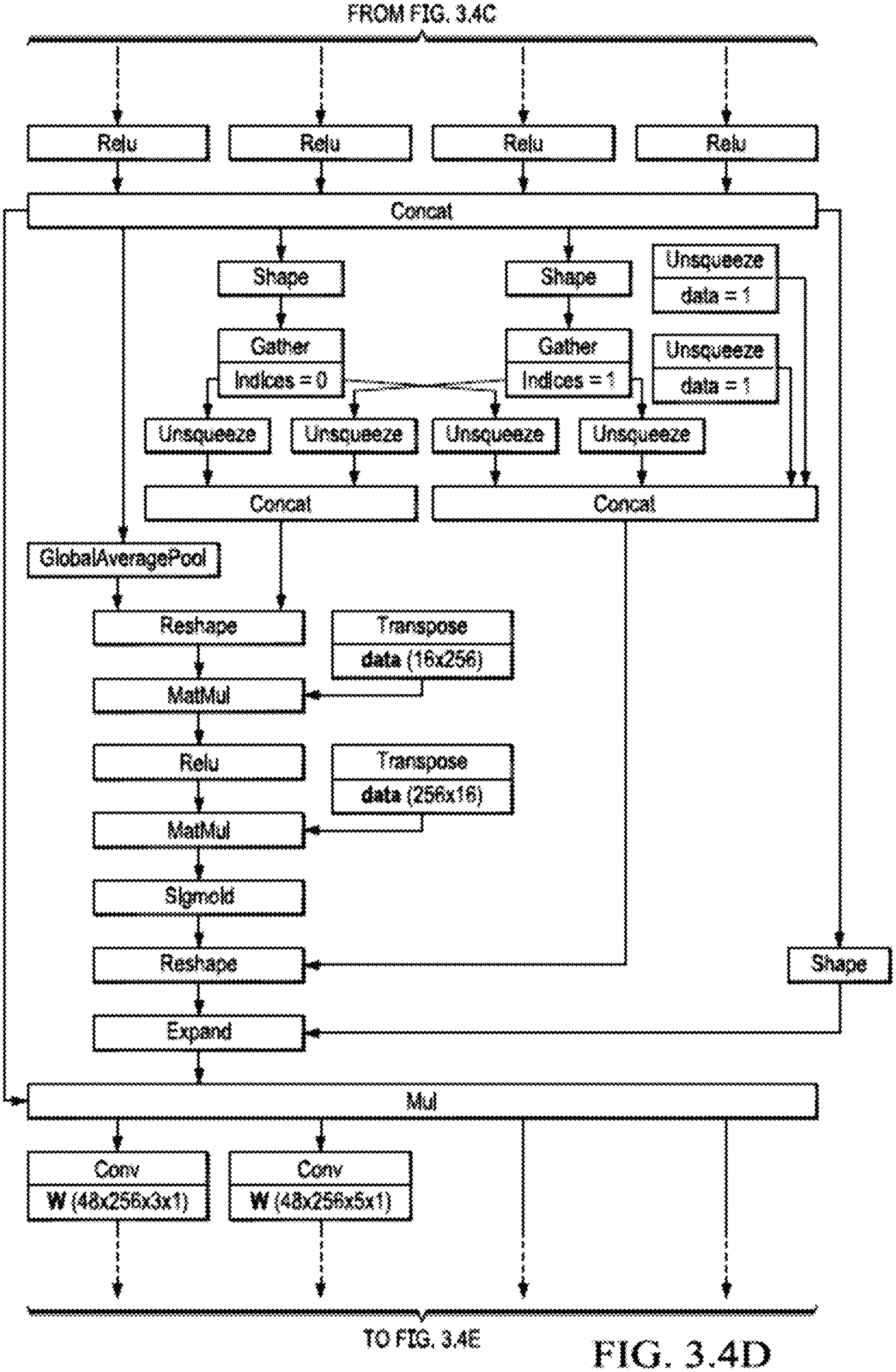
TO FIG. 3.4E
FIG. 3.4D

FROM FIG. 3.4D
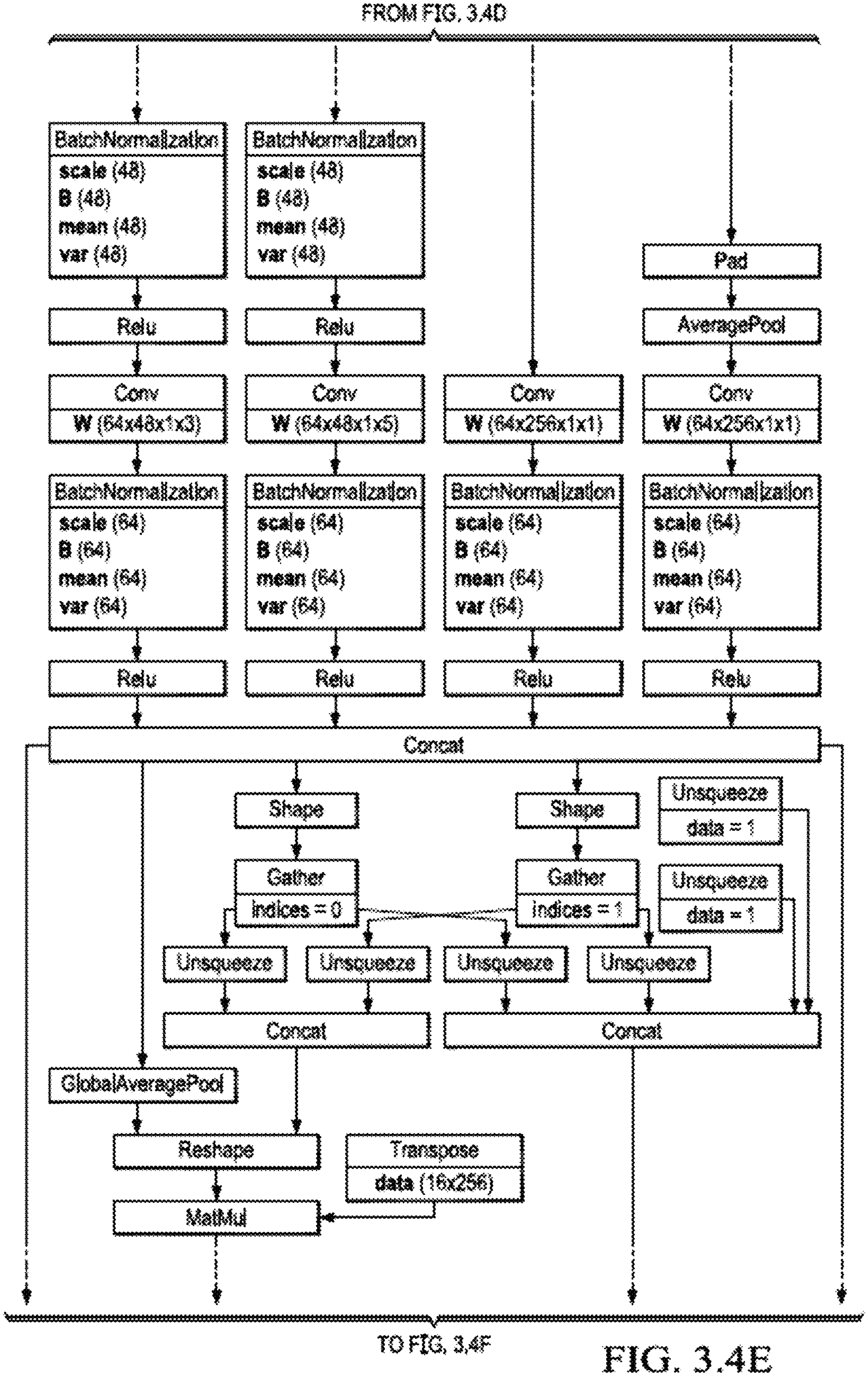
TO FIG. 3.4F
FIG. 3.4E

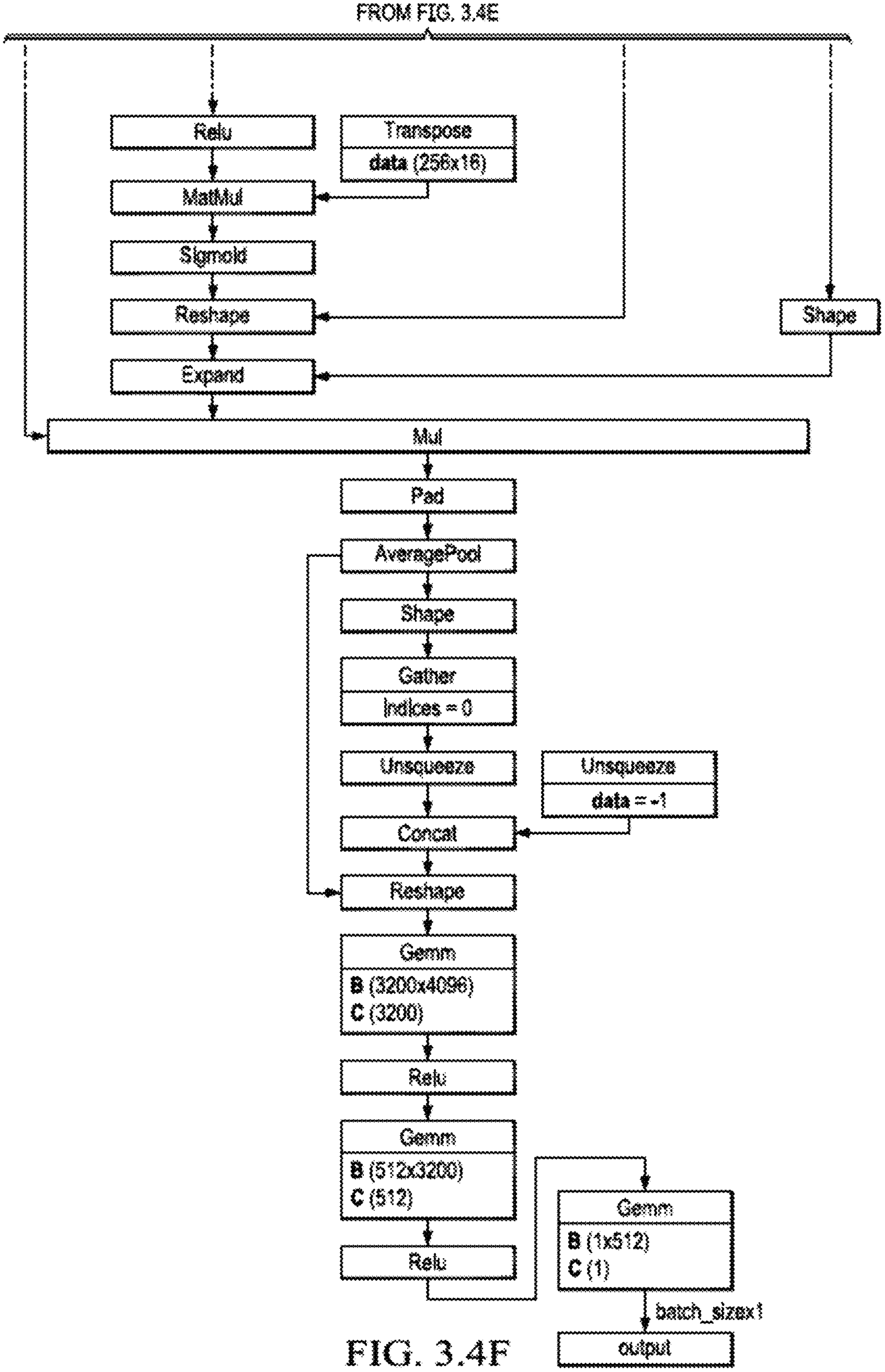
FIG. 3.4F

FIG. 3.5A
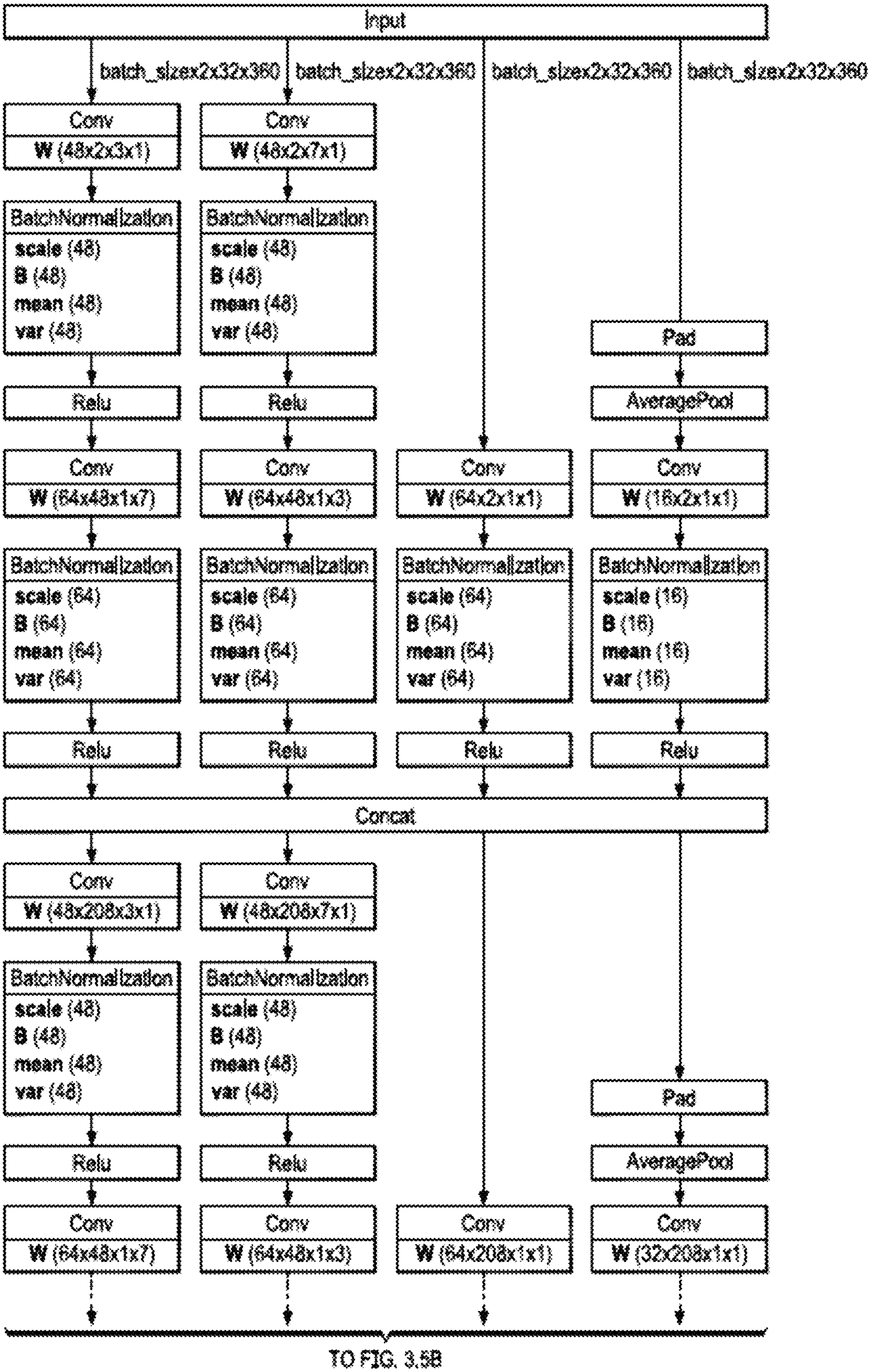
TO FIG. 3.5B

FIG. 3.5B
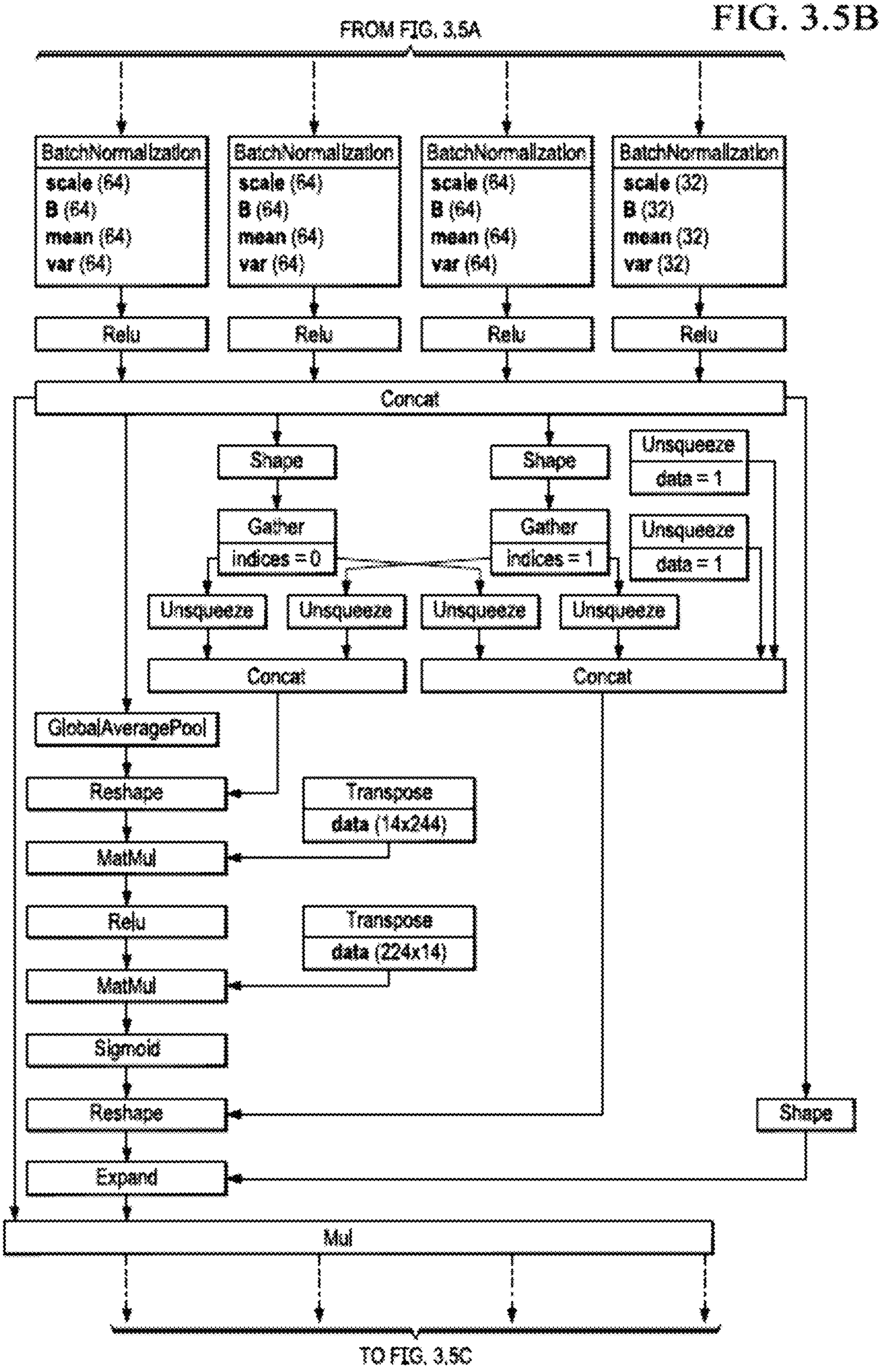

FIG. 3.5C
FROM FIG. 3.5B
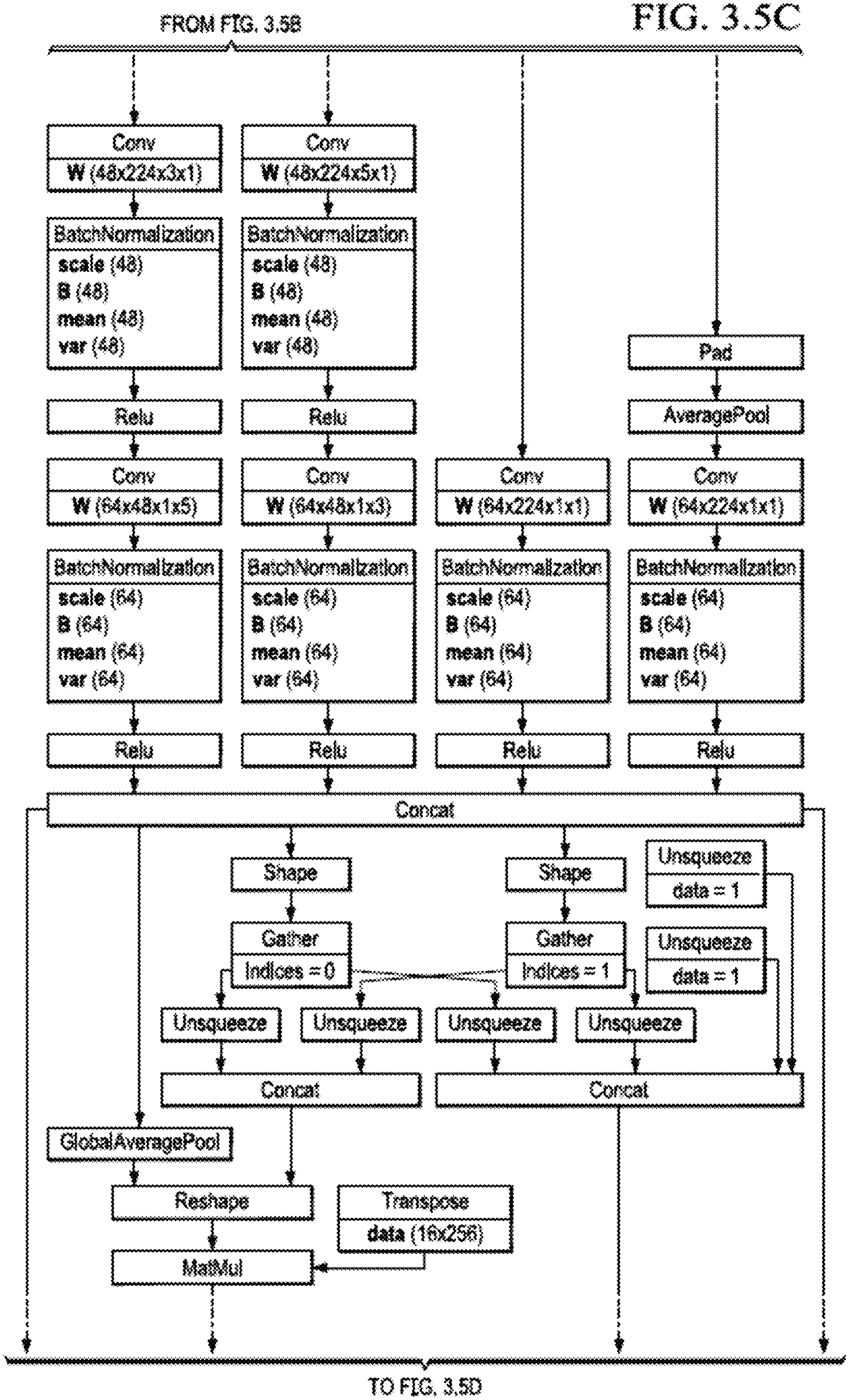
TO FIG. 3.5D

FIG. 3.5D
FROM FIG. 3.5C
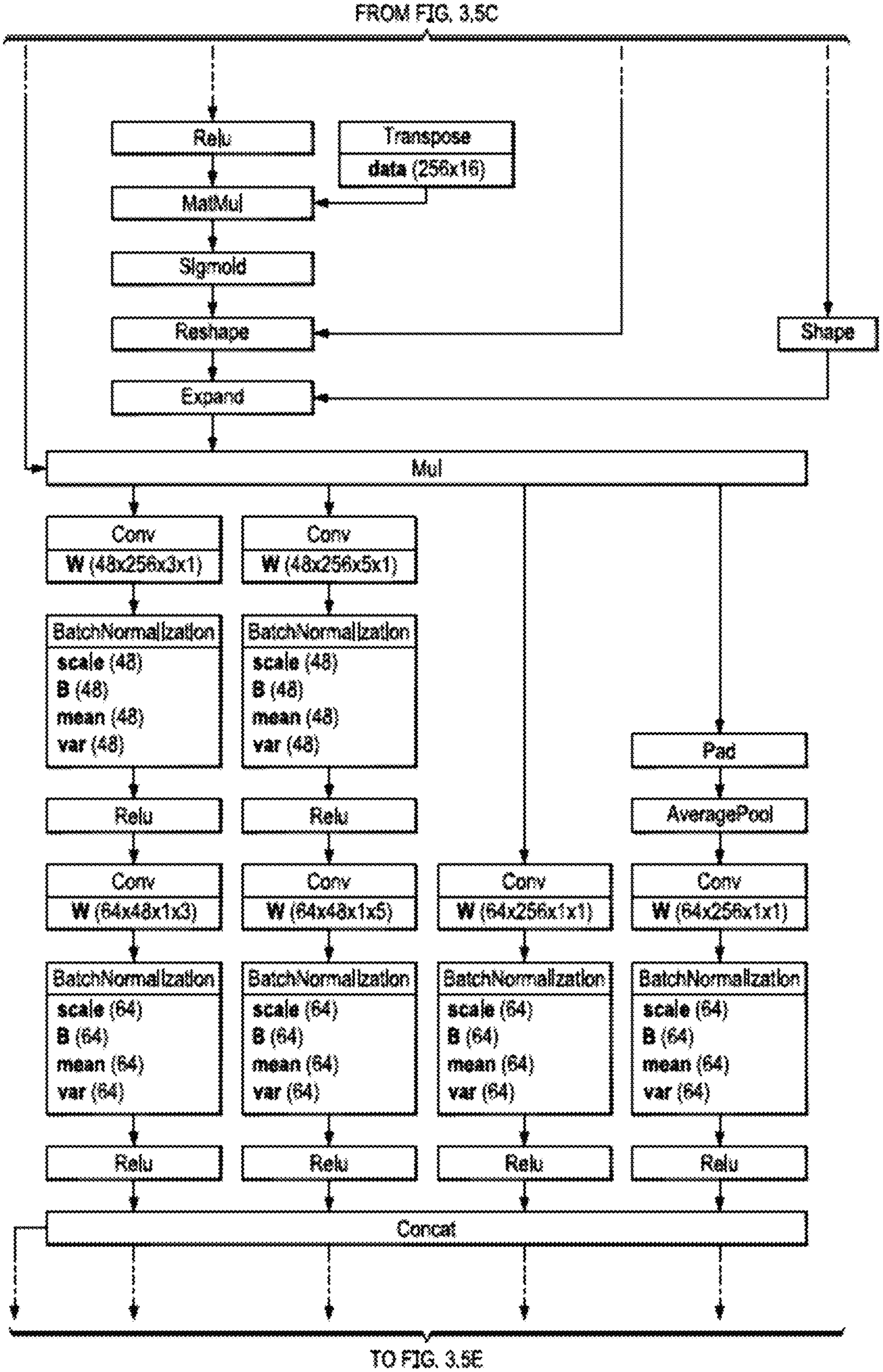
TO FIG. 3.5E

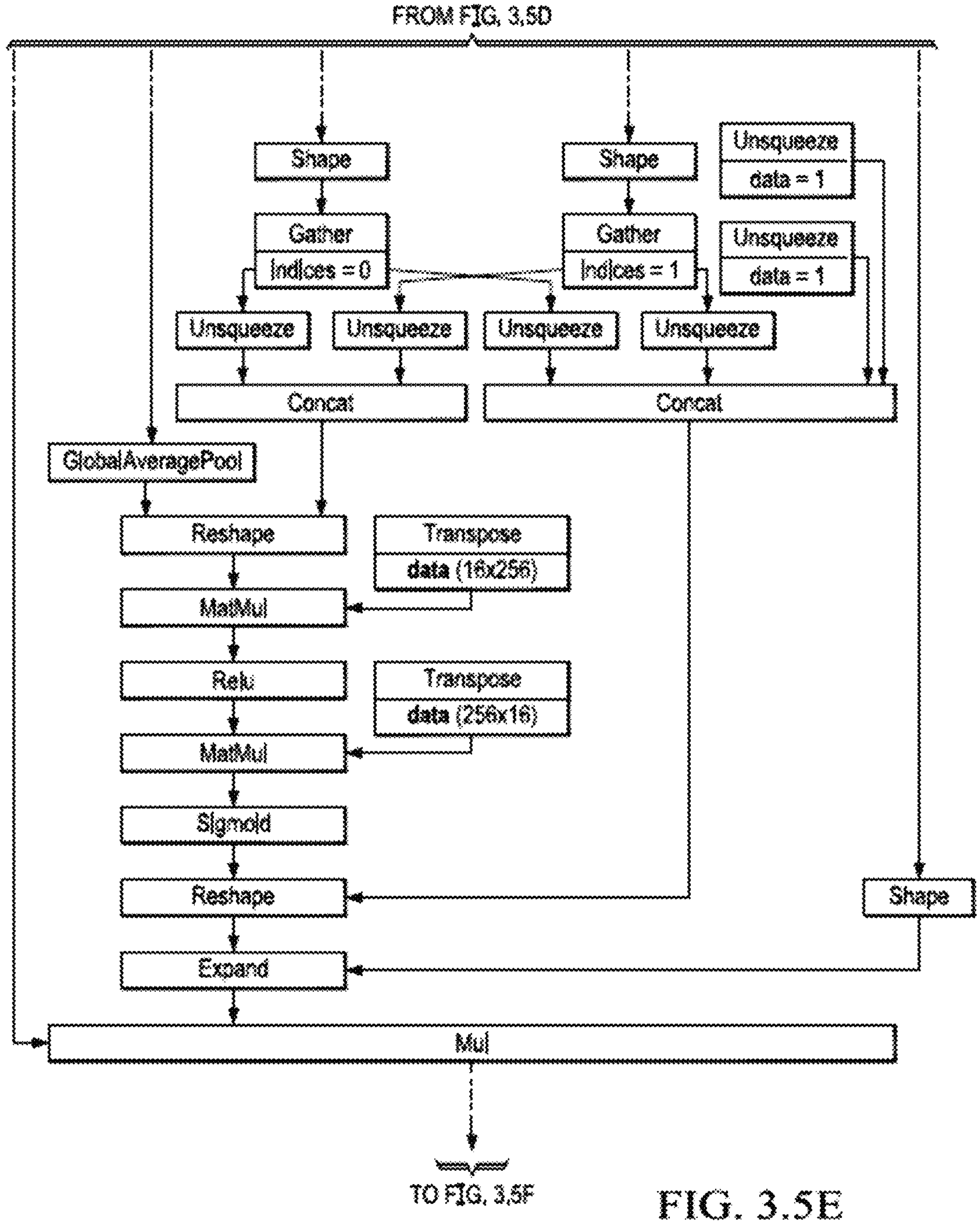
FIG. 3.5E

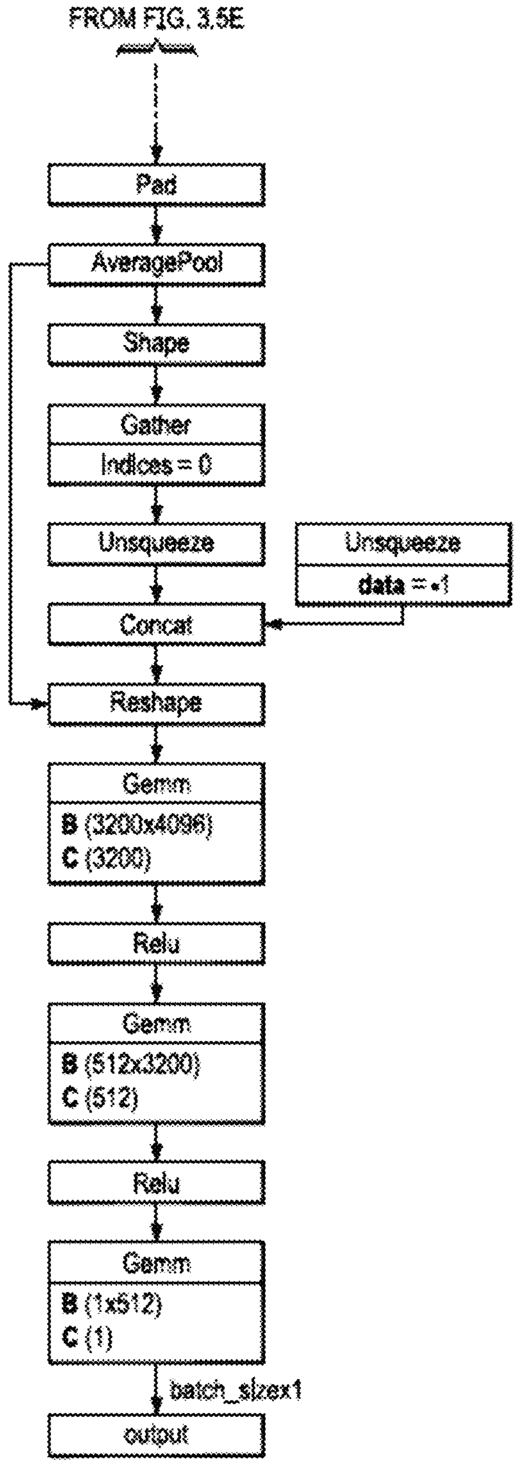
FIG. 3.5F

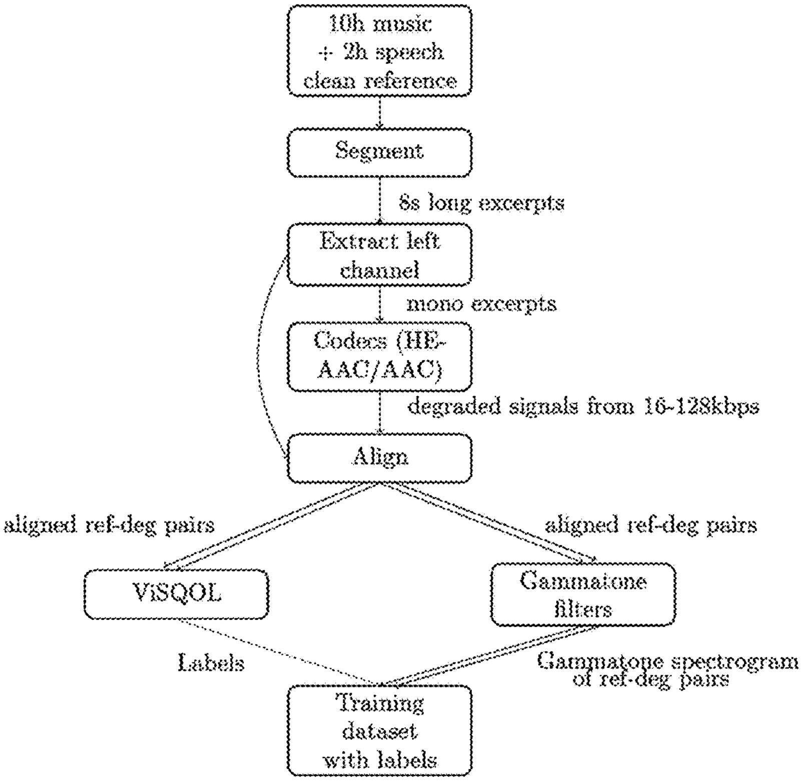
Fig. 4.1
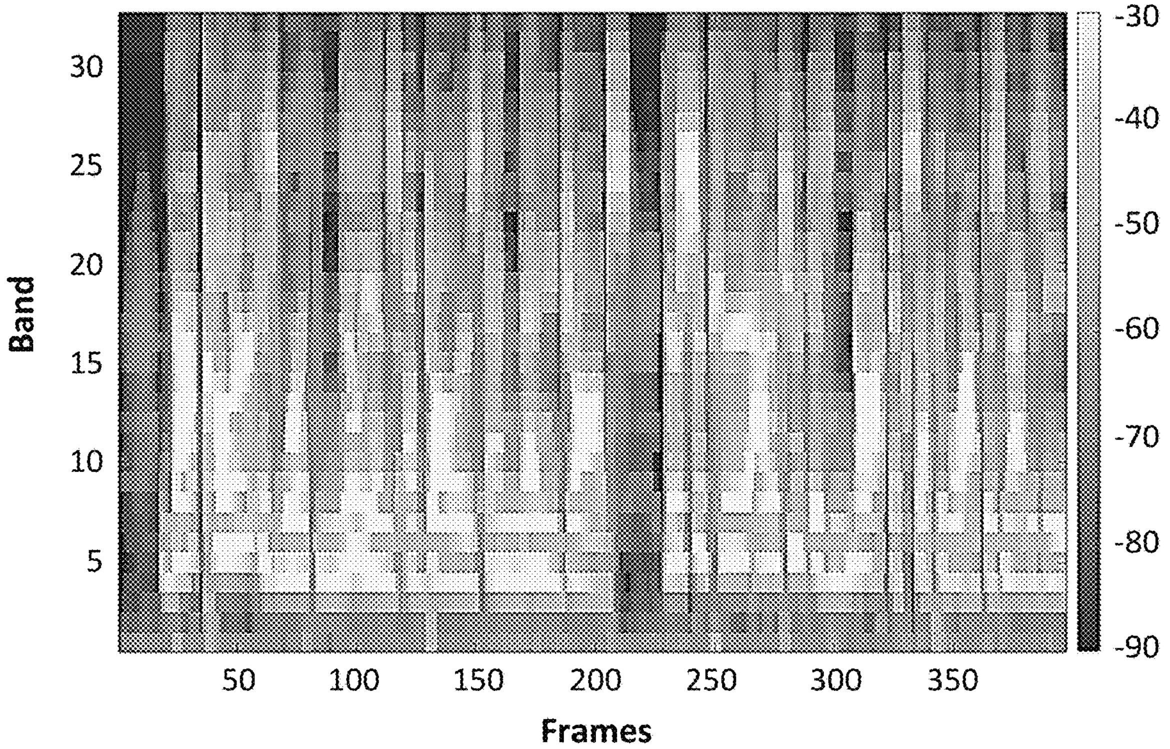
Fig. 4.2

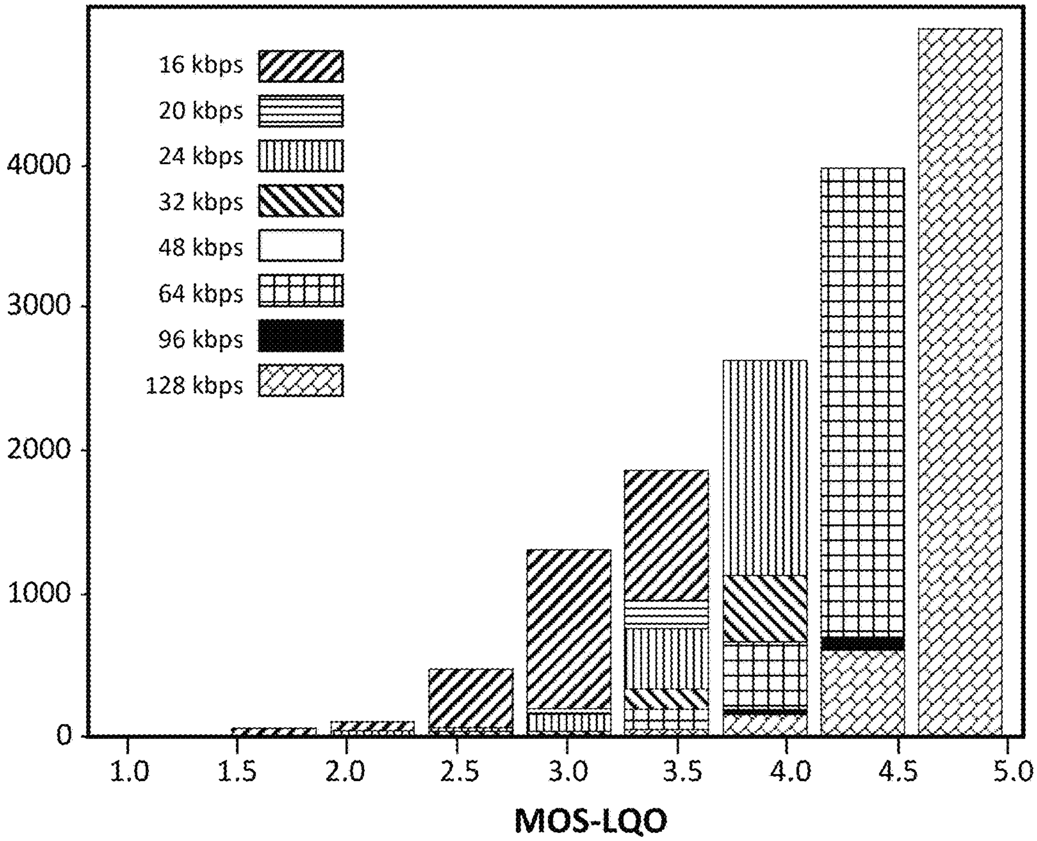
Fig. 4.3
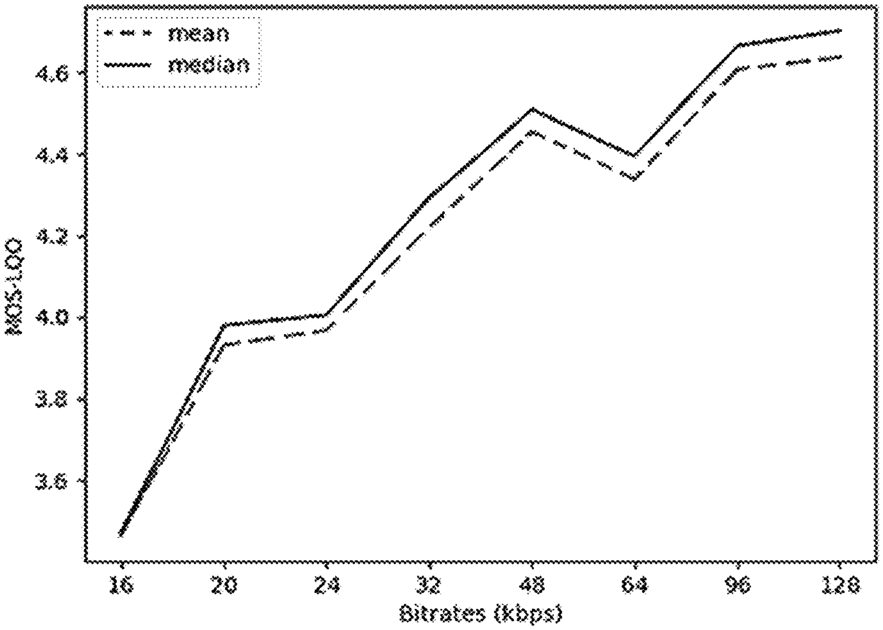
Fig. 4.4

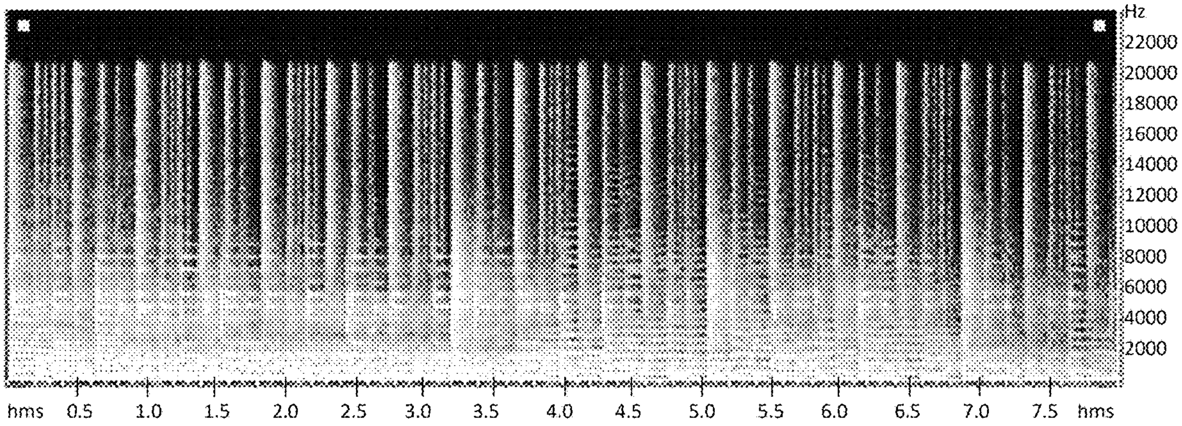
Fig. 4.5
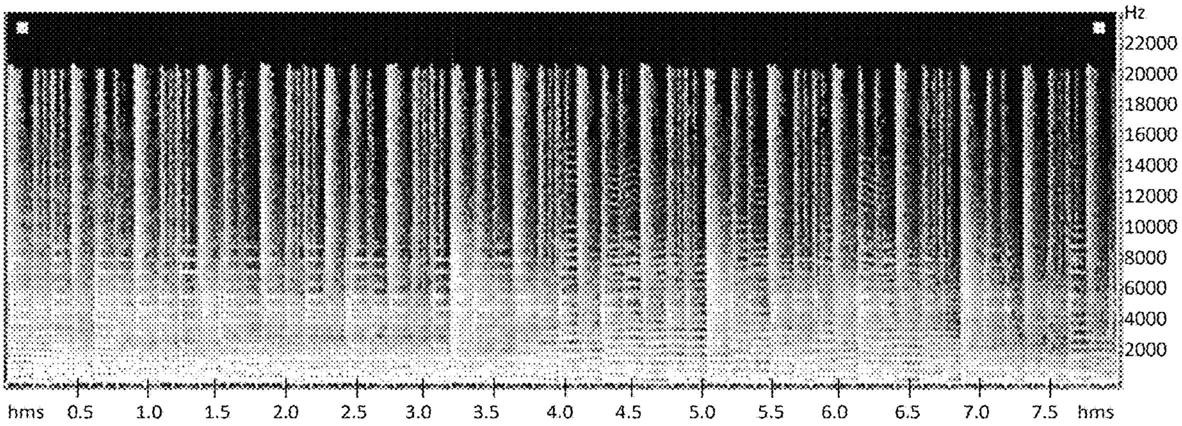
Fig. 4.6
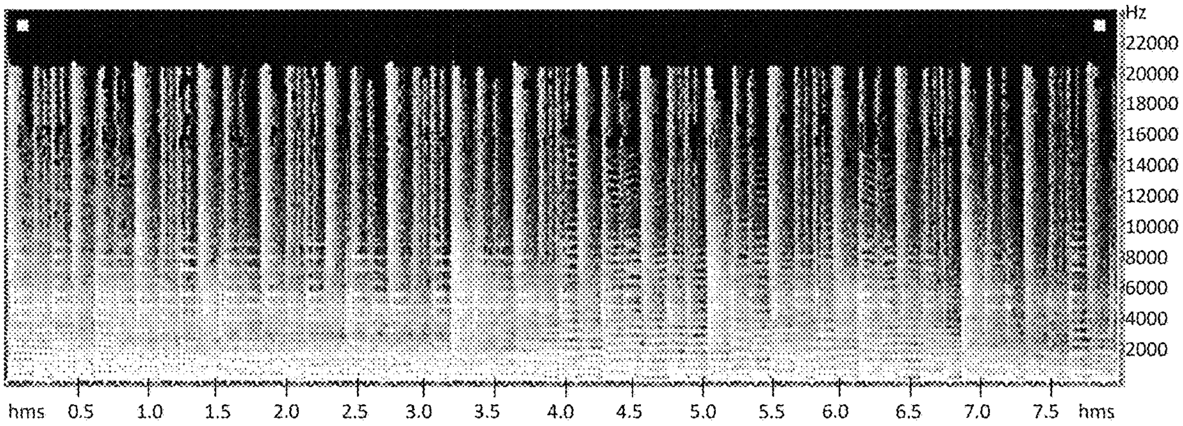
Fig. 4.7

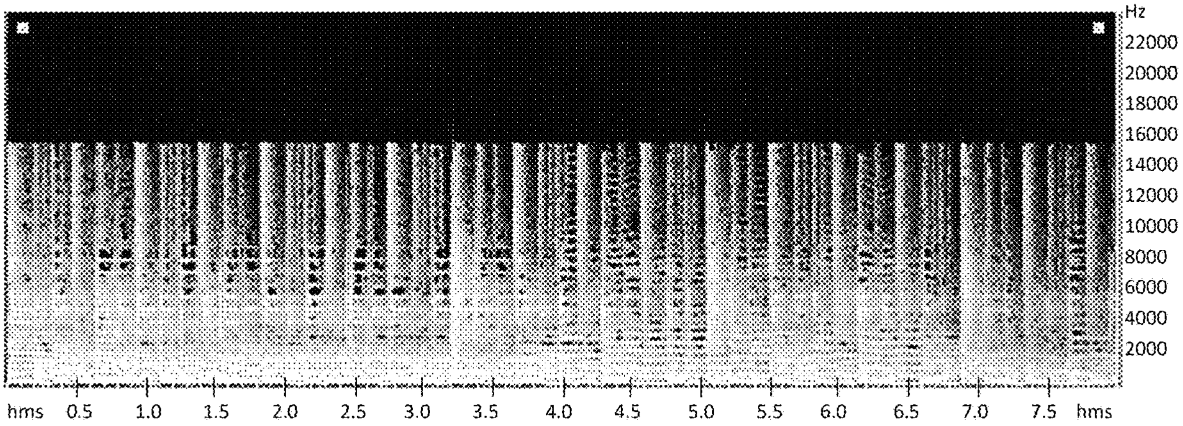
Fig. 4.8
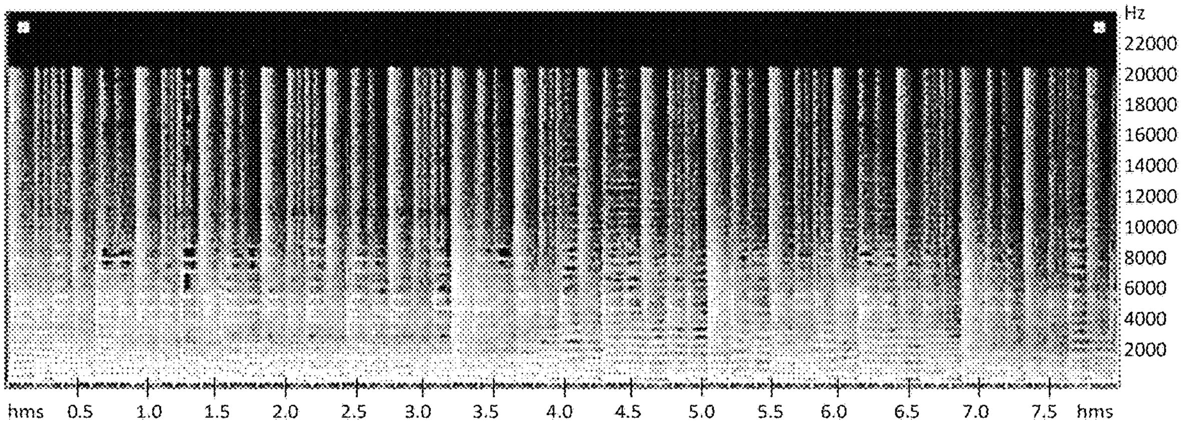
Fig. 4.9
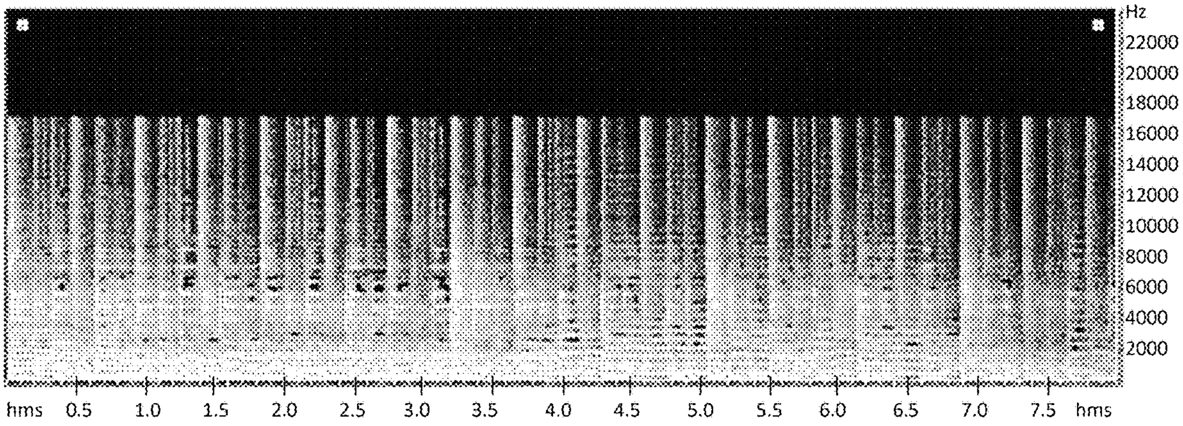
Fig. 4.10

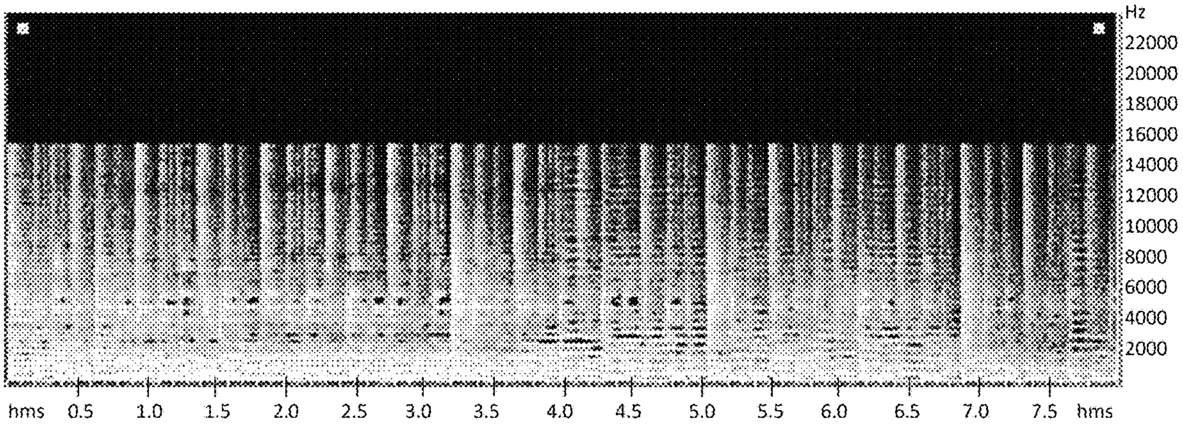
Fig. 4.11
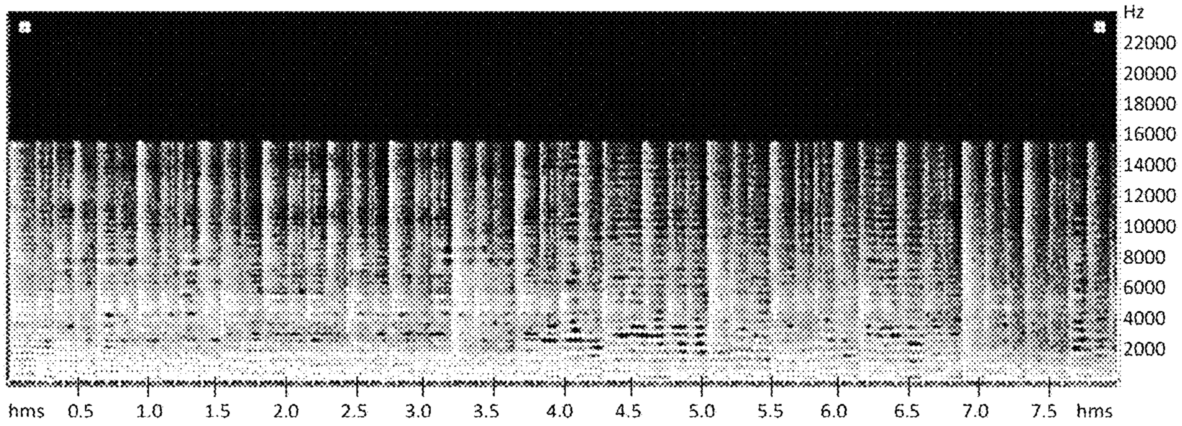
Fig. 4.12
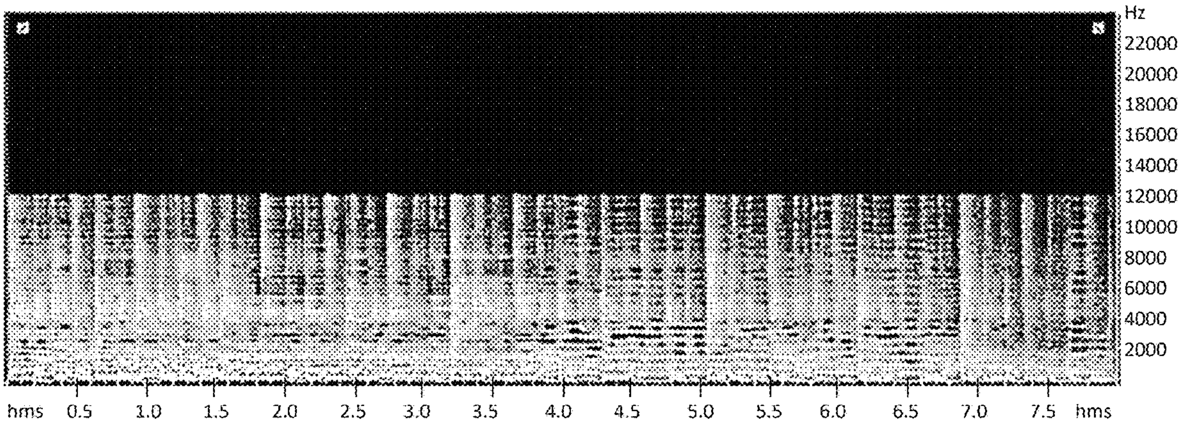
Fig. 4.13

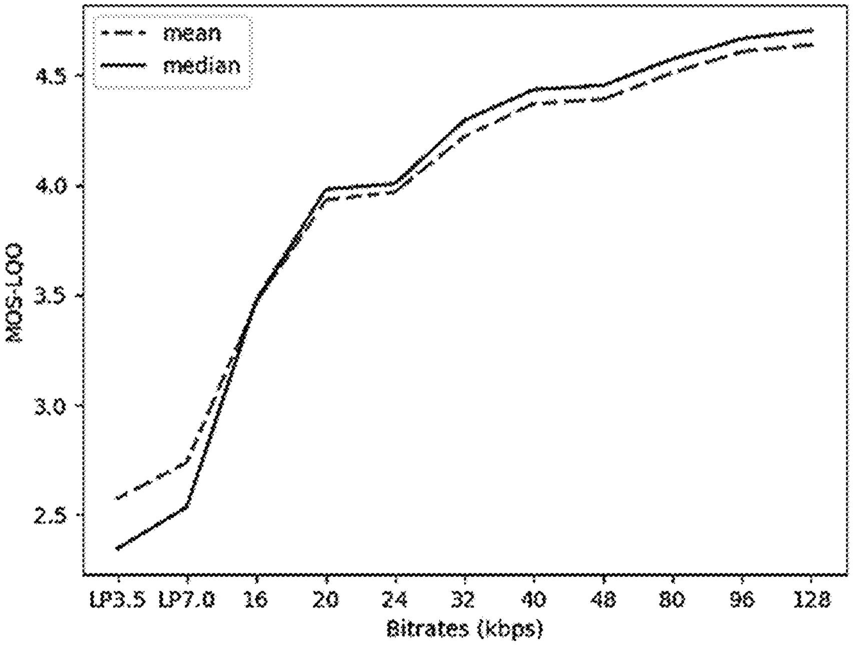
Fig. 4.14
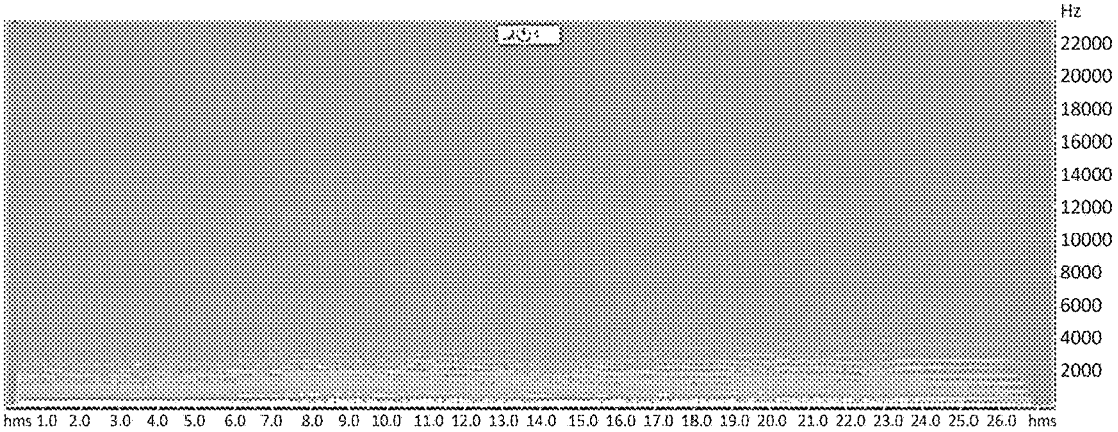
Fig. 4.15
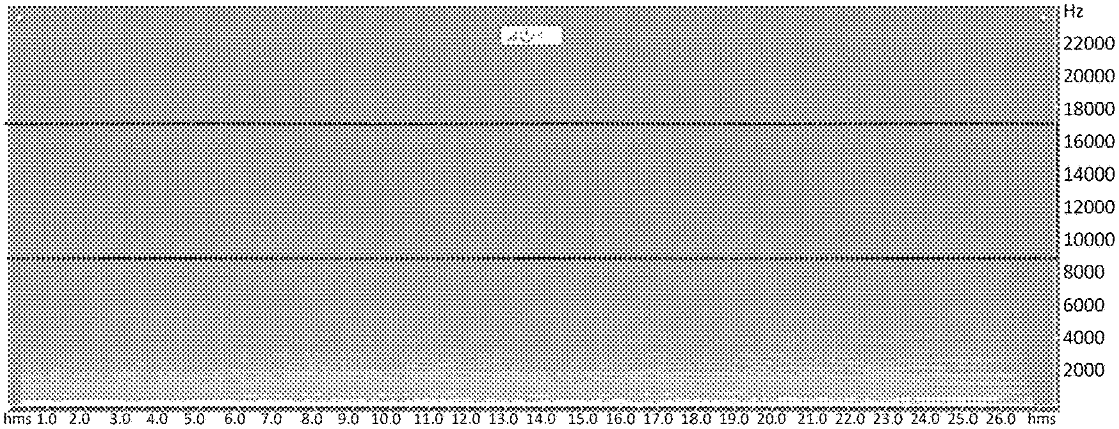
Fig. 4.16

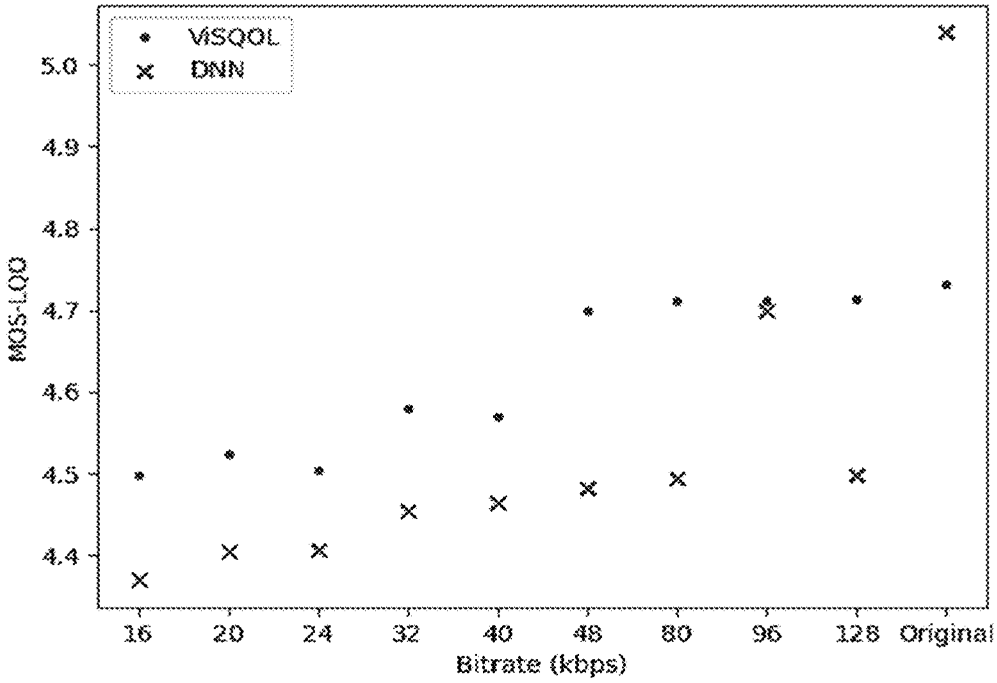
Fig. 5.1
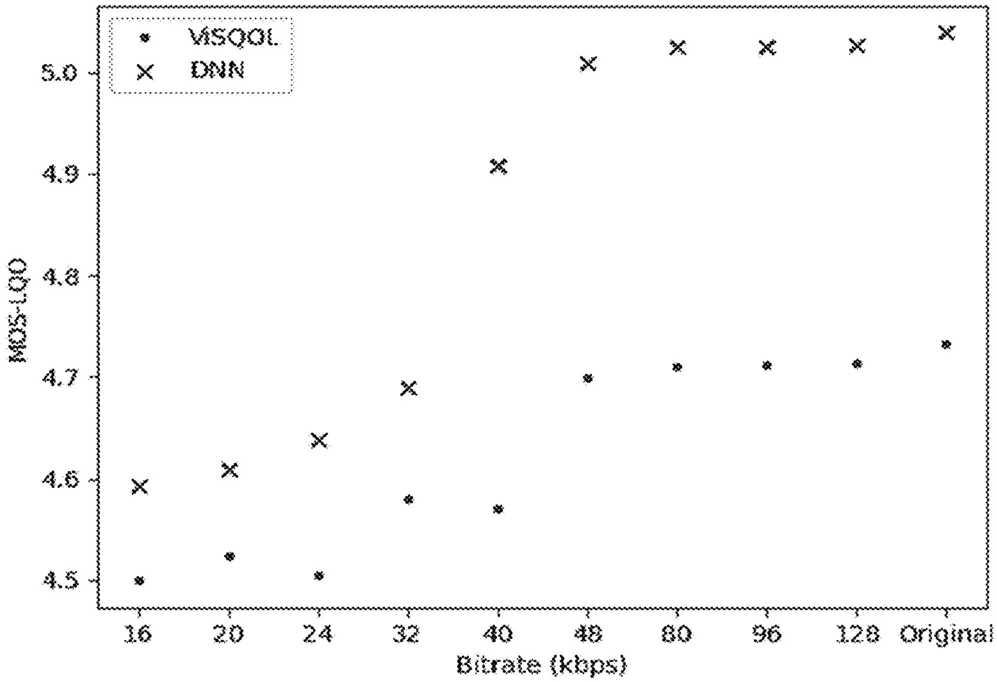
Fig. 5.2

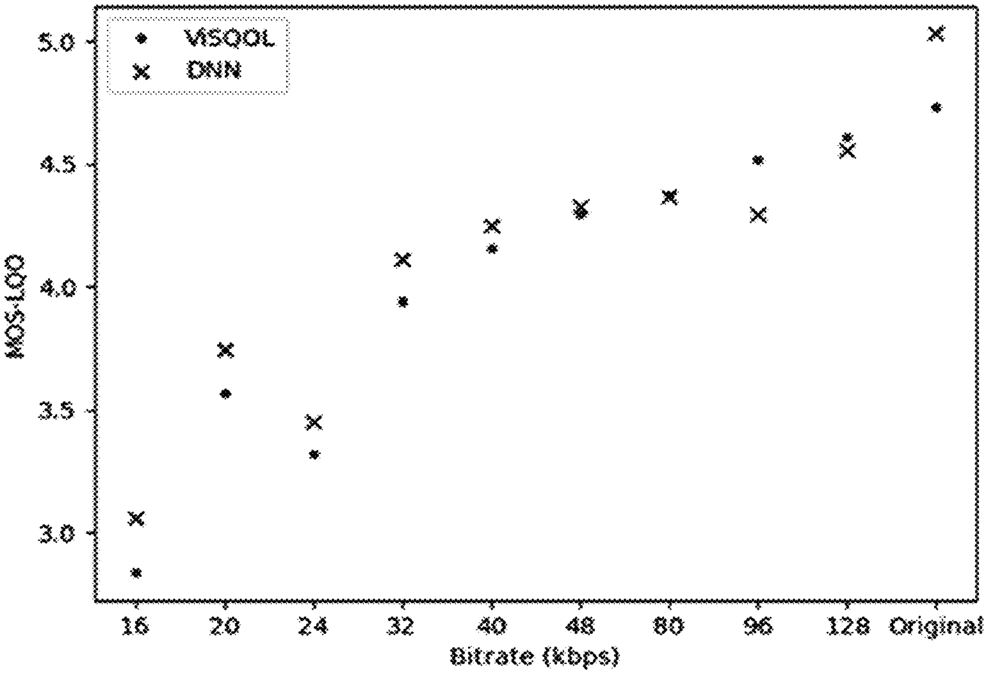
Fig. 6.1
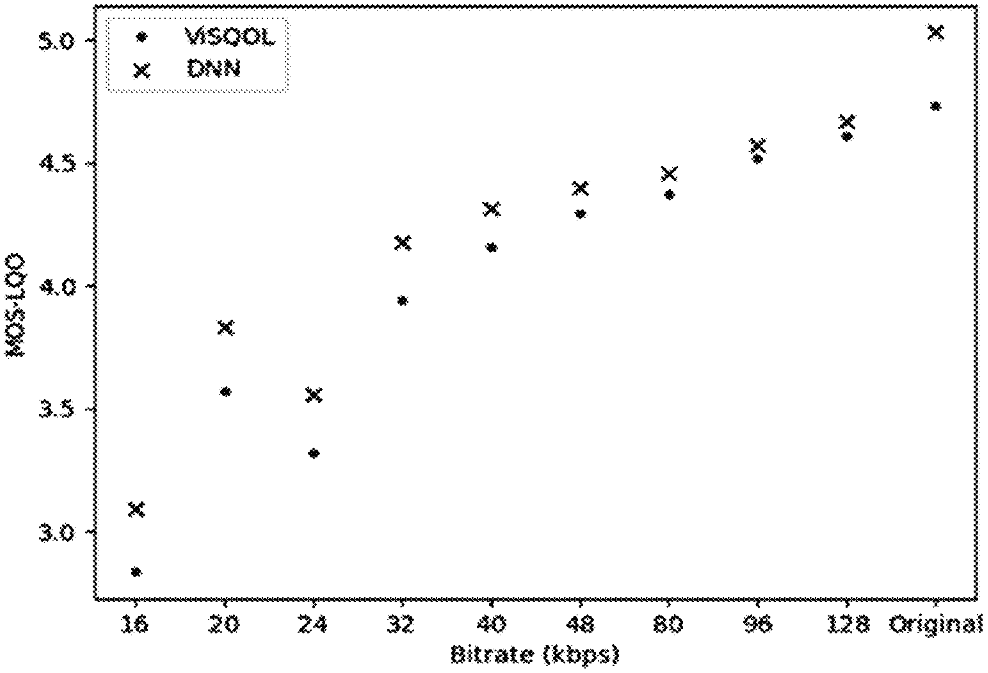
Fig. 6.2

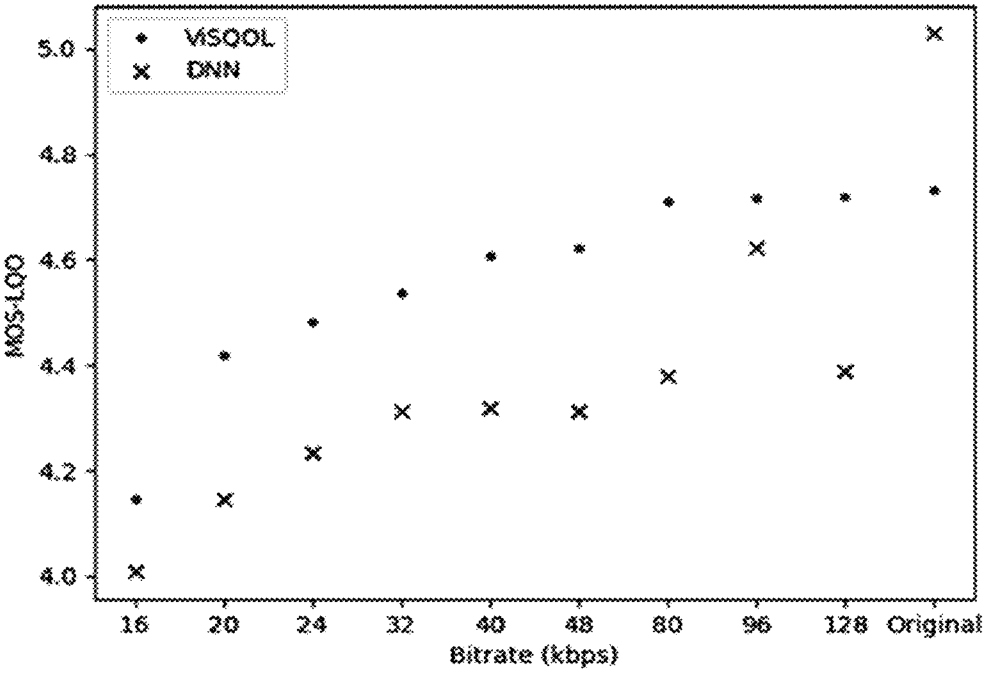
Fig. 6.3
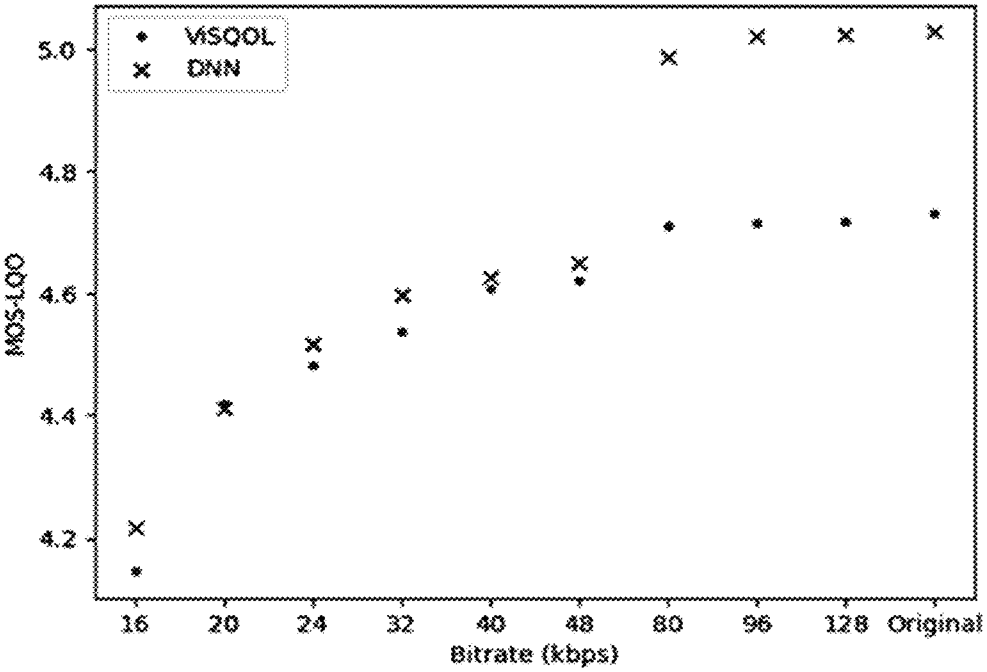
Fig. 6.4

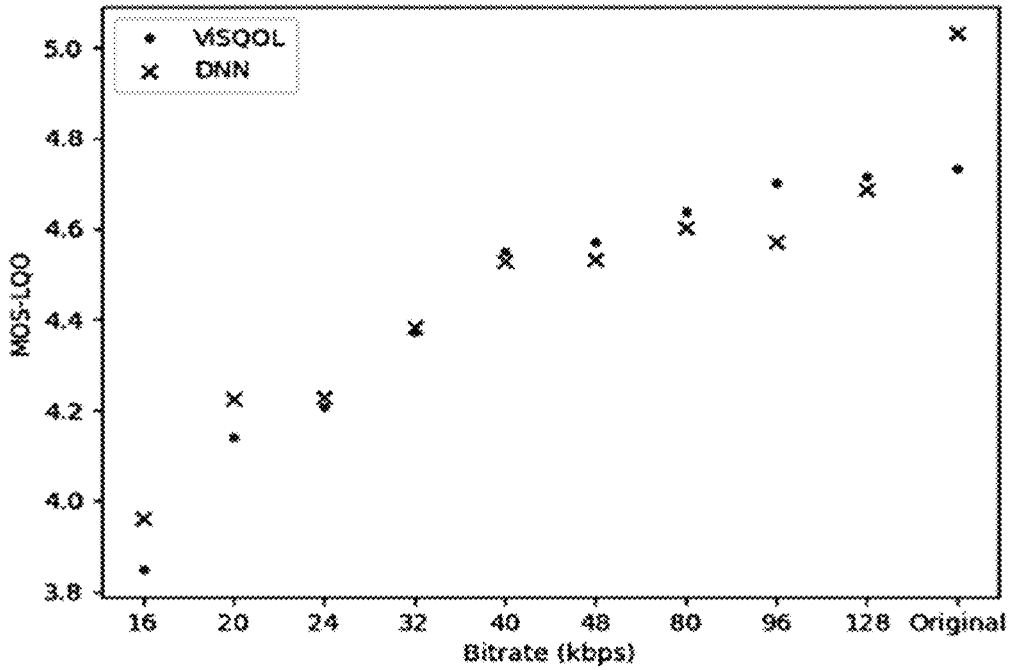
Fig. 6.5
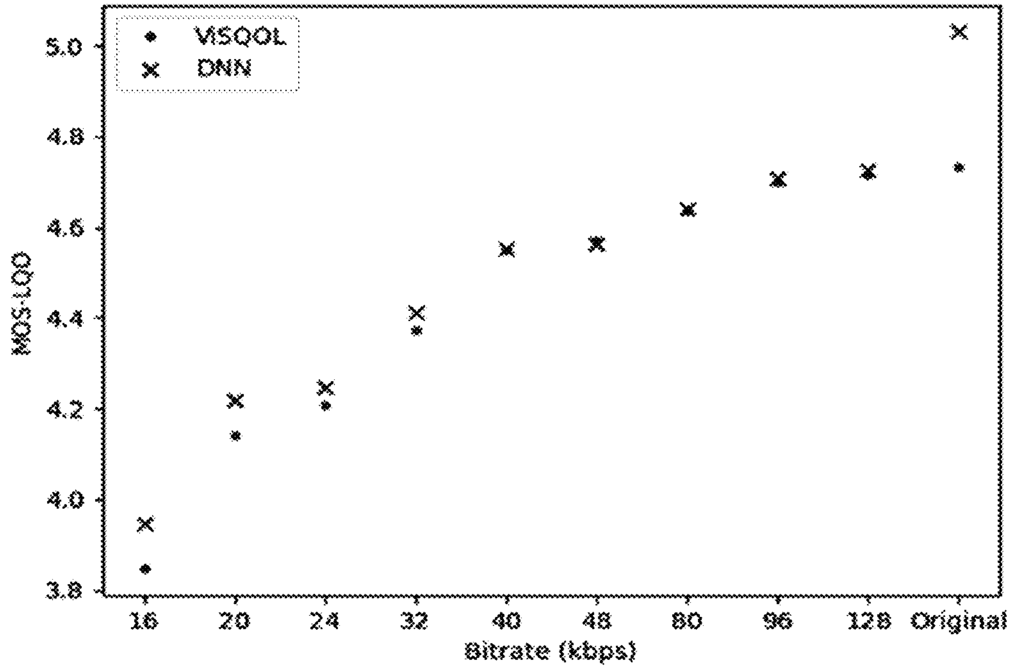
Fig. 6.6

| TYPE OF RNN | ILLUSTRATION | EXAMPLE |
| --- | --- | --- |
| ONE-TO-MANY, $T_x = 1$, $T_y > 1$ | 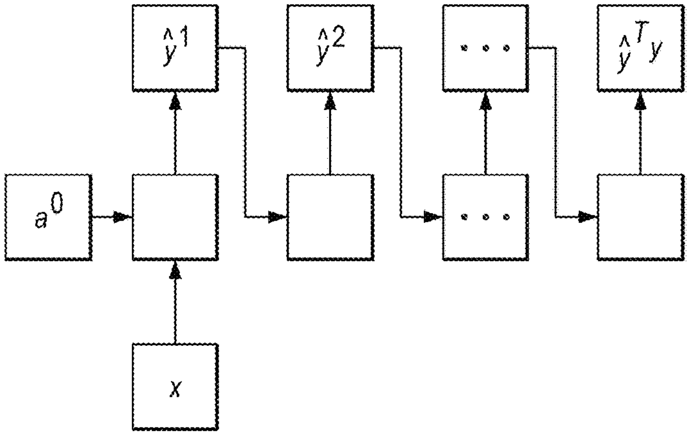  | MUSIC GENERATION |
| MANY-TO-ONE, $T_x > 1$, $T_y = 1$ | 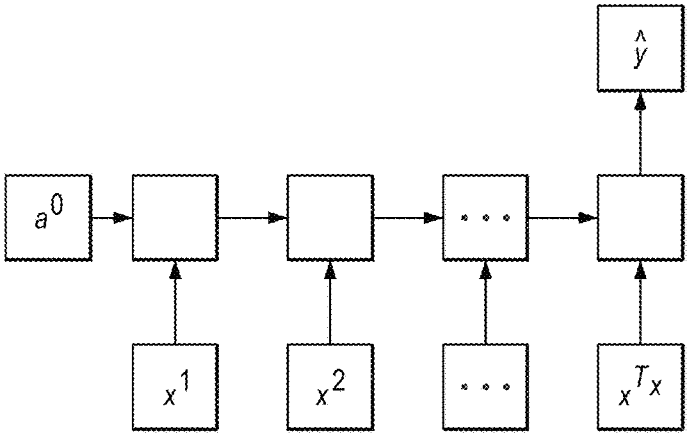  | SENTIMENT CLASSIFICATION |
| MANY-TO-MANY, $T_x = T_y$ | 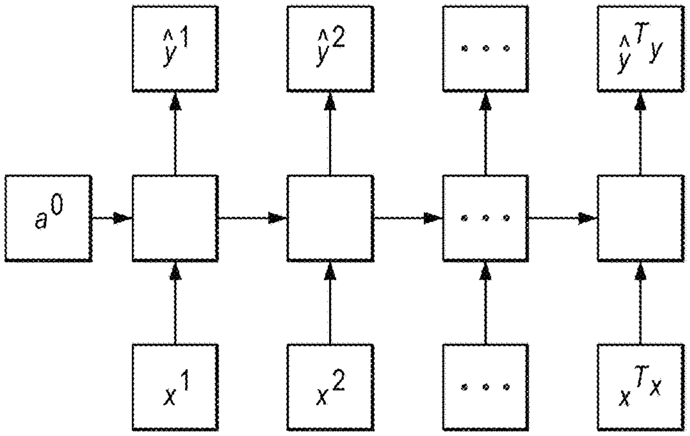  | NAME ENTITY RECOGNITION |
FIG. 7.1

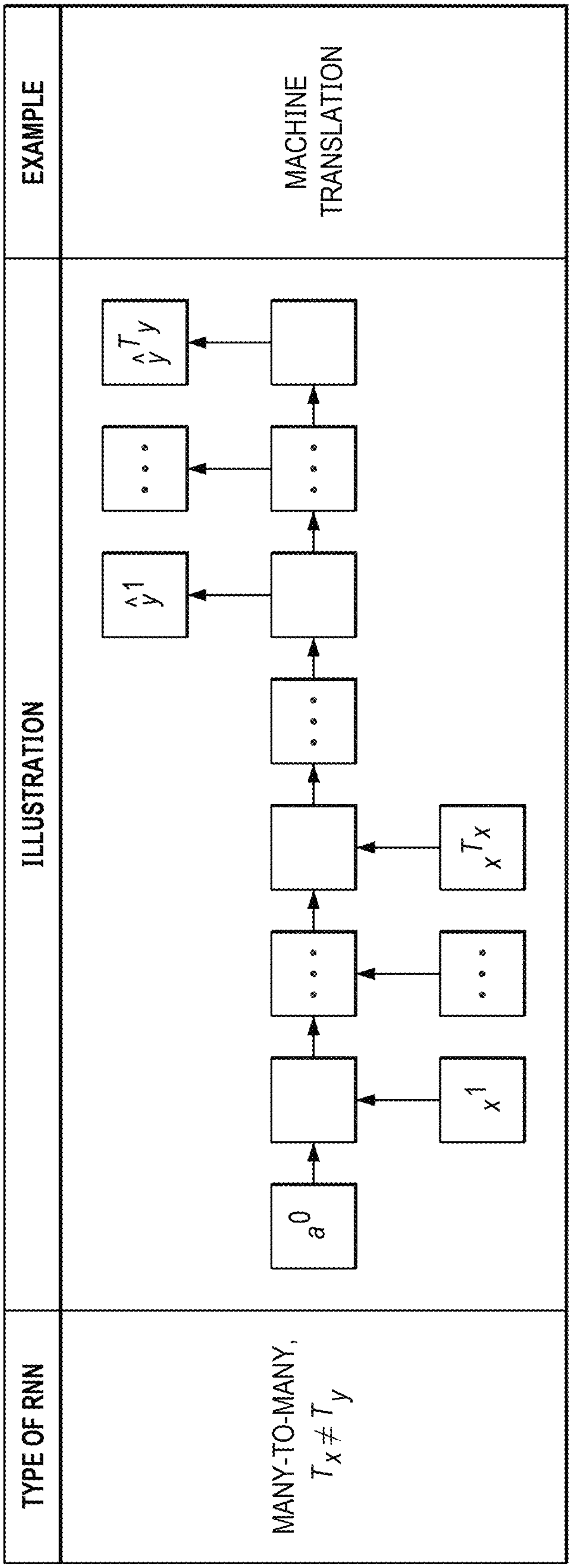
FIG. 7.2

ROBUST INTRUSIVE PERCEPTUAL AUDIO QUALITY ASSESSMENT BASED ON CONVOLUTIONAL NEURAL NETWORKS

CROSS-REFERENCE TO RELATED APPLICATION

This application is a U.S. National Stage application under U.S.C. 371 of International Application No. PCT/EP2021/083531, filed on 30 Nov. 2021 (reference: D20118WO01), which claims priority to U.S. provisional application 63/119,318 (reference: D20118USP1), filed 30 Nov. 2020, each of which is incorporated by reference in its entirety.

TECHNICAL FIELD

The present disclosure relates generally to a computer-implemented deep-learning-based system for determining an indication of an audio quality of an input audio frame. In particular, the system comprises at least one inception block and at least one fully connected layer. The present disclosure relates further to respective methods of operating a computer-implemented deep-learning-based system for determining an indication of an audio quality of an input audio frame of a mono audio signal or a stereo audio signal and to respective methods of training said system.

BACKGROUND

Audio quality perceived by human is a core performance metric in many audio and multimedia networks and devices, such as voice over internet protocol (VoIP), digital audio broadcasting (DAB) systems and streaming services. Steady, continuous and fast transmission of audio files from a server to a remote client is bounded by many technical restrictions, such as limited bandwidth, congested network or overloaded client devices. An audio codec is a computer program designed to encode and decode a digital audio stream. To be more precise, it compresses and decompresses digital audio data to and from a compressed format with the help of codec algorithms. Audio codec intends to reduce the storage space and bandwidth while keeping a high-fidelity of broadcast or transmitted signals. Due to the lossy compression methods the audio quality could be to some extent noticeably inferior and affect the user experience. In order to authentically reflect the audio quality that a human has perceived, listening tests for audio excerpts rated by a group of trained listeners are conducted and the resulting average scores represent the quality of corresponding audio excerpts.

However, listening tests for a huge amount of audio files are impossible to perform because it is a tedious work and requires the involvement of more experienced manpower to perform the repetitive work.

Algorithms and techniques are sought by engineers to refrain from heavy workload of listening tests. The audio quality evaluation methods can be roughly categorized into objective and subjective methods. Subjective method usually refers to listening tests and objective evaluations are the numerical measures by machines and devices and are a computational proxy for listening tests. Classic objective audio quality assessment methods such as Perceptual Evaluation of Audio Quality (PEAQ), Perceptual Objective Listening Quality Analysis (POLQA), and the Virtual Speech Quality Objective Listener (ViSQOL) are designed for specific sound codecs i.e., speech or audio codec, and/or specific bitrate operating points. These objective methods share a common problem that they would become obsolete with the emergence of new scenarios. For instance, service providers constantly update their codecs to optimize encoding and decoding process. Under these circumstances, the codec alteration needs to be frequently validated by performing subjective or objective tests. However, massive listening tests are impractical and objective evaluation of a targeted specific codec or bitrate could be beyond the scope of their capacity. Deep learning approaches offer a new perspective to derive an audio quality assessment model that is both accurate, rapidly re-trainable and easily expandable to new scenarios and applications.

SUMMARY

In accordance with a first aspect of the present disclosure there is provided a computer-implemented deep-learning-based system for determining an indication of an audio quality of an input audio frame. The system may comprise at least one inception block configured to receive at least one representation of an input audio frame and to map the at least one representation of the input audio frame into a feature map. And the system may comprise at least one fully connected layer configured to receive a feature map corresponding to the at least one representation of the input audio frame from the at least one inception block, wherein the at least one fully connected layer is configured to determine the indication of the audio quality of the input audio frame. The at least one inception block may comprise a plurality of parallel paths of convolutional layers, wherein at least one parallel path includes a convolutional layer with an m×n sized kernel, wherein the integer m is different from the integer n.

In some embodiments, the at least one representation of the input audio frame may correspond to a gammatone spectrogram with a first axis representing time and a second axis representing frequency.

In some embodiments, the plurality of parallel paths of convolutional layers may include at least one convolution layer with a horizontal kernel and at least one convolutional layer with a vertical kernel.

In some embodiments, the horizontal kernel may be an m×n sized kernel with m>n, so that the horizontal kernel may be configured to probe temporal dependencies of the input audio frame.

In some embodiments, the vertical kernel may be an m×n sized kernel with m<n, so that the vertical kernel may be configured to probe timbral dependencies of the input audio frame.

In some embodiments, the at least one inception block may further comprise a path with a pooling layer.

In some embodiments, the pooling layer may comprise an average pooling.

In some embodiments, the system may further comprise at least one squeeze-and-excitation, SE, layer.

In some embodiments, the squeeze-and-excitation layer may follow a last convolutional layer of the plurality of parallel paths of convolutional layers of the at least one inception block.

In some embodiments, the squeeze-and-excitation layer may comprise a convolutional layer, two fully connected layers and sigmoid activation.

In some embodiments, in the squeeze-and excitation layer, the convolutional layer followed by a scaling operation with the two fully connected layers may generate a respective attention weight for each channel of the feature map output by the at least one inception block, and may apply said attention weights to the channels of the feature map and may perform concatenation of the weighted channels.

In some embodiments, the system may comprise two or more inception blocks and two or more squeeze-and-excitation layers, and the inception blocks and the squeeze-and excitation layers may be alternately arranged.

In some embodiments, the input audio frame may be derived from a mono audio signal, and the at least one representation of the input audio frame may comprise a representation of a clean reference input audio frame and a representation of a degraded input audio frame.

In some embodiments, the input audio frame may be derived from a stereo audio signal comprising a left channel and a right channel, and the at least one representation of the input audio frame may comprise for each of a middle channel, a side channel, a left channel and a right channel a representation of a clean reference input audio frame and a representation of a degraded input audio frame, the middle and side channel corresponding to a sum and a difference of the left and right channels.

In some embodiments, the indication of the audio quality may comprise at least one of a mean opinion score, MOS, and a multiple stimuli with hidden reference and anchor, MUSHRA.

In some embodiments, the at least one fully connected layer may comprise a feed forward neural network.

In accordance with a second aspect of the present disclosure there is provided a method of operating a computer-implemented deep-learning-based system for determining an indication of an audio quality of an input audio frame of a mono audio signal, wherein the system comprises at least one inception block and at least one fully connected layer. The method may include the step of receiving, by the at least one inception block, at least one representation of the input audio frame of the mono audio signal comprising a representation of a clean reference input audio frame of the mono audio signal and a representation of a degraded input audio frame of the mono audio signal. The method may further include the step of mapping, by the at least one inception block, the at least one representation of the input audio frame into a feature map. And the method may include the step of predicting, by the at least one fully connected layer, the indication of the audio quality of the input audio frame based on the feature map.

In some embodiments, the indication of the audio quality may comprise at least one of a mean opinion score, MOS, and a multiple stimuli with hidden reference and anchor, MUSHRA.

In some embodiments, the system may further comprise at least one squeeze-and-excitation layer subsequent to the inception block and the method may further comprise applying, by the squeeze-and-excitation layer, respective attention weights to the channels of the feature map output by the at least one inception block.

In some embodiments, the at least one inception block may comprise a plurality of parallel paths of convolutional layers, and at least one parallel path may include a convolutional layer with an m×n sized kernel, wherein the integer m may be different from the integer n.

In accordance with a third aspect of the present disclosure there is provided a method of operating a computer-implemented deep-learning-based system for determining an indication of an audio quality of an input audio frame of a stereo audio signal, wherein the system comprises at least one inception block and at least one fully connected layer. The method may include the step of receiving, by the at least one inception block, at least one representation of the input audio frame comprising for each of a middle channel, a side channel, a left channel and a right channel a representation of a clean reference input audio frame and a representation of a degraded input audio frame, the middle and side channel corresponding to a sum and a difference of the left and right channels. The method may further include the step of mapping, by the at least one inception block, the at least one representation of the input audio frame into feature maps. And the method may include the step of predicting, by the at least one fully connected layer, the indication of the audio quality of the input audio frame based on the feature maps.

In some embodiments, the indication of the audio quality may comprise at least one of a mean opinion score, MOS, and a multiple stimuli with hidden reference and anchor, MUSHRA.

In some embodiments, the system may further comprise at least one squeeze-and-excitation layer subsequent to the inception block and the method may further comprise applying, by the squeeze-and-excitation layer, respective attention weights to the channels of the feature map output by the at least one inception block.

In some embodiments, the at least one inception block may comprise a plurality of parallel paths of convolutional layers, and at least one parallel path may include a convolutional layer with an m×n sized kernel, wherein the integer m may be different from the integer n.

In some embodiments, the method may further include prior to receiving the at least one representation of the input audio frame, receiving one or more weight coefficients of at least one inception block that had been obtained for a computer-implemented deep-learning-based system for determining an indication of an audio quality of an input audio frame of a mono audio signal and initializing one or more weight coefficients of the at least one inception block based on said received one or more weight coefficients.

In accordance with a fourth aspect of the present disclosure there is provided a method of training a computer-implemented deep-learning-based system for determining an indication of an audio quality of an input audio frame, wherein the system comprises at least one inception block and at least one fully connected layer. The method may include the step of receiving, by the at least one inception block, at least one representation of an input audio frame of an audio training signal comprising a representation of a clean reference input audio frame of the audio training signal and a representation of a degraded input audio frame of the audio training signal. The method may further include the step of mapping, by the at least one inception block, the at least one representation of the input audio frame of the audio training signal into a feature map. The method may further include the step of predicting, by the at least one fully connected layer, the indication of the audio quality of the input audio frame of the audio training signal based on the feature map. And the method may include the step of tuning one or more parameters of the computer-implemented deep-learning based system based on a comparison of the predicted indication of the audio quality and an actual indication of the audio quality.

In some embodiments, the comparison of the predicted indication of the audio quality and the actual indication of the audio quality may be based on a smooth L1 loss function.

In accordance with a fifth aspect of the present disclosure there is provided a method of training a computer-implemented deep-learning-based system for determining an indication of an audio quality of an input audio frame of a stereo audio training signal, wherein the system comprises at least one inception block and at least one fully connected layer. The method may include the step of initializing one or more weight coefficients of the at least one inception block based on one or more weight coefficients that had been obtained for at least one inception block of a computer-implemented deep-learning-based system for determining an indication of an audio quality of an input audio frame of a mono audio training signal. The method may further include the step of receiving, by the at least one inception block, at least one representation of an input audio frame of a stereo audio training signal comprising for each of a middle channel, a side channel, a left channel and a right channel a representation of a clean reference input audio frame and a representation of a degraded input audio frame, the middle and side channel corresponding to a sum and a difference of the left and right channels. The method may further include the step of mapping, by the at least one inception block, the at least one representation of the input audio frame of the stereo audio training signal into feature maps. The method may further include the step of predicting, by the at least one fully connected layer, the indication of the audio quality of the input audio frame of the stereo audio training signal based on the feature maps. And the method may include the step of tuning one or more parameters of the computer-implemented deep-learning based system based on a comparison of the predicted indication of the audio quality and an actual indication of the audio quality.

In some embodiments, the comparison of the predicted indication of the audio quality and the actual indication of the audio quality may be based on a smooth L1 loss function.

According to a further aspect, there is presented a deep-learning-based system for determining an indication of an audio quality of an input audio frame. The system may include at least one inception block configured to receive at least one representation of an input audio frame and map the at least one representation of the input audio frame into a feature map, where the at least one inception block may include a plurality of stacked convolutional layers configured to operate in parallel paths. The at least one convolutional layer of the plurality of stacked convolutional layers may include an m×n sized kernel, wherein the integer m may be different than the integer n. The system may further include at least one fully connected layer configured to receive a feature map corresponding to the at least one representation of the input audio frame from the at least one inception block, where the at least one fully connected layer may be configured to determine the indication of the audio quality of the input audio frame.

In some instances, the plurality of stacked convolutional layers may include at least one convolution layer comprising a horizontal kernel and at least one convolutional layer comprising a vertical kernel.

In some instances, the horizontal kernel may be configured to learn temporal dependencies of the input audio frame.

In some instances, the vertical kernel may be configured to learn timbrel dependencies of the input audio frame.

In some instances, the inception block further includes a squeeze-and-excitation (SE) layer.

In some instances, the squeeze-and-excitation layer may be applied after the last stacked convolutional layer of the plurality of stacked convolutional layers.

In some instances, the inception block further includes a pooling layer.

In some instances, the at one representation of an input audio frame includes a representation of a clean reference input audio frame and a representation of a degraded input audio frame.

In some instances, the indication of the audio quality comprises at least one of a mean opinion score, MOS, or a multiple stimuli with hidden reference and anchor, MUSHRA.

In some instances, the at least one fully connected layer includes a feed forward neural network.

According to a still further aspect, there is presented a method for operating a deep-learning-based system for determining an indication of an audio quality of an input audio frame is also presented, where the system includes at least one inception block and at least one fully connected layer. The method may include mapping, by the at least one inception block, the input audio frame into a feature map, and predicting, by the at least one fully connected layer, the indication of the audio quality of the input audio frame based on the feature map.

In some instances, the at least one representation of the input audio frame comprises a representation of a clean reference input audio frame and a representation of a degraded input audio frame.

In some instances, the indication of the audio quality comprises at least one of a mean opinion score, MOS, or a multiple stimuli with hidden reference and anchor, MUSHRA.

The methods described herein may be implemented as computer program products comprising a computer-readable storage medium with instructions adapted to cause a device to carry out the respective methods.

BRIEF DESCRIPTION OF THE DRAWINGS

Example embodiments of the disclosure will now be described, by way of example only, with reference to the accompanying drawings in which:

FIG. 1.1 illustrates an example of a workflow of a ViSQOL v3 system.

FIG. 1.2 illustrates an example a workflow of a ViSQOL v3 system (left) and an example of a workflow of an InceptionSE model (right) in case of a mono audio signal as input.

FIG. 1.3 illustrates an example of a workflow of an InceptionSE model in case of a mono audio signal as input (left) and an example of a workflow of an InceptionSE model in case of a stereo audio signal as input (right).

FIG. 1.4 illustrates an example of a method of operating a computer-implemented deep-learning-based system for determining an indication of an audio quality of an input audio frame of a mono audio signal, wherein the system comprises at least one inception block and at least one fully connected layer.

FIG. 1.5 illustrates an example of a method of training a computer-implemented deep-learning-based system for determining an indication of an audio quality of an input audio frame, wherein the system comprises at least one inception block and at least one fully connected layer.

FIG. 1.6 illustrates an example of a method of operating a computer-implemented deep-learning-based system for determining an indication of an audio quality of an input audio frame of a stereo audio signal, wherein the system comprises at least one inception block and at least one fully connected layer.

FIG. 1.7 illustrates an example of a method of training a computer-implemented deep-learning-based system for determining an indication of an audio quality of an input audio frame of a stereo audio training signal, wherein the system comprises at least one inception block and at least one fully connected layer.

FIGS. 2.1 to 2.5 illustrate schematically an example of convolution with square shaped kernels.

FIG. 2.6 illustrates schematically an example of convolution with a horizontal kernel with stride (2,2).

FIG. 2.7 illustrates schematically an example of convolution with a vertical kernel with stride (2;1).

FIGS. 2.8 to 2.10 illustrate examples of activation functions: rectified linear unit (ReLU, 2.8), sigmoid function (2.9) and hyperbolic tangent function (tanh, 2.10).

FIG. 2.11 illustrates schematically an example of non-overlapping pooling.

FIG. 2.12 illustrates schematically an example of overlapping pooling.

FIG. 2.13 illustrates schematically an example of a fully connected layer for classification.

FIG. 2.14 illustrates schematically an example of a fully connected layer for regression.

FIGS. 2.15 and 2.16 illustrate schematically an example of the procedure of dropout.

FIG. 2.17 illustrates schematically an example of an unrolled recurrent neural network.

FIG. 2.18 illustrates schematically an example of a long-short term memory unit.

FIGS. 2.19 and 2.20 illustrate schematically the basic structure of self-attention by a simple example of a sentence.

FIG. 2.21 illustrates schematically an example of core operations in a squeeze-and-excitation layer.

FIG. 2.22 illustrates schematically an example of a naive inception block.

FIG. 2.23 illustrates schematically an example of an improved version of an inception block.

FIG. 2.24 illustrates schematically an example of an inception block with rectangular kernels.

FIG. 3.1 illustrates schematically an example of a CNN Model (vanilla).

FIG. 3.2A to 3.2D are to be combined in this order to illustrate schematically an example of an Inception model (naive).

FIG. 3.3A to 3.3D are to be combined in this order to illustrate schematically an example of an Inception model without head layer.

FIG. 3.4A to 3.4F are to be combined in this order to illustrate schematically an example of an InceptionSE model (naive).

FIG. 3.5A to 3.5F are to be combined in this order to illustrate schematically an example of an InceptionSE model without head layer.

FIG. 4.1 illustrates schematically an example of a pipeline of data generation and labeling.

FIG. 4.2 illustrates a gammatone spectrogram example of 01 Angry Mono.

FIG. 4.3 illustrates a MOS-LQO score distribution in a training dataset.

FIG. 4.4 illustrates an average MOS-LQO score based on bitrates in a training dataset.

FIG. 4.5 illustrates a spectrogram of original WADmus047 sample.

FIG. 4.6 illustrates a spectrogram of WADmus047 coded at 128 kbps.

FIG. 4.7 illustrates a spectrogram of WADmus047 coded at 96 kbps.

FIG. 4.8 illustrates a spectrogram of WADmus047 coded at 64 kbps.

FIG. 4.9 illustrates a spectrogram of WADmus047 coded at 48 kbps.

FIG. 4.10 illustrates a spectrogram of WADmus047 coded at 32 kbps.

FIG. 4.11 illustrates a spectrogram of WADmus047 coded at 24 kbps.

FIG. 4.12 illustrates a spectrogram of WADmus047 coded at 20 kbps.

FIG. 4.13 illustrates a spectrogram of WADmus047 coded at 16 kbps.

FIG. 4.14 illustrates an average MOS-LQO score based on bitrates in a modified training dataset.

FIG. 4.15 illustrates a spectrogram of original CO 02 OMensch.

FIG. 4.16 illustrates a spectrogram of CO 02 OMensch coded at high bitrate.

FIG. 5.1 illustrates a prediction of sc01 (trumpet) when trained without noise and silence.

FIG. 5.2 illustrates a prediction of sc01 (trumpet) when trained with noise and silence.

FIG. 6.1 illustrates a prediction of 09-Applaus-5-1 2 0 trained without noise and silence.

FIG. 6.2 illustrates a prediction of 09-Applaus-5-1 2 0 trained with noise and silence.

FIG. 6.3 illustrates a prediction of KoreanM1 trained without noise and silence.

FIG. 6.4 illustrates a prediction of KoreanM1 trained with noise and silence.

FIG. 6.5 illustrates a prediction of SpeechOverMusic 1 trained without noise and silence.

FIG. 6.6 illustrates a prediction of SpeechOverMusic 1 trained with noise and silence.

FIG. 7.1 illustrates applications of RNNs.

FIG. 7.2 illustrates applications of RNNs.

DETAILED DESCRIPTION

Subjective Quality Evaluation Metrics

Mean opinion score (MOS) is a standardized measure used in Quality of Experience (QoE). It is expressed as a rational number on a scale from 1 to 5, where 1 represents the lowest perceived quality and 5 represents the highest perceived quality. Another ITU-R Recommendation methodology in codec listening tests is MUltiple Stimuli with Hidden Reference and Anchor (MUSHRA). The intuitive difference from MOS is that MUSHRA scales from 0 (bad) to 100 (excellent) and allows participants to rate these audio excerpts with small difference. In addition, MUSHRA requires fewer listeners to obtain statistically significant results compared to MOS. Listeners are presented with the reference, some anchors, and a set of test samples. A low-range and a mid-range anchors are recommended to be included in the listening tests, which are typically a 3.5 kHz and a 7.0 kHz low-pass filtered reference signals. The purpose of anchors and reference is to calibrate the scale when comparing results across different researches. MUSHRA is used in subjective listening tests and MOS scores are used to evaluate the QoE in POLQA and ViSQOL.

Objective Quality Evaluation Tools

Objective audio quality evaluation can be classified as either parameter-based or signal-based. Parameter-based models predict quality by modeling characteristics of a transmission channel of audio, such as packet loss rate and delay jitters.

Signal-based models estimate quality based on information taken from signals rather than the medium of their transmission. Signal-based methods can be further divided into intrusive and non-intrusive, i.e., with or without a clean reference signal. In non-intrusive approaches, the algorithms take in only degraded or contaminated signals for evaluating the excerpt quality.

While intrusive algorithms take both clean reference and the degraded signals as input, and the correlation between reference and degraded signals is taken into consideration in the algorithm. Intrusive methods are considered to be more accurate than non-intrusive methods.

PEAQ, POLQA, PEMO-Q and ViSQOL are four examples of such intrusive models, which are used to rate the quality of full-band coded audio.

Early intrusive models focus mainly on speech and narrow frequency bands. PESQ evaluates broader frequency bands of speech and fixed the weakness of its predecessor. POLQA as the successor of PESQ has extended to super-wideband (50-14000 Hz) speech excerpts. PEAQ on the contrary is designed for evaluating encoded audio. However, the output of PEAQ is a set of variables and coefficients rather than an intuitive score such as MOS. This set of coefficients and variables is then inputted into a machine learning model to get a distortion index. This distortion index is mapped to an Objective Difference Grade (ODG), where the grade 1 represents very annoying and 5 represents imperceptible quality degradation. PEMO-Q is also a perceptually motivated intrusive model that computes an error estimation including three components: distortion, interference and artifact. The weights of these components are mapped to generate an Overall Perception Score (OPS) ranging from very bad 0 to excellent quality 100.

ViSQOL is a speech quality evaluation model that was later adapted to audio quality evaluation (ViSQOLAudio). In short, ViSQOL takes in both the coded, degraded signals and its corresponding original reference and predicts Mean Opinion Score-Listening Quality Objective (MOS-LQO) scores for those degraded signals. The latest version, ViSQOL v3, which is illustrated in FIG. 1.1, is a combined release of old ViSQOL and ViSQOLAudio.

The basic structure of ViSQOL consists of four phases: pre-processing, pairing, comparison and mapping from similarity to quality. In the pre-processing stage, the mid-channel is extracted from the reference and degraded signals considering that input audio could be either stereo or mono. A global alignment such as removing the initial zero padding in the signals is then performed and gammatone spectrograms with 32 bands and a minimum frequency of 50 Hz are extracted from the reference and degraded signals, respectively. In pairing stage, reference signals are first segmented into consecutive patches, which is composed of 30 frames and each frame is 20 ms long. The degraded signals are scanned frame by frame to look for a set of most similar patch-pairs between the reference and degraded signals. In comparison stage, the similarity score of each patch-pair across every frequency band is measured and averaged per frequency band and patch, which creates a Neurogram Similarity Index Measure (NSIM) score. This NSIM score is then in the mapping phase fed to a support vector regression (SVR) model that outputs a corresponding MOS-LQO value. The new version of ViSQOL v3 contains incremental improvements to the existing old framework and is re-implemented in C++. It unites the old ViSQOL for speech and ViSQOLAudio by sharing most of the common components. The ViSQOL v3 system is shown in FIG. 1.1 with the newly added components emphasized by thick edges.

Despite the fact that previous versions of ViSQOL have included two levels of alignment (global and patch), there were still issues with the patch alignment due to the spectrogram frames being misaligned at a fine scale. ViSQOL v3 introduces an additional alignment step to address this issue. Furthermore, ViSQOL v3 also introduces silence thresholds on the gammatone spectrogram. ViSQOL was too sensitive to different levels of ambient noise and these silence and low-level ambient noise excerpts would be rated with a low MOS-LQO, despite being perceptually inaudible to human. This silence threshold introduces an absolute floor which filters interference signals such as noise and silence.

In a conclusion, ViSQOL achieves a high and stable performance for all items overall. Its degradation index NSIM is so far the best performing feature compared with the degradation indices of PEMO-Q and PEAQ, because ViSQOL NSIM presents the most balanced and high performance for all signal categories. Furthermore, all objective measures except for ViSQOL showed a weak correlation against subjective scores. However, ViSQOL does not propose a solution to evaluate a generative model that can be well analyzed by existing intrusive methods. Nevertheless, up to now, ViSQOL is thus far the most ideal coded audio quality evaluation model, covering a wide range of content types and quality levels. Future versions of ViSQOL are also within the scope of the disclosure.

Perceptually-Inspired Representation

One of salient characteristics of ViSQOL is that it analyses the audio quality based on the gammatone spectrogram. Human brains describe the information collected from ears by visualizing sound as a time-varying distribution of energy in frequency. The important difference between the traditional spectrogram and how sound is actually analysed by the ear is, that ear's frequency sub-bands get wider for higher frequencies, whereas the spectrogram has a constant bandwidth across all frequency channels. Gammatone filters are a popular linear approximation to the filtering performed by the ear. The gammatone-based spectrogram is constructed by first calculating a conventional, fixed-bandwidth spectrogram, and then combining the fine frequency resolution of the fast Fouier transform (FFT)-based spectra into the coarser, smoother gammatone responses via a weighting function. In short, a gammatone-based spectrogram can be considered as a more perceptually driven representation than the traditional spectrogram.

ViSQOL has built in the same gammatone spectrogram function in their C++ implementation and it constructs gammatone-based spectrogram with a window size 80 ms, a hop size 20 ms and 32 frequency bands with minimum frequency 50 Hz and maximum frequency equal to half of sampling rate. In this disclosure, the originally published MATLAB implementation to construct the gammatone-based spectrogram with the same parameter setting as used in ViSQOL was used as experimental input to the systems and methods for determining an indication of an audio quality of an input audio frame, as described herein.

Deep-Learning Based System for Audio Quality Assessment Referring to the examples of FIGS. 1.2 and 1.3, there is provided a computer-implemented deep-learning-based system for determining an indication of an audio quality of an input audio frame, 100, 200, 300. In this disclosure, a system (model), 100, 200, 300, is proposed that is a full-reference audio quality assessment network with a backbone of adapted Inception blocks and optional Squeeze-and-Excitation (SE) layers, which may take gammatone spectrograms of the reference, 101*a*, 201*a*, 301*a*, and degraded audio 101*b*, 201*b*, 301*b*, as input and predicts quality scores, 104, 208, 308, e.g. MOS-LQO scores, 104, 208, for those degraded excerpts. Hereinafter, the model, 100, 200, 300, is also denoted as InceptionSE model. The similarity and difference between the workflow of ViSQOL v3 and the InceptionSE model is presented by comparison of FIG. 1.1 and FIGS. 1.2 and 1.3. In the example of FIG. 1.2, the workflow of ViSQOL v3 is illustrated as compared to the workflow of the InceptionSE model, 100, in general. In the examples of FIG. 1.3, the workflow of the InceptionSE model for the cases of a mono, 200, and a stereo, 300, audio signal as input are compared in more detail, wherein In denotes an Inception block, 203*a*, 203*b*, 205, 303*a*, 303*b*, 305, SE denotes a squeeze-and-excitation layer, 204, 206, 304, 306, and FCL denotes a fully connected layer, 207, 307. In case of the stereo model, 300, L denotes left channel, R denotes right channel, M denotes mid-channel and S denotes side-channel. Both workflows will be described in more detail below.

Referring to the examples of FIGS. 1.2 and 1.3, a computer-implemented deep-learning-based system for determining an indication of an audio quality of an input audio frame, 100, 200, 300, is illustrated schematically. It is to be noted that in FIG. 1.2 the model, 100, includes an optional global alignment block, 102. With both, mono and stereo models, it may be assumed that the input reference and degraded signals are time-aligned. If they are not time-aligned, they may be manually aligned. For example, assuming an encoder-decoder delay of a codec is 1600 samples, then the reference and degraded signals may be aligned by chopping off the first 1600 samples from the degraded signal.

Referring to the example of FIG. 1.3, the system, 200, 300, may comprise at least one inception block, 203*a*, 203*b*, 205, 303*a*, 303*b*, 305, configured to receive at least one representation of an input audio frame and to map the at least one representation of the input audio frame into a feature map, wherein the at least one inception block, 203*a*, 203*b*, 205, 303*a*, 303*b*, 305, may comprise a plurality of parallel paths of convolutional layers, wherein at least one parallel path may include a convolutional layer with an m×n sized kernel, wherein the integer m may be different from the integer n.

The system, 200, 300, may further comprise at least one fully connected layer, 207, 307, configured to receive a feature map corresponding to the at least one representation of the input audio frame from the at least one inception block, 203*a*, 203*b*, 205, 303*a*, 303*b*, 305.

The at least one fully connected layer, 207, 307, may be configured to determine the indication of the audio quality of the input audio frame.

In some embodiments, the indication of the audio quality may comprise at least one of a mean opinion score, MOS, 104, 208, and a multiple stimuli with hidden reference and anchor, MUSHRA, 308.

Referring to the example of FIG. 1.4, a method of operating a computer-implemented deep-learning-based system for determining an indication of an audio quality of an input audio frame of a mono audio signal, 200, wherein the system comprises at least one inception block, 203*a*, 203*b*, 205, and at least one fully connected layer, 207, is illustrated.

In step S101, at least one representation of the input audio frame of the mono audio signal comprising a representation of a clean reference input audio frame of the mono audio signal and a representation of a degraded input audio frame of the mono audio signal is received by the at least one inception block. The at least one inception block may comprise a plurality of parallel paths of convolutional layers, and at least one parallel path may include a convolutional layer with an m×n sized kernel, wherein the integer m may be different from the integer n.

In step S102, the at least one inception block then maps the at least one representation of the input audio frame into a feature map. Steps S101 and S102 may be performed by an inception block as described below with reference to FIG. 2.24, for example.

And in step S103, the indication of the audio quality of the input audio frame is predicted by the at least one fully connected layer based on the feature map. Step S103 may be performed by a fully connected layer as described below with reference, for example, to FIG. 2.14.

As described above, in an embodiment, the indication of the audio quality may comprise at least one of a mean opinion score, MOS, 104, 208, and a multiple stimuli with hidden reference and anchor, MUSHRA.

In addition, a training dataset for training a computer-implemented deep-learning-based system for determining an indication of an audio quality of an input audio frame, 100, 200, 300, was built. The training dataset covered, for example, 10 hours of mono music excerpts, 2 hours of mono speech excerpts and 45 minutes noise and silence excerpts, which were encoded and decoded by High-Efficiency Advanced Audio Coding (HE-AAC) and Advanced Audio Coding (AAC) codecs with a bitrate ranging from 16 kbps to 128 kbps. In this example, both, AAC and HE-AAC, were chosen as codec in the training, so that both waveform coding (AAC) and parametric coding tools (Spectral Band Replication a.k.a SBR in HE-AAC) were considered. To refrain from massive listening tests and the need to label each audio excerpt manually, MOS-LQO scores predicted by ViSQOL v3 were used as ground truth to train and derive the model, 100, 200, 300.

Referring to the example of FIG. 1.5, a method of training a computer-implemented deep-learning-based system, 100, 200, for determining an indication of an audio quality of an input audio frame, wherein the system comprises at least one inception block, 203*a*, 203*b*, 205, and at least one fully connected layer, 207, is illustrated.

In step S201, at least one representation of an input audio frame of an audio training signal comprising a representation of a clean reference input audio frame of the audio training signal and a representation of a degraded input audio frame of the audio training signal is received by the at least one inception block.

In step S202, the at least one inception block maps the at least one representation of the input audio frame of the audio training signal into a feature map. Steps S201 and S202 may be performed by an inception block as described below with reference to FIG. 2.24, for example.

In step S203, the indication of the audio quality of the input audio frame of the audio training signal is predicted by the at least one fully connected layer based on the feature map. Step S203 may be performed by a fully connected layer as described below with reference, for example, to FIG. 2.14.

And in step S204, one or more parameters of the computer-implemented deep-learning based system are then tuned based on a comparison of the predicted indication of the audio quality and an actual indication of the audio quality.

As described further below with reference to equation 2.11, in an embodiment, the comparison of the predicted indication of the audio quality and the actual indication of the audio quality may be based on a smooth L1 loss function.

In an embodiment, the at least one representation of the input audio frame (received by the at least one inception block) may correspond to a gammatone spectrogram, 103, 202, 302, with a first axis representing time and a second axis representing frequency.

The InceptionSE model, 100, 200, 300, takes in, for example, two channels of frequency×time-sized gammatone spectrogram, 103, 202, 302, and each channel represents the gammatone spectrogram of the clean reference, 101*a*, 201*a*, 301*a*, and degraded, 101*b*, 201*b*, 301*b*, signals. After several layers of adapted Inception blocks, 203*a*, 203*b*, 205, 303*a*, 303*b*, 305, and optional SE blocks (SE layers), 204, 206, 304, 306, the feature maps are then flattened and fed to three fully connected layers, 207, 307, to project the features to a continuous MOS-LQO score, 104, 208, between 1 and 5, or a MUSHRA score, 308. These predicted MOS scores (or MUSHRA scores) may be compared with ViSQOL and finally evaluated on USAC verification listening tests in order to calibrate the performance of the InceptionSE model on listening tests.

Referring again to the examples of FIGS. 1.2 and 1.4, in an embodiment, the input audio frame may be derived from a mono audio signal, wherein the at least one representation of the input audio frame may comprise a representation of a clean reference input audio frame, 201*a*, and a representation of a degraded input audio frame, 201*b*.

In a nutshell, the InceptionSE model has achieved a comparable performance on the training dataset summarized in Table 4.1 below, the test dataset "Set of Critical Excerpts for Codecs" also described further below, and on USAC verification listening tests including both mono and stereo audio. Moreover, it can be easily adapted to non-intrusive methods as well by simply removing the reference from the input and re-training the model. As will be described below, the model can be adapted to applications in stereo and multi-channels signals.

Referring to the example of FIG. 1.3, in an embodiment, the input audio frame may be derived from a stereo audio signal comprising a left channel and a right channel, wherein the at least one representation of the input audio frame may comprise for each of a middle channel, a side channel, a left channel and a right channel a representation of a clean reference input audio frame, 301*a*, and a representation of a degraded input audio frame, 301*b*, the middle and side channel corresponding to a sum and a difference of the left and right channels.

That is:

$$M = \frac{L+R}{2} \text{ and } S = \frac{L-R}{2}$$

with M=middle channel; L=left channel; R=right channel; S=side channel. By performing ablation studies, it was found: stereo audio quality prediction accuracy improves with the inclusion of mid- and side-channels (of reference and degraded signals). The inclusion of the side-channel improves the prediction accuracy towards lower bitrates. To save complexity, it was found that it is sufficient to exclude the mid-channel (without significantly degrading the prediction accuracy).

Referring further to the example of FIG. 1.6, a method of operating a computer-implemented deep-learning-based system for determining an indication of an audio quality of an input audio frame of a stereo audio signal, 300, wherein the system comprises at least one inception block, 303*a*, 303*b*, 305, and at least one fully connected layer, 307, is illustrated.

In step S301, at least one representation of the input audio frame comprising for each of a middle channel, a side channel, a left channel and a right channel a representation of a clean reference input audio frame and a representation of a degraded input audio frame, the middle and side channel corresponding to a sum and a difference of the left and right channels is received by the at least one inception block. In an embodiment, the at least one inception block may comprise a plurality of parallel paths of convolutional layers, and at least one parallel path may include a convolutional layer with an m×n sized kernel, wherein the integer m may be different from the integer n. In a further embodiment, the method may further include prior to receiving the at least one representation of the input audio frame, receiving one or more weight coefficients of at least one inception block that had been obtained for a computer-implemented deep-learning-based system for determining an indication of an audio quality of an input audio frame of a mono audio signal and initializing one or more weight coefficients of the at least one inception block based on said received one or more weight coefficients. In this, the stereo use case may be conveniently implemented based on a model for determining an indication of an audio quality of an input audio frame of a mono audio signal. In other words, the weights from the at least one inception block of the mono model can be re-used in the stereo model. This concept of transfer learning is further described below.

In step S302, the at least one inception block then maps the at least one representation of the input audio frame into feature maps. Steps S301 and S302 may be performed by an inception block as described below with reference to FIG. 2.24, for example.

And in step S303, the indication of the audio quality of the input audio frame is predicted by the at least one fully connected layer based on the feature maps. Step S303 may be performed by a fully connected layer as described below with reference, for example, to FIG. 2.14.

Also in this case, in an embodiment, the indication of the audio quality may comprise at least one of a mean opinion score, MOS, and a multiple stimuli with hidden reference and anchor, MUSHRA, 308.

In addition, referring to the example of FIG. 1.7, a method of training a computer-implemented deep-learning-based system for determining an indication of an audio quality of an input audio frame of a stereo audio training signal, 300, wherein the system comprises at least one inception block, 303*a*, 303*b*, 305, and at least one fully connected layer, 307, is illustrated.

In step S401, one or more weight coefficients of the at least one inception block are initialized based on one or more weight coefficients that had been obtained for at least one inception block of a computer-implemented deep-learning-based system for determining an indication of an audio quality of an input audio frame of a mono audio training signal. Step S401 may thus follow the concept of transfer learning as described further below.

In step S402, at least one representation of an input audio frame of a stereo audio training signal comprising for each of a middle channel, a side channel, a left channel and a right channel a representation of a clean reference input audio frame and a representation of a degraded input audio frame, the middle and side channel corresponding to a sum and a difference of the left and right channels, is received by the at least one inception block.

In step S403, the at least one representation of the input audio frame of the stereo audio training signal is mapped by the at least one inception block into feature maps. Steps S402 and S403 may be performed by an inception block as described below with reference to FIG. 2.24, for example.

In step S404, the indication of the audio quality of the input audio frame of the stereo audio training signal is predicted by the at least one fully connected layer based on the feature maps. Step S404 may be performed by a fully connected layer as described below with reference, for example, to FIG. 2.14.

And in step S405, one or more parameters of the computer-implemented deep-learning based system are tuned based on a comparison of the predicted indication of the audio quality and an actual indication of the audio quality.

Also in this case, as described further below with reference to equation 2.11, in an embodiment, the comparison of the predicted indication of the audio quality and the actual indication of the audio quality may be based on a smooth L1 loss function.

In general, deep learning is based on artificial neural network and part of a broader family machine learning methods. Machine learning is the study of computer algorithms which improve automatically through experience and build a mathematical model based on sample data. Artificial neural networks (ANNs) mimic the information processing and distributed communication nodes in biological systems. Deep learning algorithms use multiple layers to progressively extract higher-level features from the raw input. Layers in deep learning architectures such as convolutional layer, pooling layer, batch normalisation layer, fully connected layer, drop out layer and activation layer will be described in more detail in the following. Advanced layers and modules including attention mechanism, long short-term memory (LSTM) layer, squeeze- and-excitation (SE) layer and Inception module (block) will be described as well.

Deep Learning Architecture

Convolutional Layer

Convolution is a mathematical operation that expresses how the shape of one function ($f$) is modified by the other (g). In convolutional layers, a convolution operation works as such to reduce data dimensions while preserving the distinct information. The parameters of convolutional layers consist of a set of filters (or kernels). 1-dimensional (1D) kernels may be used in tasks such as audio processing. The design of kernels depends on the input size. In audio processing tasks, wave format signals can be seen as a 1-dimensional matrix along temporal axis and a kernel (a vector) is therefore 1-dimensional moving along time axis of audio signals. In this disclosure, for example, gammatone spectrograms as input into the CNN classifier (convolutional neural network, inception block) are 2-dimensional matrices. 2D kernels move along the frequency- and temporal-axis of gammatone spectrograms.

A convolutional layer (Conv) may be the core of a CNN. Elements in a convolutional layer are an input, 1001, filters (kernels), 1002, and an output, 1003, as illustrated in the example of FIGS. 2.1-2.4. A convolution operation in Conv layers can be interpreted as that kernels look at a small region in the input. This small region has the same size of kernels, which is also referred as receptive fields. Each kernel generates a corresponding feature map and therefore n different kernels are able to extract n different features and build n-dimensional feature maps as an output of this Conv layer.

In this disclosure, the inputs may be also 3-dimensional. In addition to temporal- and frequency-axis, there may be 2 channels along z-axis, which represent gammatone spectrograms of reference and degraded signals. In this example, the size of input $W_i \times H_i$ is 7×7, and the number of input channels $C_i$ is 2. The kernel size F is 3. The number of kernels K is 3. The output size $W_o \times H_o$ can be calculated according to Equation 2.1

$$W_o = \left\lfloor \frac{W_i - F + 2P}{S} + 1 \right\rfloor \qquad (2.1)$$

$$H_o = \left\lfloor \frac{H_i - F + 2P}{S} + 1 \right\rfloor,$$

where P is the number of zero padding, S is the stride. The number of output channels $C_o$ is equal to K. The parameters in filters are weights and bias. Bias is not mandatory and can be therefore set to 0. The output at one specific position is the sum of element-wise multiplication of weights and inputs in the receptive field plus the bias. Kernels slide along x-and y-axis of the input with a stride S and the value at one specific position in the output $V_i$ can be calculated as:

$$V_i = \sum X_i \cdot W + b, \qquad (2.2)$$

where Wand b are weights and bias of kernels, respectively; and $X_i$ is the local input in the receptive field.

An example is illustrated in FIGS. 2.1-2.4. It is worthy to note that each kernel always has the same amount of channels as its corresponding input. The input size may be 7×7×2, in which 2 denotes number of channels. And the kernel size 3×3×2 has 2 channels as well. The size of the output is calculated according to Equation 2.1 with P=0 and S=2. The kernel moves along x- and y-axis of inputs from upper left to bottom right. According to the given value in FIG. 2.2, the output at corresponding position is calculated as follows:

$$O_{c1} = -4\cdot 1 + 1\cdot 1 + 3\cdot 1 + 7\cdot 0 + 0\cdot(-1) + 4\cdot 0 + (-5)\cdot(-1) + 1\cdot 1 + 5\cdot 0 = 6$$

$$O_{c2} = -1\cdot(-1) + 2\cdot(-2) + (-1)\cdot 0 + (-5)\cdot 0 + (-1)\cdot(-1) + 2\cdot 2 + (-1)\cdot 1 + 0\cdot 1 + (-1)\cdot 1 = 0$$

$$O_1 = O_{c1} + O_{c2} + \text{bias} = 6 + 0 + (-1) = 5,$$

where $O_{c1}$ and $O_{c2}$ denote convolution results of the first and second channels depicted in diagonal and horizontal hatchings, respectively. $O_1$ is the output at upper left position convolved with the first kernel. The kernel keeps moving along x-axis direction with a step size 2 shown in FIG. 2.3 and FIG. 2.4 and repeat the same calculation procedure as in FIG. 2.1 and FIG. 2.2.

This convolutional computation through the input is repeated by all the kernels, and each kernel generates a feature map, which builds a channel in the output. As in FIG. 2.5, differently illustrated layers in the output, 1003, are the feature maps extracted by the corresponding kernels, 1002, and therefore the number of channels in the output, 1003, is equal to the number of kernels, 1002.

Rectangular Kernels

A spectrogram is a "visual" representation of the spectrum of frequencies of a signal as it varies with time. The x-(horizontal) and y-(vertical) axis of a spectrogram represents temporal resolution and frequency bands, respectively. Therefore, wider (horizontal) kernels, 1005, may be capable of probing (and in consequence, e.g., learning) longer temporal dependencies in the audio domain while higher (vertical) kernels, 1008, may be capable of probing (and in consequence, e.g., learning) more spread timbrel features. Horizontal kernels probing longer temporal dependencies in the audio domain may thus be said to refer to the horizontal kernels being sensitive towards features that extend along the temporal axis of the spectrogram, while vertical kernels may be said to be sensitive towards features that extend along the frequency axis of the spectrogram. That is, in other words, horizontal kernels learn/scan/look at longer temporal dependencies in the audio domain while vertical kernels learn/scan/look at the more spread timbrel features. In yet other words, horizontal kernels may be capable of detecting (and mapping to respective feature maps) patterns extending along the horizontal axis, whereas vertical kernels may be capable of detecting (and mapping to respective feature maps) patterns along the vertical axis. Needless to say, it is understood that the above assignment of time and frequency to horizonal (e.g., x) and vertical (e.g., y) axes is a mere example and that other assignments may in principle be chosen as well.

Referring to the examples of FIGS. 2.6 and 2.7, in an embodiment, the plurality of parallel paths of convolutional layers (in the at least one inception block) may include at least one convolution layer with a horizontal kernel, 1005, and at least one convolutional layer with a vertical kernel, 1008.

In an embodiment, the horizontal kernel, 1005, may be an m×n sized kernel with m>n, so that the horizontal kernel, 1005, may be configured to probe temporal dependencies of the input audio frame.

In a further embodiment, the vertical kernel, 1008, may be an m×n sized kernel with m<n, so that the vertical kernel, 1008, may be configured to probe timbral dependencies of the input audio frame. Possible properties of such m×n sized kernels are set out in the examples below.

Rectangular kernels (m×n kernels) are capable of learning time and frequency features at the same time. This kind of kernel is typically used in the music technology literature. Such kernels are able to extract different musical features depending on the scale of m and n. For example, a bass or a kick could be well analyzed with a small kernel, which represents a sub-band for a short-time. Examples such as cymbals or snare drums, which have a broad frequency band with a fixed decay time, could be learned by vertical kernels with wider span over frequency bands. Even though a bass or a kick could also be modeled with this kernel, it would not be an optimal choice due to the following reasons. A kernel per note could best characterize the timbre for the whole pitch range of an instrument. Larger kernels will lead to a less efficient representation, because most of the weights would be zero, wasting the representational power of the CNN kernels.

- temporal kernels (1×n) learn relevant rhythmic/tempo patterns within the analyzed-bin.
- frequency kernels (n×1) learn timbre or equalization setups.

Activation Layer

Activation layers introduce non-linearity into the neural network. In biological inspired neural network, the activation function represents the rate of action potential firing in the cell. In the simplest form, activation function is binary: firing or not. Mathematical functions with a positive slope are considered to be used as activation functions. However, functions in the form $f(x)=ax$ are linear and not capable of decision making. Therefore, activation functions are designed to be non-linear. Examples of activation functions are rectified linear unit (ReLU), sigmoid function, hyperbolic tangent function (tanh) and softmax function and their equations can be found in the equation group 2.3 and ReLU, sigmoid and tanh functions are plotted in FIGS. 2.8-2.10.

$$f(x)=\max(0,x), \quad (2.3a)$$

$$f(x)=\frac{1}{1+e^{-x}}, \quad (2.3b)$$

$$f(x)=\frac{2}{1+e^{-2x}}-1, \quad (2.3c)$$

$$f(x_i)=\frac{e^{x_i}}{\sum_{j=0}^{k} e^{x_j}}. \quad (2.3d)$$

ReLU has replaced sigmoid and tanh functions and become the mainstream choice in recent years. The biggest advantage of ReLU is non-saturation of its gradient, which greatly accelerates the convergence of stochastic gradient descent compared to the sigmoid and tanh functions. Moreover, ReLU also introduces some sparsity effect on the network. Another nice property of ReLU is that it avoids expensive operations such as exponential in sigmoid and tanh functions. ReLU can be implemented by simply thresholding a matrix above zero. Softmax function maps its x into the interval (0, 1) and the sum of output is equal to 1. Softmax function is often used as the last activation function of a neural network to normalize the output of a network to a probability distribution over predicted classes.

Pooling Layer

Referring to the examples of FIGS. 2.11 and 2.12, in an embodiment, the at least one inception block may further comprise a path with a pooling layer, 2002, 2003, 2005, 2006. The pooling layer may comprise an average pooling, 2003, 2006. Possible properties of the pooling layer are set out in the examples below.

Convolutional layers are sensitive to the location of features in the input and one approach to address this sensitivity is to down-sample the feature maps. This could improve the robustness of the network to local translation invariance and be helpful in extracting high-level patterns in the input. Other advantages of pooling layers are that it assists to reduce spatial dimension in feature maps, increase the computation efficiency and prevent overfitting problems. A pooling layer may be added after a convolutional layer and an activation layer to summarize the presence of features in feature maps. A pooled feature map is generated much like a sliding window to be applied to feature maps. Max pooling, average pooling, global max pooling (GMP) and global average pooling (GAP) are examples of the four most active pooling operations used in neural networks. As the name itself conveys, max pooling shrinks the region of feature maps within the sliding window to the maximal value in that region and average pooling shrinks to the average value. Global max pooling and global average pooling calculate the maximum or mean of the entire input rather than value in local neighbourhood. The window (kernel) size in pooling layers may be 2×2 with a stride of 2 pixels. The output size can be calculated by the same equation in convolutional layers without taking padding into consideration and the equations are shown in 2.4.

$$W_o = \left\lfloor \frac{W_i - F}{S} + 1 \right\rfloor \quad (2.4)$$

$$H_o = \left\lfloor \frac{H_i - F}{S} + 1 \right\rfloor .$$

Examples of 2D max and average pooling are shown in FIGS. 2.11 and 2.12. The difference between overlapping and non-overlapping pooling is whether a stride step is smaller than the window (kernel) size or not. In these examples, non-overlapping pooling uses a stride of 2 and window (kernel) size of 2×2, while overlapping pooling uses a stride of 2 and window (kernel) size of 3×3. Different hatchings denote stride steps and corresponding results.

The pooling regions are disjointed by non-overlapping pooling and more spatial information will be lost in each pooling layer. Even though pooling operations help to improve robustness against spatial aliasing, it would be at the same time detrimental if abused because the network will focus on some dominant features and could lead to overfitting in some high capacity and deep models. It is also worth noting that max pooling tends to focus on the brighter pixels, while average pooling smooths out inputs and could not detect sharp features.

Once the pooled feature map is obtained, it is then transformed by a flattening layer into a single column. The flattened feature map is passed to fully connected (FC) layers.

Fully Connected Layer

Referring to the examples of FIG. 1.3, the systems, 200, 300, as described herein may comprise at least one fully connected layer, 207, 307, configured to receive a feature map corresponding to the at least one representation of the input audio frame from the at least one inception block, 203*a*, 203*b*, 205, 303*a*, 303*b*, 305. The at least one fully connected, 207, 307, layer may be configured to determine the indication of the audio quality of the input audio frame. In an embodiment, the at least one fully connected layer, 207, 307, may comprise a feed forward neural network. Possible properties of the at least one fully connected layer, 207, 307, are set out in the examples below.

Fully connected (FC) layers may be simple feed forward neural networks. It is worth noting that the only difference between fully connected layers and convolutional layers is that neurons in convolutional layers have only local connections in the input and several neurons in a convolutional layer share parameters. A fully connected layer may be said to be a function mapping from $R^n$ to $R^m$ with the following equation:

$$\hat{O} = W \cdot I, \quad (2.5)$$

where W denotes weights matrix including bias. The number of learnable parameters in fully connected layers is equal to the size of weights matrix, which is the number of input nodes plus an extra bias multiplying the number of output nodes. Each neuron in a fully connected layer has full connection to every neuron in the coming layer. Pictorially, a fully connected layer is represented as follows in FIG. 2.13.

Fully connected layers may be added at the end of a CNN. It tunes the weight parameters to create a stochastic likelihood representation of each class for classification tasks. Therefore, the output layer has the same amount of neurons as the number of predicted classes. Regression tasks such as this disclosure predicts continuous value. A single neuron is constructed in the output layer and the weight matrix of fully connected layers can be seen as polynomial matrix of the targeted regression line.

Batch Normalization

An internal covariate shift occurs when the input distribution to the network changes. The layers in a CNN learn to adapt to the new distribution and thus it slows down the training progress and convergence speed to a global minimum. Batch normalization (also known as batch norm) is a technique for training deep neural networks that standardizes the inputs to a layer by re-scaling and re-centering. Furthermore, batch normalization also has a more fundamental impact on the training progress. It makes the optimization landscape significantly smoother, which induces a more predictive and stable behavior of the gradients, allowing for faster training.

Another advantage of batch normalization is that it improves the robustness of the neural network against ill-conditioned parameters initialization. As the network goes deeper, it becomes more sensitive to the initial random weights and configuration of the learning algorithm.

Dropout

Overfitting is a modeling error when a function fits too closely to a limited set of data. Regularization reduces overfitting and fits approximately on the given training dataset by adding a penalty to the loss function. Dropout refers to that during the training processing certain set of neurons are randomly dropped or ignored. These neurons will not be taken into consideration during a forward or backward pass. Dropout offers a very computationally cheap and remarkably effective regularization method to reduce overfitting and improve generalization error (out-of-sample error).

Dropout may be applied to most types of layers such as convolutional layers, fully connected layers and recurrent layers. It introduces a new hyperparameter, which specifies the probability (p). It induces how many nodes at this layer are dropped out or retained in the training procedure. A common choice for p is between 0.5 and 0.8. For example, p=0.8 means that 80 percent of nodes are retained and 20 percent of nodes are dropped out. Dropout is deactivated during prediction/inference. The procedure of dropout is illustrated in FIG. 2.16. Compared to the full connection between all nodes in FIG. 2.15, the second node, 12, is deactivated in FIG. 2.16 and its connection to the next layer is cut down after applying dropout, so that its parameters will not be updated during the current training stage.

Dropout has proven to work more effectively in practice than other regularization methods, such as weight decay, filter norm constraints and sparse activity regularization.

Advanced Layers

In the following, four advanced modules and structures will be described and they build the backbones of the experimented and proposed models described herein. A classic recurrent neural network (RNN): long-short term memory networks (LSTMs) will be introduced. Then, the attention mechanism will be described and its extension application: self-attention and squeeze-and-excitation (SE) network. In the last part, the Inception module and its variation in the proposed model will be described.

Long Short-Term Memory Network

Recurrent neural networks, also known as RNNs, are a class of neural networks that allow previous outputs to be used as inputs while having hidden states. The necessity for RNNs structure is obvious: the way of human's thinking is coherent and what we understand the current state is based on the previous one. It is impossible for traditional neural networks to preserve the previous states. RNNs address this issue by persisting previous information in loops. A loop allows information to be passed from one-time step of the network to the next. A recurrent neural network is unrolled in FIG. 2.17.

The chain-like structure of RNNs reveals that it is ideally suited for handling sequences and time series. Another advantage of RNNs is that RNNs take no predetermined limited size of input, while its model size does not increase with the size of input. In the last decade, RNNs have been successfully applied to a variety of problems such as speech recognition and translation. However, the drawbacks of RNNs are also impossible to neglect. The computation of RNNs is slow and RNNs have bad memory at the information long time ago owning to the so-called "vanishing gradient problem". The vanishing gradient problem refers to the phenomenon that the gradient shrinks as it back-propagates through time. If a gradient value becomes extremely small, RNNs will forget the early information in a long sequence and thus have a short term memory.

Long-short term memory (LSTM) network was created as a solution to short term memory. It has internal mechanisms called gates that can regulate the flow of information. These gates can learn which data in a sequence is important to keep or throw away. The internal design of a LSTM unit is shown in FIG. 2.18.

The dotted box, 3001, marks the forget gate. This gate decides what information should be thrown away or kept. Information from the previous hidden state and from the current input is passed through the sigmoid ($\sigma$) function. Values come out between 0 (forget) and 1 (remember). The short dashed box, 3002, marks the input gate, which updates the new input in every time step. The dashed dotted box, 3004, marks the cell state and the long-dashed box, 3003, around the output gate decides what information the next hidden state should carry. Different applications of RNNs are summed up in FIGS. 7.1 and 7.2.

Gammatone spectrograms are a visual representation of audio signals and inherit the time dimension of audio. Inputs in this disclosure are 8 seconds long gammatone spectrograms with a temporal resolution of 20 milliseconds and output is a single continuous score between 1 and 5. Therefore, the estimation is formulated as a regression problem and the solution fits the many-to-one RNN prototype.

Attention Mechanism

Attention is motivated by the psychological attention, which is the cognitive process of selectively concentrating on one or a few things while ignoring others. Attention mechanism allows models to focus on a certain region or component, which has greater importance for decision making, and skip the rest. In a nutshell, attention in deep learning can be broadly interpreted as a vector of importance weights: features with higher weights contribute more to the decision-making process and vice versa.

The attention mechanism was first born to help memorize long source sentences in neural machine translation (NMT). The Seq2Seq model in the field of language modeling aims to transform an input sequence (source) to a new one (target) and both sequences can be of arbitrary lengths. The Seq2Seq model is usually composed of an encoder and a decoder, which are both based on RNN architectures, such as LSTM units. A critical and apparent disadvantage of encoders and decoders is its fixed length of context vector and incapability of remembering long sentences. Although LSTM is supposed to capture the long-range dependency better than RNN, it tends to become forgetful in specific cases. The attention mechanism was created to resolve this problem.

With the assistance of the attention mechanism, the dependencies between source and target sequences are not restricted by the in-between distance anymore. In broad terms, Attention may be one component of a network's architecture, and may be in charge of managing and quantifying the interdependence. General attention manages the interdependence between inputs and outputs, while self-attention works within the input elements.

Compared to previous architectures, the main advantages of self-attention are the ability of parallel computing (compared to RNN) and no need of deep networks in handling with long sequence (compared to CNN). The basic structure of self-attention is illustrated by a simple example of a sentence in the FIGS. 2.19 and 2.20.

Every input word is first embedded into a feature vector a. Concepts of query, key and value are introduced into the computation of an attention matrix, which can be calculated based on those feature vectors in Equation 2.6. The key/value/query concepts originate from retrieval systems. The attention operation turns out to be a retrieval process as well, so the key/value/query concepts are applied in order to assist to build an interdependence matrix within inputs. The corresponding weights $W^q$, $W^k$ and $W^v$ are the target to be trained.

$$q^i = W^q \cdot a^i,\ k^i = W^k \cdot a^i,\ v^i = W^v \cdot a^i. \tag{2.6}$$

An attention matrix A is generated as inner product of query of the ith input and key of the jth input with the Equation 2.7.

$$A = \begin{bmatrix} a_{0,0} & a_{0,1} & a_{0,2} & a_{0,3} \\ a_{1,0} & a_{1,1} & a_{1,2} & a_{1,3} \\ a_{2,0} & a_{2,1} & a_{2,2} & a_{2,3} \\ a_{3,0} & a_{3,1} & a_{3,2} & a_{3,3} \end{bmatrix} \tag{2.7}$$

$$a_{i,j} = \frac{q^i \cdot k^j}{\sqrt{d}},$$

where d represents the dimension of query and key. Softmax functions are then applied to the attention matrix A by row in order to re-scale the weights between 0 and 1 and ensure the sum of weights to be 1. The output $b_i$ of the whole self-attention module is the sum of attention weights multiplied by the value in Equation 2.8, $$b_i = \sum_j \tilde{a}_{i,j} v^j \tag{2.8}$$

where a~i,j denotes the re-scaled attention weight between the ith and jth input.

Self-attention layers may be a potential solution to deal with spectrograms. Self-attention can be applied along either temporal axis or frequency axis to build attention matrices between time steps or frequency bands.

Squeeze-and-Excitation Network

Referring again to the examples of FIG. 1.3, in an embodiment, the system may further comprise at least one squeeze-and-excitation, SE, layer, 204, 206, 304, 306. The squeeze-and-excitation layer, 204, 206, 304, 306, may follow a last convolutional layer of the plurality of parallel paths of convolutional layers of the at least one inception block, 203*a*, 203*b*, 205, 303*a*, 303*b*, 305. The squeeze-and-excitation layer, 204, 206, 304, 306, may comprise a convolutional layer, two fully connected layers and sigmoid activation. In the squeeze-and excitation layer, 204, 206, 304, 306, the convolutional layer followed by a scaling operation with the two fully connected layers may generate a respective attention weight for each channel of the feature map output by the at least one inception block, 203*a*, 203*b*, 205, 303*a*, 303*b*, 305, and may apply said attention weights to the channels of the feature map and may perform concatenation of the weighted channels.

In an embodiment, the system may comprise two or more inception blocks, 203*a*, 203*b*, 205, 303*a*, 303*b*, 305, and two or more squeeze-and-excitation layers, 204, 206, 304, 306, and the inception blocks, 203*a*, 203*b*, 205, 303*a*, 303*b*, 305 and the squeeze-and excitation layers, 204, 206, 304, 306, may be alternately arranged.

Possible features of Squeeze and excitation layers (networks) are set out in the examples below.

Squeeze-and-Excitation Networks (SENets) introduce a building block for, for example, CNNs that may improve channel interdependencies with negligible computational overhead and may be added to any baseline architectures. During the procedure of the feature extraction in CNN, channels are those feature maps extracted by different kernels and stacked up along z-axis.

In CNNs, the convolutional kernels are responsible for constructing the feature maps based on the learned weights within those kernels. Kernels are able to learn features such as edges, corners and texture. Collectively they learn different feature representations of the target class and therefore the number of channels denotes the number of convolutional kernels. However, these feature maps also have a different magnitude of importance, which means that some feature maps are more helpful than others in targeted tasks. Thus, those feature maps should gain extra attention than others by re-scaling the important channels with a higher weight. This is exactly what Squeeze-Excitation Networks propose.

The Squeeze-and-Excitation block (SE-block) includes three core operations (shown in the FIG. 2.21), which are squeeze, 4002, excite, 4003, and scale, 4004. The feature map set (C, H, W), 4001, is essentially the output tensor from the previous convolutional layer. The initials represent channels, height and width, respectively. Therefore, each feature map has to operate with H×W data and the need to decompose the information of each feature map into a single value will be crucial in reducing the computational complexity of the whole operation. This is the so-called "squeeze" procedure. The method used for reduction of spatial size in SE-block is global average pooling (GAP) and the output tensor is transformed into C×1×1 after the operation of GAP.

The excitation operation follows the squeeze operation and consists of 2 fully connected layers and a sigmoid layer to learn the adaptive scaling weights for these channels. The first fully connected layer reduces the "squeezed" tensor by a reduction factor r and the second fully connected layer projects it back to the dimension C×1×1. The sigmoid helps to scale the "excited" tensor between 0 and 1. Different shadings in FIG. 2.21 represent channels with different attention weights learnt from the excitation procedure. Subsequently these weights are applied directly to the input by a simple broadcast element-wise multiplication and re-scaling back to the same dimension as input C×H×W.

The standard SE block may be applied directly after the final convolutional layer of the architecture. There are several other integration strategies of SE. For example, in a residual network, the SE block may be plugged in after the final convolutional layer, which is prior to the addition of the residual in the skip connection. In an inception network, the SE blocks may be inserted in every inception block after the final convolutional layer.

Inception Module

Instead of merely stacking convolution layers, the Inception network builds a wider architecture instead of deeper. Starting from the Inception network, there are four versions of the Inception block. The present disclosure mainly relates to Inception v1 and v2 and its variants. It is also to be noted that the present disclosure proposes use of a modified version of the inception block which to the inventors' best knowledge has not been investigated up to now.

A short recap of convolutional layers: kernels used in a single convolutional layer is fixed for all inputs. However, the salient component in different inputs can have extremely large variation in size. Smaller kernels are preferred to identify local features and larger kernels suit for detecting global patterns. Therefore, a single, fixed-size kernel could not perform universally well on all inputs and the solution that Inception network has offered is a parallel architecture with multiple kernel sizes operating on the same level.

FIG. 2.22 shows an example of a "naive" Inception module (inception block). It performs convolution on an input, 5001, with 3 different sizes of kernels (1×1, 3×3 and 5×5), 5002, 5003, 5004. Additionally, max pooling, 5005, is also performed. The feature maps extracted by different kernels are concatenated along channel-axis and sent to the next layer, 5006.

An extra 1×1 convolution is added before 3×3 and 5×5 convolutions in order to limit the number of input channels, because 1×1 convolution is far more computationally cheaper than 5×5 convolution. It is worth noting that 1×1 convolution is introduced after the max pooling layer rather than before.

A variation is illustrated in the example of FIG. 2.23 which is to factorize a 5×5 convolution, 5004, into two 3×3 convolution operations, 5004*a*, 5004*b*, to improve computational speed and decrease the number of parameters that need to be trained. Similarly, any kernel size m×n can be factorized into a combination of 1×n and m×1 convolutions. This operation also attempts to decrease the number of parameters by decomposing a large kernel into two smaller ones.

The most obvious characteristic of Inception module is its adaption to various receptive fields. In this disclosure we replace the conventional square-shaped kernels with rectangle-shaped, which is more adaptive to the input spectrograms.

The systems and methods for determining an indication of an audio quality of an input audio frame take advantage of this point and fit in Inception blocks (FIG. 1.3) with horizontal and vertical kernels as depicted in FIG. 2.24. Since audio signals may contain both tonal and transient signals, exhibited by horizonal and vertical lines on (gammatone) spectrograms, respectively; it is optimal to apply both horizonal and vertical kernels for modeling audio. The far-left branch is composed of two kernels, which jointly build a 3×7 vertical kernel, 6002, 6006. The second branch from left is equivalently a 7×3 horizontal kernel, 6003, 6007. The right two branches inherit the classic Inception module branches with 1×1 Conv, 6005, and a pooling operation, 6004. In this example, the max pooling is replaced with average pooling, considering that spectrograms do not possess sharp features and average pooling could smooth out the input. This Inception module forms the backbone of the proposed system (model) and displays its significant learning ability in detecting features of various sizes.

The Process of Learning

In the following, a standard training workflow including data processing, parameter initialization, loss function and optimization methods is introduced. In the last section, transfer learning is described against conventional model building and training.

Data Pre-processing

Machines do not understand data such as audio files themselves. They take in 1s and 0s and therefore loss function is able to calculate the overall error based on these numeric representations. Considering that these data might derive from different sources, a perfect dataset is almost impossible because data could be insufficient, or in different formats and sizes. Necessary measures to unify and adjust those messy data are considered before feeding them to models. General measures are checking missing or inconsistent values, resizing, normalization, down-sampling or up-sampling (data augmentation) dataset, transforming data into the expected format (e.g. audio files into spectrograms) and splitting dataset into training, validation and test set. Further details about data processing in this disclosure will be elaborated below.

Parameter Initialization

Parameters need to be initialized when training the whole network from scratch. There are two popular techniques to initialize the parameters in a neural network, which are zero initialization and random initialization. As a general practice, biases are initialized with zero and weights are initialized with random numbers, for example with a normal distribution.

However, as the network gets deeper and more complicated, the whole training procedure could last weeklong and a better initialization is preferred. Larger models also expose vanishing/exploding gradient problems and slow down convergence speed. In this case, more clear initialization strategies such as He and Xavier initialization are needed depending on the activation functions used in the network.

Another strategy to shorten the training cycle is to train the model with the pre-trained parameters, which will be further explained in detail in the transfer learning section.

Loss Function

Examples of loss functions and possible properties thereof will be described next.

The loss function and optimization methods are the bread and butter of deep learning. Loss function, sometimes also called as objective function, is a method of evaluating how well an algorithm models the given dataset. If predictions deviate too much from actual results, the loss function will generate a relatively large error. Optimization methods assist the loss functions to reduce this error by adjusting to the optimal weights and bias in the network through the whole training procedure.

Broadly, loss functions can be divided into two major categories: regression losses and classification losses. Since this disclosure is a regression task, we will explain loss functions used in regression, which are L2 loss, L1 loss and smooth L1 loss.

L2 Loss/Mean Square Error

As the name conveys, mean square error (MSE) is measured as the mean of squared difference between predictions and actual observations as in Equation 2.9. L2 loss is more sensitive to the outliers, because it squares the error. Generally speaking, L2 offers an empirically more stable solution than L1 loss and converges usually faster than L1 loss to a global minimum.

$$L_2 = \frac{1}{N}\sum_{i}^{N}(M - \hat{M}_i)^2. \tag{2.9}$$

Loss/Mean Absolute Error

Mean absolute error (MAE) is measured as the mean of sum of absolute differences between predictions and actual observations as in Equation 2.10. L1 norm is a penalty function in math because it promotes sparsity and it is robust to outliers. L1 loss might converge to a local minimum compared with L2 and output multiple solutions rather than the optimal one.

$$L_1 = \frac{1}{N}\sum_{i}^{N}|M - \hat{M}_i| \tag{2.10}$$

Smooth L1 Loss

Generally, the loss function to be used for the comparison of the predicted indication of the audio quality and the actual indication of the audio quality, as described above, is not limited. However, in an embodiment, said comparison may be based on a smooth L1 loss function, an example of which will be described next.

Smooth L1 loss can be interpreted as a combination of L1 and L2 loss as in Equation 2.11. It behaves like L2 loss when the predictions and actual observation are close enough. L1 loss is used when the difference between predictions and actual observation is beyond a preset threshold to avoid over-penalizing outliers.

$$L_1,\text{ smooth} = \frac{1}{N}\sum_{i} z_i \tag{2.11}$$

$$\text{where } z_i = \begin{cases} \frac{1}{2}(M - \hat{M}_i)^2 & \text{if } |M - \hat{M}_i| < 1, \\ |M - \hat{M}_i| - \frac{1}{2} & \text{otherwise} \end{cases}.$$

Optimization

For a given architecture, parameters determine how accurately the model implements the task. A loss function evaluates how big the difference is between the predictions and actual observations and the goal of optimizer is to minimize this difference and to figure out the best parameter set that matches the prediction with reality. In this section, four optimization methods are exemplarily introduced, which are gradient descent, stochastic gradient descent, mini-batch gradient descent and Adam.

Gradient Descent

Gradient descent, for example, is the most basic and commonly used optimization strategy, such as backpropagation in the neural network. Gradient descent calculates the first order derivative of the loss function in Equation 2.12 and the weights are therefore altered towards the global minima of this loss function.

$$\theta = \theta - \alpha \cdot \nabla L(\theta), \tag{2.12}$$

where α denotes the learning rate, θ denotes updated parameters and L(θ) denotes the loss function used in the network. Although gradient descent is easy to compute and implement, it is often bothered by the issue that the gradient traps at local minima. Moreover, it often requires for large memory and relatively long computation time when tackling large dataset. Since it updates weights after calculating the gradient on the whole dataset, and it might take weeks to converge to minima.

Stochastic Gradient Descent

Stochastic gradient descent (SGD), for example, is a variant of gradient descent and it updates the parameters after computation of each training sample rather than after the whole dataset. The equation of SGD is formulated in Equation 2.13:

$$\theta = \theta - \alpha \cdot \nabla L(\theta, x_i, y_i), \tag{2.13}$$

where $x_i$ and $y_i$ represent the individual training sample. SGD requires less memory and converges in less time owning to the frequent update. But the variance of the model parameters is quite high.

Mini-Batch Gradient Descent

Mini-batch gradient descent, for example, is a method between SGD and gradient descent. Mini-batch gradient descent updates weights after every batch in Equation 2.14, instead of after a single sample or a whole dataset. Batch refers to a sub-set of data, that are calculated together in every computation.

$$\theta = \theta - \alpha \cdot \nabla L(\theta; B_i). \tag{2.14}$$

The advantages of mini-batch gradient descent are obvious: it occupies a medium amount of memory and has less variance when keeping a relatively high frequent update of parameters. However, it does not address the issues as gradient descent and SGD confront with. It could be trapped at local minima and does not have an adaptive learning rate of different parameters. Furthermore, the convergence could take very long if the learning rate is small.

Adam

Adam, for example, is an abbreviated name of adaptive moment estimation. As its name suggests, it works with the first and second order momentums. Momentum is a term that is introduced in the optimization methods to reduce the high variance in methods such as SGD and smooth the convergence curve. It accelerates gradient vector towards the right direction and reduces the oscillations in the irrelevant directions. The motivation behind the Adam is, however, to slow down the gradient descent velocity a little bit for a careful search in the relevant direction and to avoid to jump over the minima. Adam introduces exponentially decaying average of previous gradients $m^{(k)}$ and previous squared gradients $v^{(k)}$. In other words, $m^{(k)}$ is the first moment, which is mean and $v^{(k)}$ is the second moment, which is the uncentered variance of the gradients. Adam is expressed with the equation group 2.15:

$$m^{(k)} = \mu m^{(k-1)} + (1-\mu)\nabla L(\theta^{(k)}), \tag{2.15a}$$

$$v^{(k)} = \rho v^{(k-1)} + (1-\rho)\nabla L(\theta^{(k)}) \odot \nabla L(\theta^{(k)}), \tag{2.15b}$$

$$\hat{m}^{(k)} = \frac{m^{(k)}}{1-\mu^k}, \tag{2.15c}$$

$$\hat{v}^{(k)} = \frac{v^{(k)}}{1-\rho^k}, \tag{2.15d}$$

$$\theta^{(k+1)} = \theta^{(k)} - \eta\frac{\hat{m}^{(k)}+\epsilon}{\sqrt{\hat{v}^{(k)}}+\epsilon}. \tag{2.15e}$$

In the suggested configuration settings, u is usually equal to 0.9, ρ equal to 0.999 and η takes 0.001. Even though Adam is much computationally expensive than other methods, it converges rapidly to solutions with better quality, such as a global minimum or a better local minimum.

Transfer Learning

Transfer learning is a machine learning method that could inherit previous knowledge and transfer it across tasks. It utilizes the pre-trained models as a starting point instead of building and training a model from scratch. One of the obstacles in deep learning is to collect and build a well-labeled, reasonably structured and sufficiently large dataset. Data collection is tremendously time-consuming and a "new-born" model would also take very long to look through this large dataset and optimize the parameters according to it. Many trainings configurations are restricted by the hardware of computers and therefore it is cost-inefficient to train a model in a traditional way.

Another reason to utilize the existing models is that it could also initialize the parameters from previous models rather than random initialization. To be more specific, the top few layers of CNN models always learn some basic features such as frequency bands in audio. These basic elements aggregate together and build up the complex features in deeper layers, which are task-dependently distinctive and are able to differentiate classes (in classification) or value (in regression).

Transfer learning accommodates pre-trained models with the new dataset by fine-tuning. Fine-tuning in transfer learning has two basic steps: (1) to cast off the previous output layers and add a new one for the current task; (2) to retain partial parameters in pre-trained models and initialize parameters in the newly added layers randomly and retrain this model on the new dataset. The most common operation is to freeze (retain) those parameters in top few layers because those features are generic in source and target tasks.

Referring to the example of FIG. 1.3 and the method illustrated in FIG. 1.7, transfer learning in the present disclosure refers to initializing one or more weight coefficients of the at least one inception block of the stereo model based on one or more weight coefficients that had been obtained for at least one inception block of a computer-implemented deep-learning-based system for determining an indication of an audio quality of an input audio frame of a mono audio training signal.

Models

Examples of neural networks for use in accordance with the present disclosure will be described next. These architectures can be roughly categorized into CNN-based networks and Inception-based networks. As an example of models proposed by the present disclosure, the InceptionSE model evolving from Inception-based backbone will be elaborated in detail below.

CNN-based Architectures

RNNs including LSTM and GRU are experts at handling audio signals due to its chain-like structure. CNNs on the other hand are proficient in handling visualised feature representations, such as spectrograms. Attention mechanism was integrated into neural networks due to the inefficiency of RNN architectures when dealing with long sequences. In this section, a fundamental CNN model is built and LSTM layers, self-attention layers and SE layers are integrated separately into the backbone of CNN to form the other three CNN-based models.

CNN Model

Task complexity and size of dataset determine the depth of CNNs. The CNN depth and kernel sizes are considered in and it is experimented on a vanilla CNN architecture for the optimal depth and kernel sizes with a grid search.

The vanilla CNN architecture is shown in FIG. 3.1. It includes 7 convolutional layers (Conv1 to Conv7) with batch normalization followed by 3 fully connected layers (FCL1 to FCL3) with a dropout rate of 0.5. ReLU is used as activation function throughout the network.

Architectures deeper than this show a tendency of over-fitting during the experiments and the error stops to decrease on the validation set. Therefore, this vanilla model is used as the backbone for other experimented architectures. Further experiments confirm that kernel sizes larger than 7 cannot effectively seize tiny features in spectrograms, while kernel sizes 3×3, 5×5 and 7×7 do not show significant difference in the learning process. A kernel size 5×5 was chosen for the first convolutional layer and 3×3 for the rest of layers, considering that the first layer can be viewed Cnn-Based Architectures

TABLE 3.1

Architectures and parameters of CNN model (vanilla)

| Layer | Filter Size/Stride | Output Size |
|---|---|---|
| Input | | 2 × 32 × 360 |
| Conv1 | 5 × 5/(1, 1) | 64 × 32 × 360 |
| MaxPool | 2 × 2/(1, 1) | 64 × 31 × 359 |
| Conv2 | 3 × 3/(2, 2) | 128 × 16 × 180 |
| Conv3 | 3 × 3/(1, 1) | 128 × 16 × 180 |
| MaxPool | 2 × 2/(1, 1) | 128 × 15 × 179 |
| Conv4 | 3 × 3/(1, 1) | 256 × 15 × 179 |
| Conv5 | 3 × 3/(1, 1) | 256 × 15 × 179 |
| MaxPool | 2 × 2/(1, 1) | 256 × 14 × 178 |
| Conv6 | 3 × 3/(1, 1) | 512 × 14 × 178 |
| Conv7 | 3 × 3/(1, 1) | 512 × 14 × 178 |
| AvgPool | 10 × 10/(5, 5) | 512 × 1 × 34 |
| FCL1 | | 1536 × 1 |
| FCL2 | | 512 × 1 |
| FCL2 | | 1 × 1 |

as a T/F-slot-level computation and larger kernels could better summarize patterns.

CNN-LSTM Model

LSTM is capable of learning long-term dependencies and remember the information for a long period of time. Spectrogram inherits the time dimension from audio signals and therefore a classic RNN structure such as LSTM and GRU are also applied in many speech quality assessment tasks based on spectrograms. Models such as NISQA transforms signals into log-mel-spectrograms as actual input to the network. NISQA consists of a CNN head and a LSTM tail. The CNN helps to capture the features from spectrograms and predict a per-frame quality. However, the overall quality cannot be viewed as a simple summation of each per-frame quality, because interference such as short interruptions has been proven to sound more annoying than steady background noise. Therefore, they use bidirectional LSTM (bLSTM) after CNN to model dependencies between frames and forecast an overall speech quality.

In this disclosure, a bLSTM layer was applied along time/frequency dimension to analyse the association between frames and frequency bands (shown in Table 3.2). It is added behind the last convolutional layer in vanilla CNN model and before the global average pooling layer. This model, however, has been observed in later experiments with exponentially high computation cost compared to other models. Therefore, other efficient layers to bypass LSTM are looked for.

TABLE 3.2

Architectures and parameters of CNN-LSTM model

| Layer | Filter Size/Stride | Output Size |
|---|---|---|
| Input | | 2 × 32 × 360 |
| Conv1 | 5 × 5/(1, 1) | 64 × 32 × 360 |
| MaxPool | 2 × 2/(1, 1) | 64 × 31 × 359 |
| Conv2 | 3 × 3/(2, 2) | 128 × 16 × 180 |
| Conv3 | 3 × 3/(1, 1) | 128 × 16 × 180 |
| MaxPool | 2 × 2/(1, 1) | 128 × 15 × 179 |
| Conv4 | 3 × 3/(1, 1) | 256 × 15 × 179 |
| Conv5 | 3 × 3/(1, 1) | 256 × 15 × 179 |
| MaxPool | 2 × 2/(1, 1) | 256 × 14 × 178 |
| Conv6 | 3 × 3/(1, 1) | 512 × 14 × 178 |
| Conv7 | 3 × 3/(1, 1) | 512 × 14 × 178 |
| bLSTM (time/ frequency) | | 512 × 14 × 178 |
| AvgPool | 10 × 10/(5, 5) | 512 × 1 × 34 |
| FCL1 | | 1536 × 1 |
| FCL2 | | 512 × 1 |
| FCL2 | | 1 × 1 |

CNN-Attention Model

Attention mechanism has been found to be a better alternative to LSTM for long sequence. They could capture longer dependencies than LSTM and compute the input in parallel rather sequentially. Self-attention is able to compute an attention matrix between all frames or frequency bands regardless of the length of input. In the present disclosure, LSTM units are replaced with a lightweight self-attention layer to simplify the computation complexity.

Table 3.3 shows a CNN-Attention architecture. Self-attention layers are applied to both frequency dimension and time dimension and inserted between convolutional layers of the vanilla CNN model.

TABLE 3.3

Architectures and parameters of CNN-Attention model

| Layer | Filter Size/Stride | Output Size |
|---|---|---|
| Input | | 2 × 32 × 360 |
| Conv1 | 5 × 5/(1, 1) | 64 × 32 × 360 |
| MaxPool | 2 × 2/(1, 1) | 64 × 31 × 359 |
| Conv2 | 3 × 3/(2, 2) | 128 × 16 × 180 |
| Conv3 | 3 × 3/(1, 1) | 128 × 16 × 180 |
| MaxPool | 2 × 2/(1, 1) | 128 × 15 × 179 |
| Conv4 | 3 × 3/(1, 1) | 256 × 15 × 179 |
| Conv5 | 3 × 3/(1, 1) | 256 × 15 × 179 |
| MaxPool | 2 × 2/(1, 1) | 256 × 14 × 178 |
| Self-Attention (time/ frequency) | | 256 × 14 × 178 |

TABLE 3.3-continued

Architectures and parameters of CNN-Attention model

| Layer | Filter Size/Stride | Output Size |
|---|---|---|
| Conv6 | 3 × 3/(1, 1) | 512 × 14 × 178 |
| Conv7 | 3 × 3/(1, 1) | 512 × 14 × 178 |
| Self-Attention (time/ frequency) | | 512 × 14 × 178 |
| AvgPool | 10 × 10/(5, 5) | 512 × 1 × 34 |
| FCL1 | | 1536 × 1 |
| FCL2 | | 512 × 1 |
| FCL2 | | 1 × 1 |

CNN-SE Model

The Squeeze-and-excitation mechanism aims to boost meaningful features, while suppressing weak ones by extra attention weights applied to channels. The SE module was thus used for channel recalibration of feature maps. In one implementation, these SE modules were incorporated within the vanilla CNN model with minimal computation complexity and the performance of this CNN-SE model was monitored. Two extra SE layers may be integrated into the backbone of vanilla CNN model as shown in Table 3.4. They compute 256×1 and 512×1 attention matrices, respectively, which are applied to the feature maps by a broadcast element-wise multiplication.

Inception-Based Models

The input size 2×32×360 (an example input size used in the training, and explained later in training dataset preparation), as explained in above, is a long narrow rectangular matrix. Classic kernels such as 3×3 and 5×5 would not optimally adapt to rectangular input. A rectangular kernel such as a horizontal kernel as temporal kernel could seize rhythmic and tempo patterns. A vertical kernel (frequency kernel) could learn timbre and such setups over broader frequency bands. These rectangular kernels were fit into the structure of the Inception block and a new backbone for audio quality evaluation was found. Inception network has been successfully transfer learned in many audio classification tasks. This indicates that Inception network could effectively capture the latent features in audio. Therefore, four variants were constructed based on the backbone of Inception blocks with rectangular kernels, which are Inception model (naive), InceptionSE model (naive), Inception model without head layer and InceptionSE model without head layer. InceptionSE model without head layer is the preferred architecture.

TABLE 3.4

Architectures and parameters of CNN-SE model

| Layer | Filter Size/Stride | Output Size |
|---|---|---|
| Input | | 2 × 32 × 360 |
| Conv1 | 5 × 5/(1, 1) | 64 × 32 × 360 |
| MaxPool | 2 × 2/(1, 1) | 64 × 31 × 359 |
| Conv2 | 3 × 3/(2, 2) | 128 × 16 × 180 |
| Conv3 | 3 × 3/(1, 1) | 128 × 16 × 180 |
| MaxPool | 2 × 2/(1, 1) | 128 × 15 × 179 |
| Conv4 | 3 × 3/(1, 1) | 256 × 15 × 179 |
| Conv5 | 3 × 3/(1, 1) | 256 × 15 × 179 |
| MaxPool | 2 × 2/(1, 1) | 256 × 14 × 178 |
| SE | | 256 × 14 × 178 |
| Conv6 | 3 × 3/(1, 1) | 512 × 14 × 178 |
| Conv7 | 3 × 3/(1, 1) | 512 × 14 × 178 |
| SE | | 512 × 14 × 178 |
| AvgPool | 10 × 10/(5, 5) | 512 × 1 × 34 |

TABLE 3.4-continued

Architectures and parameters of CNN-SE model

| Layer | Filter Size/Stride | Output Size |
|---|---|---|
| FCL1 | | 1536 × 1 |
| FCL2 | | 512 × 1 |
| FCL2 | | 1 × 1 |

Inception Model

Kernel sizes larger than 9×9 shows inefficiency in capturing feature within this input size. Therefore, we restrict the current Inception model to kernel sizes 1×1, 1×3, 3×1, 1×5, 5×1, 3×7, 7×3, 3×5, 5×3. Inception module forms a combination of three convolutional layers in different kernels size and a parallel pooling path with their output feature maps concatenated into a single output vector. As features of higher abstraction are captured by higher layers, their spatial concentration is expected to decrease. This suggests that the ratio of smaller kernel sizes should increase as moving to higher layers.

In general, this Inception network includes modules of the above types stacked upon each other while keeping the first layer as a traditional convolutional fashion. The head convolutional layer is not strictly necessary, which reflects the inefficiencies of this naive Inception model.

Further, the auxiliary classifier is removed considering that Inception-based networks as described herein are relatively shallow, but one head layer is kept in our naive Inception model to examine how it will impact the learning process.

TABLE 3.5

Architectures and parameters of Inception model (naive)

| Layer | Filter Size/Stride | Output Size | Horizontal kernel size/ channels |
|---|---|---|---|
| Input | | 2 × 32 × 360 | |
| Conv1 | 5 × 5/(1, 1) | 32 × 32 × 360 | |
| MaxPool | 2 × 2 /(1, 1) | 32 × 31 × 359 | |
| Inception1 | | 208 × 16 × 180 | 3 × 7/64 |
| Inception2 | | 224 × 16 × 90 | 3 × 7/64 |
| Inception3 | | 256 × 16 × 45 | 3 × 5/64 |
| Inception4 | | 256 × 14 × 22 | 3 × 3/64 |
| Adaptive AvgPool | | 256 × 4 × 4 | |
| FCL1 | | 3200 × 1 | |
| FCL2 | | 512 × 1 | |
| FCL2 | | 1 × 1 | |

| Layer | Vertical kernel size/channels | 1 × 1/ channels | Pooling/ channels |
|---|---|---|---|
| Input | | | |
| Conv1 | | | |
| MaxPool | | | |
| Inception1 | 7 × 3/64 | 64 | 16 |
| Inception2 | 7 × 3/64 | 64 | 32 |
| Inception3 | 5 × 3/64 | 64 | 64 |
| Inception4 | 5 × 5/64 | 64 | 64 |
| Adaptive AvgPool | | | |
| FCL1 | | | |
| FCL2 | | | |
| FCL2 | | | |

The combination of FIGS. 3.2A to 3.2D illustrates the architecture of naive Inception model and its parameters are listed in Table 3.5. Its basic Inception block derives from the adapted Inception block depicted in FIG. 2.24 with a ReLU and a BatchNorm after each convolution operation.

InceptionSE Model

Similarly, SE layers were introduced into the backbone of Inception network motivated by improving the resistance of the model against the so-called "adversarial examples". Taking the output from generative models as example, the objective audio quality estimators so far fail to predict the quality of these generated samples. Adversarial examples are one huge obstruction in constructing a robust audio quality predictor because machines take only 0s and is matrices (rather than hear them). An excerpt added with fine-tuned inaudible noise would heavily disturb machine's algorithms but human would not sense any difference. SE layers are believed to facilitate the model to focus on generic features and reduce the influence from random variations at the instance level. The naive InceptionSE model is depicted in the combination of FIGS. 3.4A to 3.4F and its parameters in Table 3.6, where SE layers are inserted between Inception blocks and produce an attention weight on each channel of Inception blocks.

TABLE 3.6

Architectures and parameters of InceptionSE model (naive)

| Layer | Filter Size/Stride | Output Size | Horizontal kernel size/ channels |
|---|---|---|---|
| Input | | 2 × 32 × 360 | |
| Conv1 | 5 × 5/(1, 1) | 32 × 32 × 360 | |
| MaxPool | 2 × 2/(1, 1) | 32 × 31 × 359 | |
| Inception1 | | 208 × 16 × 180 | 3 × 7/64 |
| Inception2 | | 224 × 16 × 90 | 3 × 7/64 |
| SE1 | | 224 × 16 × 90 | |
| Inception3 | | 256 × 16 × 45 | 3 × 5/64 |
| SE2 | | 256 × 16 × 45 | |
| Inception4 | | 256 × 14 × 22 | 3 × 3/64 |
| SE3 | | 256 × 14 × 22 | |
| Adaptive AvgPool | | 256 × 4 × 4 | |
| FCL1 | | 3200 × 1 | |
| FCL2 | | 512 × 1 | |
| FCL2 | | 1 × 1 | |

| Layer | Vertical kernel size/channels | 1 × 1/ channels | Pooling/ channels |
|---|---|---|---|
| Input | | | |
| Conv1 | | | |
| MaxPool | | | |
| Inception1 | 7 × 3/64 | 64 | 16 |
| Inception2 | 7 × 3/64 | 64 | 32 |
| SE1 | | | |
| Inception3 | 5 × 3/64 | 64 | 64 |
| SE2 | | | |
| Inception4 | 5 × 5/64 | 64 | 64 |
| SE3 | | | |
| Adaptive AvgPool | | | |
| FCL1 | | | |
| FCL2 | | | |
| FCL2 | | | |

Inception and InceptionSE Model without Head Layer

Features captured by the top few layers in CNNs are usually reckoned as some primary features such as frequency and temporal patterns in audio related tasks. Gammatone spectrograms as a visual frequency-time representation of audio signals are extracted by Gammatone filters in advance and an extra convolutional layer in head before Inception blocks is intuitively redundant for current incarnations. The head layer has been removed from both the naive Inception model and the naive InceptionSE model and the performance of the modified model prototypes was examined. The parameters of the InceptionSE model without head layer are listed in Table 3.7 and the table for the Inception model without head layer is omitted since they share the same parameters apart from additional SE layers, while their architectures are depicted in the combination of FIGS. 3.3A to 3.3D and the combination of FIGS. 3.5A to 3.5F, respectively.

TABLE 3.7

Architectures and parameters of InceptionSE model without Head

| Layer | Filter Size/Stride | Output Size | Horizontal kernel size/channels |
|---|---|---|---|
| Input | | 2 × 32 × 360 | |
| Inception1 | | 208 × 16 × 180 | 3 × 7/64 |
| Inception2 | | 224 × 16 × 90 | 3 × 7/64 |
| SE1 | | 224 × 16 × 90 | |
| Inception3 | | 256 × 16 × 45 | 3 × 5/64 |
| SE2 | | 256 × 16 × 45 | |
| Inception4 | | 256 × 14 × 22 | 3 × 3/64 |
| SE3 | | 256 × 14 × 22 | |
| Adaptive AvgPool | | 256 × 4 × 4 | |
| FCL1 | | 3200 × 1 | |
| FCL2 | | 512 × 1 | |
| FCL2 | | 1 × 1 | |

| Layer | Vertical kernel size/channels | 1 × 1/ channels | Pooling/ channels |
|---|---|---|---|
| Input | | | |
| Inception1 | 7 × 3/64 | 64 | 16 |
| Inception2 | 7 × 3/64 | 64 | 32 |
| SE1 | | | |
| Inception3 | 5 × 3/64 | 64 | 64 |
| SE2 | | | |
| Inception4 | 5 × 5/64 | 64 | 64 |
| SE3 | | | |
| Adaptive AvgPool | | | |
| FCL1 | | | |
| FCL2 | | | |
| FCL2 | | | |

In a nutshell, the InceptionSE model without head layer (from now on abbreviated as InceptionSE model) is chosen as proposed model of this disclosure due to its overall performance as well as its compact architecture. It has been observed in the later experiments that it offers a rapid training process and a stable performance on both training and test datasets. Further details of systems and methods for determining an indication of an audio quality of an input audio frame with different architectures and fine-tuning parameters will be elaborated below.

Datasets

The diversity of tasks in audio processing is the major reason of lacking in a unified(database. Datasets used in the previous audio and speech quality evaluation research are collected and annotated by individuals and not published for other research.

Therefore, own data was used covering music, speech and speech mixed with music excerpts to create a 48 kHz sampling rate training dataset. In the last section, two test datasets will be introduced to evaluate the proposed model.

Training Dataset Preparation

The duration of excerpts used in related audio and speech quality evaluation tasks varies from 6 to 15 seconds long and minimally 1000 clean reference samples are generated for training. Therefore, a corpus of 10 hours long clean music excerpts was used and 2 hours long clean speech excerpts at a sampling rate of 48 kHz. The data generation and labeling procedure is outlined in FIG. 4.1.

The clean reference is first segmented into 5400 approximately 8 seconds long excerpts and the left channel is extracted from each excerpt as a mono signal. These mono clips are then encoded and decoded by High-Efficiency Advanced Audio Coding (HE-AAC) and Advanced Audio Coding (AAC) codec with the following bitrates: 16, 20, 24, 32, 48, 64, 96, and 128 kbps. Bitrates 16, 20, 24, 32, and 48 kbps was encoded with HE-AAC and bitrates 64, 96, and 128 kbps was encoded with plain AAC. Coding above 128 kbps will be hardly audibly different from un-coded signals and coding below 16 kbps will greatly reduce the audio quality. Thus, 43, 200 degraded signals are generated from 5400 clean reference excerpts.

The reference and degraded signals are aligned and paired and later fed into ViSQOL v3 to produce MOS-LQO as the corresponding ground truth labels instead of human annotated MOS scores. Gammatone spectrograms of reference and degraded signals are extracted based on the MATLAB implementation, whose C++ is running inside ViSQOL v3. It was verified that both MATLAB and C++ version generate same gammatone spectrograms. The gammatone spectrogram of the audio signal is calculated with a window size of 80 ms, hop size of 20 ms, and 32 frequency bands ranging from 50 Hz up to half of the highest sampling rate, i.e. 24 kHz. The resulting gammatone spectrograms of reference and degraded signals are paired and stacked along channel dimension, which results in an input size 2±,2±60 to the neural network. Note that this is just an input size used only for training. Since this is a convolutional model, it can operate on sequences of any input length. That is, the model could accept smaller time frame as input, and predict quality on a frame-by-frame basis (e.g. every 600 ms) or over the whole music duration (e.g. 5 minutes or longer as permitted by memory).

Here, 2 denotes 2 channels, 32 denotes 32 frequency bands and time resolution is calculated according to Equation 4.1:

$$t = \frac{(\text{Sample\_duration} - \text{Window\_size})}{\text{Hop\_size}} + 1. \tag{4.1}$$

Since not all excerpts are exactly 8 seconds, and excerpts shorter than 8 seconds result in 360 columns in time dimension. The input size was unified into 2×32×360 by abandoning the extra columns after 360. The gammatone spectrogram of one training sample is illustrated in FIG. 4.2.

The resulting training set is illustrated in FIGS. 4.3 and 4.4. Two obvious characteristics of this training dataset can be observed from the distribution based on MOS and bitrates: almost 80% of samples are rated above 4.0 by ViSQOL and the highest rated samples are concentrated in the region of high bitrates according to FIG. 4.3. Second, according to FIG. 4.4 the overall trend of MOS-LQO increases as the bitrate except for the bitrate points at 48 kbit/s and 64 kbit/s. ViSQOL rates 64 kbps excerpts lower in quality than 48 kbps, which is contrary to empirical experience and intuition. One possible reason for this abnormality could be 48 kbps excerpts are coded with HE-AAC, which creates a higher and extended bandwidth with spectral band replication (SBR), but 64 kbps excerpts are coded with AAC. It can be also observed from spectrograms in the FIGS. 4.8 and 4.9 that the sample WADmus047 has wider bandwidth at 48 kbps than at 64 kbps, while the other bandwidths (shown in FIGS. 4.5 to 4.13) widen as the bitrate increases. Another possibility could be that 64 kbps bitrate encoder operating point is not fine-tuned optimally. Thus, 48 kbps and 64 kbps excerpts in the training set could mislead the model to learn a wrong pattern and thus those excerpts were excluded from the training set. In order to balance this biased training set towards low MOS-LQO and calibrate the scores with subjective listening tests in evaluation, the clean reference was included as well as two anchors, which are 3.5 kHz and 7.0 kHz low-pass filtered reference signals, into the degraded signals. In addition, excerpts coded at 40 kbps, 48 kbps (but, bandwidth limited to 18 kHz) and 80 kbps are included into degraded signals and labeled with ViSQOL v3 estimation as well. One severe drawback of ViSQOL v3 is its inaccuracy in predicting the quality of clean original signals. When ViSQOL v3 takes reference-reference (ref-ref) pairs to predict the quality of the clean original excerpts, the estimated MOS score is constrained to 4.73 rather than the highest score of 5. Therefore, all ref-ref pairs were manually labeled with the highest MOS score of 5 as ground truth in an attempt to push the models to rate reference signals with the highest score of 5.

FIG. 4.14 plots the new training set (except for the reference). In the FIGURE, 48 refers to the excerpts coded at 48 kbps bandwidth limited to 18 kHz. It is jumped over the MOS valley by excluding 64 kbps excerpts from the training and it is obtained a monotonically increasing MOS-LQO in the training set. This special care was taken in making sure that the quality increases with bitrates. This helps in making sure that the model is capable of ranking correctly (learning-to-rank strategy); i.e. if a signal x_j is a programmatically degraded version of the same original signal x_i, then their scores should reflect such relation, i.e., MOS_i≥MOS_j.

Noise and Silence

During evaluation, the model has been observed to fail in predicting accurately the quality of the excerpts which have very low-energy content in high frequency bands. When such audio excerpts are coded at high bitrates, listeners would not perceive the slight defect existing in high frequency bands and would also rate these excerpts with high scores. However, machines are more sensitive than humans because they "see" the matrices of spectrograms instead of actually "hearing" them. Therefore, the model treats every T/F-slot alike and is not able to ignore those defects in high frequency bands like the way humans do.

FIGS. 4.15 and 4.16 display one such samples with low-energy content in the high frequency region. Most of its content concentrates under 4 kHz and when this excerpt is coded at higher bitrates, there is a huge spectral hole existing between 10 kHz and 16 kHz on its spectrogram (marked by the dashed box in FIG. 4.16). Even though listeners cannot perceive it, computers could see this defect in the spectrogram and rate this excerpt with an unexpectedly low score.

TABLE 4.1

Training dataset composition

| Number of Examples | Pairs | Bitrate (kbps) | Label (MOS) |
|---|---|---|---|
| 5400 (12 h) | Ref-Ref (music and speech) | — | 5 |
| 11 × 5400 | Ref-Deg (music and speech) | 16, 20, 24, 32, 40, 48BW18k, 80, 96, 128 | ViSQOL MOS-LQO |

TABLE 4.1-continued

Training dataset composition

| Number of Examples | Pairs | Bitrate (kbps) | Label (MOS) |
|---|---|---|---|
| 336 (0.75 h) | Ref-Ref (brown, pink, white noise) | | 5 |
| 3 × 336 | Ref-Deg (brown, pink, white noise) | 80, 96, 128 | 5 |
| 370 (0.83 h) | Ref-Ref (white noise and silence) | | 5 |
| 3 × 370 | Ref-Deg (white noise and silence) | 80, 96, 128 | 5 |

ViSQOL v3 sets up a spectrogram threshold to address this issue, while it is attempted to include fine-tuned noise and silence excerpts in the training set to push up the quality scores predicted by the model for this type of defect. These noise and silence excerpts are low-energy (lower than −108 dB) high-pass filtered signals and then encoded and decoded at high bitrates (80 kbps, 96 kbps and 128 kbps), which are inaudible to listeners with normal hearing. Motivation behind this idea is to train the model with visibly different (on spectrograms), but perceptually equivalent pairs of (un-encoded-coded) signals. These reference-degraded (ref-deg) pairs are labeled manually as MOS score 5, considering that their addition into audio excerpts would hardly harm listener experience. Through adding these noise and silence excerpts in the training set, it is expected to force the model to learn the pattern of noises in high frequency bands and be more tolerant of such imperfections.

In total, 5 minutes of silence and 90 minutes of noise excerpts, including 60 minutes of white noise, 15 minutes of pink noise and 15 minutes of brown noise were generated and coded at 80 kbps, 96 kbps and 128 kbps, respectively. These excerpts were then segmented into 8 seconds long excerpts and paired with its corresponding reference.

In conclusion, the overall composition of the final training dataset is listed in the Table 4.1. Only ref-deg pairs of music and speech signals use the estimation of ViSQOL as ground truth and the other pairs are annotated manually with the highest score 5. The paired signals are transformed into Gammatone spectrogram matrix of shape of 2×32×360 as input to the models.

Test Datasets

Test dataset is a vital link to verify the utility of trained models. Excellent performance of the model on the training set does not necessarily mean the success of training. Test set is a collection of samples that models have never seen and thus it assists to rectify the model (according to model's performance on it). A collection of 56 critical excerpts typically used to evaluate audio codecs and USAC Verification Listening Tests are the two test sets.

Set of Critical Excerpts for Codecs

This set includes one applause excerpt, speech excerpts in different languages and genders, music excerpts as well as excerpts which are a mix of both speech and music. However, this test set is lacking in MOS scores and therefore this test set is used to evaluate how well the model correlates with ViSQOL v3 on unseen data.

Samples in the test set are processed exactly as the training set. These 56 excerpts are encoded and decoded with the same codecs at following bitrates:16, 20, 24, 32, 40, 48 (bandwidth limited 18 kHz), 80, 96, and 128 kbps. The ref-deg pairs are fed into ViSQOL v3 for MOS-LQO scores (marked as MOS-v) and transformed into gammatone spectrogram matrices, which are then fed into InceptionSE model for a new MOS-LQO scores (marked as MOS-i). MOS-v and MOS-i are compared and illustrated to evaluate the performance of the models with respect to ViSQOL.

USAC Verification Listening Tests

The Unified Speech and Audio Coding (USAC) technology was developed to provide coding of signals having an arbitrary mix of speech and audio content with consistent quality across content types, in particular at intermediate and low bitrates. USAC Verification Listening Tests contain 27 items coded with USAC and the other two best codecs tailored for general audio or speech (i.e. HE-AACv2 and AMR-WB+) on the whole range of bitrates from 8 kbps mono to 96 kbps stereo.

The verification tests were designed to provide information on the subjective performance of USAC in mono and stereo over a wide range of bit rates from 8 to 96 kbps compared to the subjective performance of the other codecs (i.e. HE-AACv2 and AMR-WB+). Depending on the listening test, at least 8 listeners at 6 to 13 test sites participated each test and more than 38000 individual scores on three different codecs were collect. These verification tests provide us a standardised quality metric to evaluate the performance of InceptionSE model and correlate the predictions with subjective quality scores.

TABLE 4.2

Conditions for Mono Listening Test 1 at low bitrates

| Condition | Label |
|---|---|
| Hidden reference | HR |
| Low pass anchor at 3.5 kHz | LP3500 |
| Low pass anchor at 7.0 kHz | LP7000 |
| AMR-WB+ at 8 kbps | AMR-8 |
| AMR-WB+ at 12 kbps | AMR-12 |
| AMR-WB+ at 24 kbps | AMR-24 |
| HE-AAC v2 at 12 kbps | HE-AAC-12 |
| HE-AAC v2 at 24 kbps | HE-AAC-24 |
| USAC at 8 kbps | USAC-8 |
| USAC at 12 kbps | USAC-12 |
| USAC at 16 kbps | USAC-16 |
| USAC at 24 kbps | USAC-24 |

Three separate listening tests have been performed, including mono signals at low rates, stereo at low rates and high rates. The conditions included in each test are given in the Tables 4.2 to 4.4. Along with USAC, HE-AACv2 and AMR-WB+ are codecs evaluated in tests.

All tests used MUSHRA method, whose quality scale ranges from 0 to 100 with no decimals digits. All test items are about 8 seconds in duration. The scores are excluded if the following criterion are not satisfied:

The listener score for the hidden reference is greater than or equal to 90 (i.e. HR>=90)

The listener scores the hidden reference, the 7.0 kHz low-pass anchor and the 3.5 kHz low-pass anchor are monotonically decreasing (i.e. HR>=LP70>=LP35).

Mono Listening Test1

The items in this test are mono signals coded at low bitrates. InceptionSE model is designed and trained on mono signals as well. Therefore, the performance of InceptionSE model on this mono listening test is for fine-tuning the model at the low bitrates with respect to the subjective quality scores.

Stereo Listening Test2 and Test3

Listening test2 and test3 are conducted on the stereo signals at low rates and high rates, respectively. They are supplementary tests to examine the performance of the models on stereo signals. The mid-channel is calculated as an average of the left and right channels of a stereo audio excerpt and input the mid-channel into InceptionSE model for an objective MOS score of the stereo audio excerpt. However, this simple summation of multi-channel is not how the ear process the stereo signals. Hence, the results on stereo listening tests work merely as an indicator to show the potential of InceptionSE for stereo signals.

TABLE 4.3

Conditions for Stereo Listening Test 2 at low bitrates

| Condition | Label |
|---|---|
| Hidden reference | HR |
| Low pass anchor at 3.5 kHz | LP3500 |
| Low pass anchor at 7.0 kHz | LP7000 |
| AMR-WB+ at 16 kbps | AMR-16 |
| AMR-WB+ at 24 kbps | AMR-24 |
| HE-AAC v2 at 16 kbps | HE-AAC-16 |
| HE-AAC v2 at 24 kbps | HE-AAC-24 |
| USAC at 16 kbps | USAC-16 |
| USAC at 20 kbps | USAC-20 |
| USAC at 24 kbps | USAC-24 |

TABLE 4.4

Conditions for Stereo Listening Test 3 at high bitrates

| Condition | Label |
|---|---|
| Hidden reference | HR |
| Low pass anchor at 3.5 kHz | LP3500 |
| Low pass anchor at 7.0 kHz | LP7000 |
| AMR-WB+ at 32 kbps | AMR-32 |
| HE-AAC v2 at 32 kbps | HE-AAC-32 |
| HE-AAC v2 at 64 kbps | HE-AAC-64 |
| HE-AAC v2 at 96 kbps | HE-AAC-96 |
| USAC at 32 kbps | USAC-32 |
| USAC at 48 kbps | USAC-48 |
| USAC at 64 kbps | USAC-64 |
| USAC at 96 kbps | USAC-96 |

Experiments

The models constructed in the previous sections were experimented using the data corpus described above. The performance of each model is evaluated under the following criteria: computation efficiency, parameter amount, mean squared error (MSE), Spearman's correlation coefficient ($R_s$) and Pearson's correlation coefficient (Rp). In the final section, the proposed model will be examined on the test sets and the results give an insight into how the proposed model performs on the unseen data coded with other codecs.

Experiments with Architecture Variants

In this section, five models with distinct backbones are evaluated training on the dataset including noise and silence excerpts. These models are vanilla CNN model, CNN-LSTM model, CNN-Attention model, CNN-SE model and naive Inception model. Further, the advantages of the Inception-based model are discussed.

Comparison between CNN-based and Inception Models

The training dataset including noise and silence results in a total of 67624 ref-deg pairs (more precisely, ref-ref and ref-deg pairs). The data were partitioned randomly into 80% for training and 20% for validation. A 5-fold cross-validation is applied to ensure that the model could make full use of limited data. The average $R_p$ and MSE per fold and epoch will be calculated to represent the overall performance of each model. The mean and variance of the input features were normalised using the estimation from the training set. All experiments are implemented with PyTorch and were trained for 50 epochs on a Nvidia GTX 1080 Ti GPU using the Adam optimizer. Grid searches were performed over learning rates, batch sizes and a learning rate of 0.0004 and a batch size of 32 as training parameters were selected. Batch normalization was applied after all convolutional layers and all models use MSE loss as the loss function. In the view of the training dataset size, dropout was used as the regularization technique to prevent overfitting on the limited dataset.

The amount of parameters (counted in millions M) and the training time for an epoch are listed in the Table 5.1. CNN-LSTM model occupies memory exponentially high if not downsampling input size and CNN-LSTM was excluded from the further work due to its computation inefficiency. Another finding is that extra self-attention layers and SE layers do not aggravate much computational burden. Furthermore, Inception-based network streamlines the architectures with fewer parameters and layers and shorten the training time needed per epoch.

TABLE 5.1

Computation efficiency of experimented models

| Model | Params | Time/epoch (min) |
|---|---|---|
| CNN-based model | 32.18M | 8.67 (3.65 it/s) |
| CNN-LSTM-based model | 423.92M | out of memory |
| CNN-Attention-based model | 32.59M | 7 (4.47 it/s) |
| CNN-SE model | 32.22M | 7 (4.47 it/s) |
| Inception naive model | 15.25M | 5.5 (5.18 it/s) |

Table 5.2 summarizes performance of the remaining four models. The progress was monitored via $R_p$ and MSE over a validation subset. Interestingly, naive Inception model has achieved a comparable performance as a CNN-Attention model with merely half of parameters and less training time. SE layers, on the contrary, sacrifice the accuracy of CNN model for higher robustness (as expected).

TABLE 5.2

$R_p$ and MSE of experimented models

| Model | $R_p$ | MSE |
|---|---|---|
| CNN-based model | 0.69 | 0.3131 |
| CNN-Attention-based model (time) | 0.882 | 0.1155 |
| CNN-Attention-based model (frequency) | 0.881 | 0.1005 |
| CNN-SE model | 0.6587 | 0.4132 |
| Inception naive model | 0.8773 | 0.1748 |

In short, naive Inception model has outperformed others in terms of high correlation with ground truth and a low average error on the validation set with merely half of training parameters.

Further performance gains would be achieved by fine-tuning Inception-based model and it was experimented further on the variants of Inception-based model.

Comparison Between Inception-Based Variants

Three more variants from Inception-based models with SE layers inserted were evolved and the head layer removed. The progress of these models was recorded and the performance is listed in Table 5.3.

TABLE 5.3

| $R_p$ and MSE of Inception-based variants | | | |
|---|---|---|---|
| Model | $R_p$ | MSE | Params |
| Inception-based model | 0.8773 | 0.1748 | 15.25M |
| Inception-based model w/o head layer | 0.9224 | 0.0726 | 15.23M |
| Inception-SE-based model | 0.8547 | 0.1611 | 15.27M |
| Inception-SE-based model w/o head layer | 0.9167 | 0.0741 | 15.25M |

A significant performance improvement has been achieved by removing the head layer in Inception-based models, and parameters for training are further reduced. This modification depends on the input format fed into the models. Gammatone spectrograms are a visual representation of a set of frequency bands over the entire time scale. The top layers in CNNs usually learn primary features such as frequency bands and pattern over time, which have been extracted by the gammatone filters in the data pre-processing. Therefore, an extra convolutional layer on the top would be redundant for computation in this case. Inception-based models could also be adapted to analysing raw audio waveforms. Under this circumstance, it is hypothesized that such a head layer may be necessary in extracting the primary features.

On the contrary, SE layers do not increase the correlation of experimented models with ViSQOL as expected. One property of SE layers is to improve the robustness of Inception-based models against adversarial examples. This could sacrifice the model's accuracy on the targeted task and achieve better adaptability on a broader range of samples.

Experiments with Loss Functions

Experiments in search for a suitable loss function are conducted and the influence of loss functions on InceptionSE model without the head layer is evaluated.

TABLE 5.4

| Performance of InceptionSE model with various loss functions | | | |
|---|---|---|---|
| Loss Function | Average $R_p$ | Average Validation Error | Best Model $R_p$ |
| MSEloss | 0.9167 | 0.1442 | 0.9913 |
| L1loss | 0.9451 | 0.0741 | 0.9948 |
| SmoothL1loss | 0.9709 | 0.0519 | 0.9967 |

As can be observed from Table 5.4, all these loss functions have achieved an average $R_p$ over 0.9 with respect to ViSQOL v3 on the validation set from Table 5.4. The best model of each configuration has all exceeded a $R_p$ of 0.99. However, Smooth L1 loss has been observed to stabilize the training progress with a slightly fast convergence speed. In the final proposal, the best model trained by Smooth L1 loss was chosen. Alternatively, models trained by the other two loss functions may be feasible as well.

Experiments with Reference, Noise and Silence

One apparent deficiency of ViSQOL v3 during generation of scores is its limitation in predicting quality scores of clean reference signals. The highest prediction scores produced by ViSQOL is bounded by 4.73, even though the audio excerpts are perceptually transparent for listeners. All ref-ref pairs were manually labeled as 5 rather than 4.73 predicted by ViSQOL v3, which enables the models to learn the correct upper boundary as 5.

Excerpts such as the sample CO 02 OMensch and sc01 (a trumpet excerpt, from the MPEG-12 set) are featured with low-energy content in high frequency bands. The models in the early stage would estimate this type of samples coded with high bitrates with far lower scores than ViSQOL v3 and subjective listening tests scores. This issue is addressed by including low-energy high-pass filtered noise and silence excerpts in the training set. Positive impact of noise and silence is confirmed by the new prediction of CO 02 OMensch and sc01.

CO 02 OMensch in Table 5.5 is underestimated by the early model trained without noise and silence, while ViSQOL v3 rates this excerpt with its highest score as 4.73 and in subjective listening tests, it is rated almost as high as 5. The new estimation by the model trained with noise and silence surpasses the performance of ViSQOL v3 and matches better with subjective quality scores.

TABLE 5.5

| Performance of InceptionSE model on the excerpt CO 02 OMensch | | |
|---|---|---|
| Model | MOS estimation | ViSQOL estimation |
| InceptionSE w/o noise and silence | 3.7 | 4.73 |
| InceptionSE w/ noise and silence | 5.0 | 4.73 |

Sc01 is another typical example that disturbs the early model trained without noise and silence. As depicted in FIGS. 5.1 and 5.2, cross represents the prediction from neural networks and bullet is the prediction from ViSQOL v3. Compared to the early estimation of the model on the left, the predicted MOS-LQO scores have significantly improved, especially at high bitrates. It is also worth noting that the models trained with manually annotated ref-ref pairs successfully predict the original quality of sc01 as 5 (instead of 4.73 as predicted by ViSQOL v3).

Results on the Set of Critical Excerpts for Codecs

Test set of critical excerpts for codecs consists of 56 items including speech, music and applause excerpts. The correlation between our prediction and that of ViSQOL v3 is computed on this test set. The InceptionSE (without head layer) model is examined under two conditions, namely training with noise and silence and without noise and silence. $R_p$ and $R_s$ are calculated in the Table 6.1, including two anchors (3.5 kHz and 7.0 kHz) and the reference. As can be seen, both $R_p$ and $R_s$ have improved after training with specially designed noise and silence; and the proposed InceptionSE (without head layer) model has achieved a strong correlation with ViSQOL v3 with a correlation coefficient over 0.97 on the unseen data.

TABLE 6.1

| Performance of Inception-based model on the set of critical excerpts for codecs | | |
|---|---|---|
| Model | $R_p$ | $R_s$ |
| InceptionSE without noise and silence | 0.9374 | 0.919 |
| InceptionSE with noise and silence | 0.9721 | 0.9851 |

Apart from sc01 (trumpet), two more samples from the MPEG-USAC-43 set and an extra applause excerpt are illustrated in FIGS. 6.1 to 6.6. KoreanM1 is a korean male speech, 09-Applaus-5-1 2 0 is an applause excerpt and SpeechOverMusic 1 is an English female speech over stadium noise. In these figures, different degrees of improvement of predicted MOS-LQO scores can be observed in the high bitrate regions. The prediction of KoreanM1 has an overall improvement including its low bitrate regions. KoreanM1 is also observed to be a low-energy content in its high frequency bands and therefore the model trained with noise and silence creates more obvious positive influence over this type of excerpts.

Results on USAC Verification Listening Tests

In addition, to examining the correlation between the model and ViSQOL v3, it is also critical to verify the utility of the proposed model on the unseen data labeled with subjective quality scores. USAC Verification tests is another test set, which provides subjective quality scores on 27 items coded with AMR, USAC as well as HE-AAC covering a large range of bitrates. Three separate tests are conducted for mono excerpts at low bitrates, stereo excerpts at low and high bitrates. $R_p$ and $R_s$ are calculated for mono listening test 1 between subjective quality scores and the prediction of different objective audio quality methods including PEAQ, ViSQOL with MATLAB implementation, ViSQOL v3 with C++ implementation and the proposed model, the InceptionSE model. Tests on stereo excerpts are supplementary experiments and their results display the potential in extending the current model towards stereo.

Results on Mono Listening Test-1

USAC Verification Listening Test1 is designed for mono signals encoded at low bitrates. The corresponding combination of codecs and bitrates can be found out in Table 4.2. It is referred to the results in P. M. Delgado and J. Herre. "Can we still use PEAQ? a performance analysis of the ITU standard for the objective assessment of perceived audio quality", In 2020 Twelfth International Conference on Quality of Multimedia Experience (QoMEX), pages 1-6, 2020, where the authors examined the correlation between different objective scores (PEAQ and ViSQOL with MATLAB implementation) against subjective scores. The results are listed with PEAQ (Opticom implementation of PEAQ-Advanced version) and ViSQOL (MATLAB) together with ViSQOL v3 and InceptionSE model in Table 6.2.

TABLE 6.2

Performance of PEAQ, ViSQOL (MATLAB), ViSQOL v3 and InceptionSE on mono listening test-1

| Model | $R_p$ | $R_s$ |
|---|---|---|
| PEAQ | 0.65 | 0.7 |
| ViSQOL (MATLAB) | 0.76 | 0.83 |
| ViSQOL-v3 (C++) | 0.81 | 0.84 |
| InceptionSE | 0.83 | 0.835 |

The proposed model has achieved a comparable result as ViSQOL v3 and outperformed the old version ViSQOL (MATLAB) and PEAQ. Furthermore, the performance of the model and ViSQOL v3 is examined on individual codec, namely AMR, HE-AAC and USAC. Similarly, the reference and two anchors are included in each examination and corresponding $R_p$ and $R_s$ are listed in Table 6.3.

TABLE 6.3

Performance of InceptionSE model on various codecs

| Codec | $R_p$ (InceptionSE) | $R_s$ (InceptionSE) | $R_p$ (ViSQOL v3) | $R_s$ (ViSQOL v3) |
|---|---|---|---|---|
| AMR | 0.889 | 0.856 | 0.877 | 0.862 |
| HE-AAC | 0.853 | 0.791 | 0.836 | 0.792 |
| USAC | 0.873 | 0.881 | 0.853 | 0.881 |

As can be seen in Table 6.3, the proposed model results in a slightly better $R_p$ than ViSQOL v3 and has an equivalent $R_s$ as ViSQOL v3. The overall performance of the model on different codecs is consistent with that of ViSQOL v3. Both the proposed model and ViSQOL v3 have performed homogeneously well on the experimented codecs with $R_p$ over 0.83 and $R_s$ over 0.79. The estimation of degraded quality by HE-AAC, under this comparison, is unexpectedly the worst among the three experimented codecs, even though the model is trained on the excerpts encoded with HE-AAC and AAC. One possible reason lies in that the model takes the ground truth labeled by ViSQOL v3 and it captures the exact pattern as how ViSQOL v3 evaluates the quality of signals encoded by HE-AAC. Therefore, the performance of InceptionSE model on different codecs is very similar to that of ViSQOL v3.

There are totally 24 items listed in Table 6.4, without the 3 items that were used for training the listeners. The excerpt Siefried02 is another example with low-energy content in high frequency region. Compared to the estimation of ViSQOL v3, InceptionSE is obviously more robust to this type of excerpts and displays a more stable and reliable prediction than ViSQOL v3. In general, the model presents a comparatively high and robust performance across all signal categories.

Results on Stereo Listening Test-2 & Test-3

Listening test 2 and test 3 are the tests conducted with stereo excerpts coded at low and high bitrates, respectively. The corresponding combination of codecs and bitrates can be found out in Table 4.3 and 4.4. The performance of ViSQOL v3 and InceptionSE model was evaluated against subjective quality scores and corresponding results are shown in Table 6.5 and 6.6. InceptionSE model results in a slightly better $R_p$ than ViSQOL on the two stereo listening tests.

Moreover, InceptionSE model displays a higher accuracy in estimating the quality of excerpts encoded with high bitrates. Albeit only as supplementary tests, results on the stereo tests display

TABLE 6.4

Performance of ViSQOL v3 and InceptionSE Model on items

| Items | Content | $R_p$ (InceptionSE) | $R_p$ (ViSQOL) |
|---|---|---|---|
| Alice short | English female speech between/over classical music | 0.937 | 0.949 |
| Arirang short | Korean male speech | 0.871 | 0.878 |
| Green speech | Korean male speech | 0.854 | 0.856 |
| PannedSpeech-Ekonomiekot cut | Swedish male speech | 0.942 | 0.952 |
| Schmoo lvl2 | Electronic pop music | 0.976 | 0.97 |
| Siefried02 | Classical melodic music | 0.866 | 0.616 |

TABLE 6.4-continued

Performance of ViSQOL v3 and InceptionSE Model on items

| Items | Content | $R_p$ (InceptionSE) | $R_p$ (ViSQOL) |
|---|---|---|---|
| SpeechOverMusic 1 short | English female speech over noise | 0.986 | 0.978 |
| SpeechOverMusic 2 short | English female speech over music | 0.879 | 0.867 |
| SpeechOverMusic 3 short | English male speech over music/noise | 0.971 | 0.968 |
| dora short | English female between/over effects | 0.968 | 0.971 |
| es01 short | English female speech | 0.897 | 0.916 |
| es02 | German male speech | 0.884 | 0.913 |
| es03 | English female speech | 0.909 | 0.897 |
| id4 | Emphatic movie music | 0.96 | 0.951 |
| lion | English male speech between effects | 0.916 | 0.925 |
| mod101 | French speaker over noise | 0.962 | 0.965 |
| noodleking short | English male speech between music | 0.952 | 0.953 |
| phi3 short | Pop music (instrumental) | 0.966 | 0.964 |
| phi4 short | English male speech over music | 0.978 | 0.984 |
| taurusb | Male singing over rock music | 0.966 | 0.972 |
| te09 short | English female over music | 0.921 | 0.935 |
| te19 short | English male speech | 0.922 | 0.955 |
| tel mg54 speech | German male speech | 0.892 | 0.924 |
| trilogy short | Saxophone melody with accompaniment | 0.893 | 0.847 |

TABLE 6.5

Performance of ViSQOL v3 and InceptionSE Model on stereo low bitrates test

| Model | $R_p$ | $R_s$ |
|---|---|---|
| ViSQOL -v3 (C++) | 0.777 | 0.782 |
| InceptionSE model | 0.806 | 0.788 |

TABLE 6.6

Performance of ViSQOL v3 and InceptionSE Model on stereo high bitrates test

| Model | $R_p$ | $R_s$ |
|---|---|---|
| ViSQOL -v3 (C++) | 0.825 | 0.906 |
| InceptionSE model | 0.847 | 0.895 |

a strong correlation between the prediction of InceptionSE model and subjective quality score.

Performance of the Stereo Model on USAC Verification Listening TestsIn the following tables 6.7 to 6.9, the performance of ViSQOL v3, InceptionSE Model mono and stereo on mono low bitrates test, stereo low bitrates test and stereo high bitrates test is shown. The codecs included in the MUSHRA tests were AMR-WB+, HE-AAC-v1, and USAC. In the mono listening test, the stereo signal fed to the stereo model for comparison was dual-mono (L=R). In the stereo listening tests, the stereo signal fed to ViSQOL-v3 and the mono model for comparison was the mid-signal: M=1/2 (L+R).

TABLE 6.7

Performance of ViSQOL v3 and InceptionSE Model mono and stereo on mono low bitrates test

| | ViSQOL-v3 | | InceptionSE model (mono) | | InceptionSE model (stereo) | |
|---|---|---|---|---|---|---|
| Codecs | $R_p$ | $R_s$ | $R_p$ | $R_s$ | $R_p$ | $R_s$ |
| AMR-WB+ | 0.877 | 0.862 | 0.889 | 0.856 | 0.948 | 0.922 |
| HE-AAC | 0.836 | 0.792 | 0.853 | 0.791 | 0.945 | 0.887 |
| USAC | 0.853 | 0.881 | 0.873 | 0.881 | 0.950 | 0.939 |

TABLE 6.8

Performance of ViSQOL v3 and InceptionSE Model mono and stereo on stereo low bitrates test

| | ViSQOL-v3 | | InceptionSE model (mono) | | InceptionSE model (stereo) | |
|---|---|---|---|---|---|---|
| Codecs | $R_p$ | $R_s$ | $R_p$ | $R_s$ | $R_p$ | $R_s$ |
| AMR-WB+ | 0.839 | 0.848 | 0.868 | 0.842 | 0.960 | 0.904 |
| HE-AAC | 0.810 | 0.788 | 0.830 | 0.790 | 0.945 | 0.877 |
| USAC | 0.873 | 0.859 | 0.891 | 0.860 | 0.976 | 0.943 |

TABLE 6.9

Performance of ViSQOL v3 and InceptionSE Model mono and stereo on stereo high bitrates test

| | ViSQOL-v3 | | InceptionSE model (mono) | | InceptionSE model (stereo) | |
|---|---|---|---|---|---|---|
| Codecs | $R_p$ | $R_s$ | $R_p$ | $R_s$ | $R_p$ | $R_s$ |
| AMR-WB+ | 0.824 | 0.860 | 0.864 | 0.852 | 0.955 | 0.925 |
| HE-AAC | 0.860 | 0.931 | 0.871 | 0.925 | 0.946 | 0.949 |
| USAC | 0.899 | 0.935 | 0.909 | 0.920 | 0.964 | 0.942 |

Further Applications in Audio Quality Assessment

Another embodiment may include migrating the current model from ViSQOL-labeled data to subjective listening test data. This may improve consistency with the perceived audio quality. Considering that organizing a giant dataset labeled with subjective quality scores is time-consuming and not realistic, transfer learning from the current model could be a possible solution confined to a limited labeled dataset. Transfer learning also enables to re-train the InceptionSE model for new scenarios such as newly updated codecs. Transfer learning from the current model to similar tasks would greatly shorten the training time as well as development circle.

Furthermore, samples from generative models are still one of the toughest challenges that all current objective audio/speech quality assessment methods are confronted with. Generative models generate new data instances that resemble the training data. Its application in audio coding is so far relatively limited, such as coded audio quality enhancement and neural network-based audio decoding. The generated samples from GANs are so-called “adversarial examples,” which interfere with the existing neural network and result in an incorrect output of the network. For example, an audio excerpt added with a carefully fine-tuned noise would be perceptually identical to listeners. However, this type of attack could fool state-of-the-art algorithms in audio processing and deep learning, which demonstrates a fundamental difference between human auditory system and machines.

Further Applications in Generative Adversarial Networks (GANs)

In some embodiments, the InceptionSE model may be utilized as a discriminator in a GAN, to fine-tune the generator. The InceptionSE would be configured to determine between the real signal and the fake signal generated by the generator during the training process of the GAN.

Furthermore, with transfer learning, the InceptionSE model may be configured to be fine-tuned for specific content-types and/or codec-types.

Interpretation

Unless specifically stated otherwise, as apparent from the following discussions, it is appreciated that throughout the disclosure discussions utilizing terms such as "processing", "computing", "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors. The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include-one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method.

Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to “one embodiment”, “some embodiments” or “an example embodiment” means that a particular feature, structure or characteristic described in connection with the embodiment is included in at least one embodiment of the present disclosure. Thus, appearances of the phrases “in one embodiment”, “in some embodiments” or “in an example embodiment” in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives “first”, “second”, “third”, etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, FIG., or description thereof for the purpose of streamlining the disclosure and aiding in the understanding of one or more of the various inventive aspects.

This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

In the following, further details of the present disclosure will be described in a non-limiting manner by a set of enumerated example embodiments, EEEs:

EEE1. A deep-learning-based system for determining an indication of an audio quality of an input audio frame, the system comprising:

- at least one inception block configured to receive at least one representation of an input audio frame and map the at least one representation of the input audio frame into a feature map, wherein the at least one inception block comprises:
- a plurality of stacked convolutional layers configured to operate in parallel paths, wherein at least one convolutional layer of the plurality of stacked convolutional layers comprises an m×n sized kernel, wherein the integer m is different than the integer n; and
- at least one fully connected layer configured to receive a feature map corresponding to the at least one representation of the input audio frame from the at least one inception block, wherein the at least one fully connected layer is configured to determine the indication of the audio quality of the input audio frame.

EEE2. The system of EEE1, wherein the plurality of stacked convolutional layers comprises at least one convolution layer comprising a horizontal kernel and at least one convolutional layer comprising a vertical kernel.

EEE3. The system of EEE2, wherein the horizontal kernel is configured to learn temporal dependencies of the input audio frame.

EEE4. The system of EEE2, wherein the vertical kernel is configured to learn timbrel dependencies of the input audio frame.

EEE5. The system of EEE1, wherein the at least one inception block further comprises a squeeze-and-excitation, SE, layer.

EEE6. The system of EEE5, wherein the squeeze-and-excitation layer is applied after the last stacked convolutional layer of the plurality of stacked convolutional layers.

EEE7. The system of EEE1, wherein the at least one inception block further comprises a pooling layer.

EEE8. The system of EEE7; wherein the pooling layer comprises an average pooling.

EEE9. The system of EEE1, wherein the at least one representation of an input audio frame comprises a representation of a clean reference input audio frame and a representation of a degraded input audio frame.

EEE10. The system of EEE1, wherein the indication of the audio quality comprises at least one of a mean opinion score, MOS, or a multiple stimuli with hidden reference and anchor, MUSHRA.

EEE11. The system of EEE1, wherein the at least one fully connected layer comprises a feed forward neural network.

EEE12. A method of operating a deep-learning-based system for determining an indication of an audio quality of an input audio frame, wherein the system comprises at least one inception block and at least one fully connected layer, the method comprising:

mapping, by the at least one inception block, at least one representation of the input audio frame into a feature map; and predicting, by the at least one fully connected layer, the indication of the audio quality of the input audio frame based on the feature map.

EEE13. The method of EEE12, wherein the at least one representation of the input audio frame comprises a representation of a clean reference input audio frame and a representation of a degraded input audio frame.

EEE14. The method of EEE12, wherein the indication of the audio quality comprises at least one of a mean opinion score, MOS, or a multiple stimuli with hidden reference and anchor, MUSHRA.

Alternatively, or additionally, there is described as a further enumerated example embodiment a deep-learning-based system for determining an indication of an audio quality of an input audio frame, the system comprising:

at least one inception block configured to receive and process at least one representation of the input audio frame; and at least one fully connected layer configured to determine the indication of the audio quality of the input audio frame based on the output of the at least one inception block.

Alternatively, or additionally, there is described as a further enumerated example embodiment a method of operating a deep-learning-based system for determining an indication of an audio quality of an input audio frame, wherein the system comprises at least one inception block and at least one fully connected layer, the method comprising:

receiving and processing, by the at least one inception block, at least one representation of the input audio frame; and determining, by the at least one fully connected layer, the indication of the audio quality of the input audio frame based on the output of the at least one inception block.

Alternatively, or additionally, there is described as a further enumerated example embodiment a deep-learning-based system for determining an indication of an audio quality of an input audio frame, the system comprising:

at least one processing block configured to receive and process at least one representation of the input audio frame, and to determine and output the indication of the audio quality of the input audio frame.

Alternatively, or additionally, there is described as a further enumerated example embodiment a method of operating a deep-learning-based system for determining an indication of an audio quality of an input audio frame, wherein the system comprises at least one processing block, the method comprising:

receiving and processing at least one representation of the input audio frame; and determining and outputting the indication of the audio quality of the input audio frame.

The invention claimed is:

1. A computer-implemented deep-learning-based system for determining an indication of an audio quality of an input audio frame, the system comprising:

at least one inception block configured to receive at least one representation of an input audio frame that comprises a two-dimensional spectrogram having axes corresponding to time and frequency and to map the at least one representation of the input audio frame into a feature map, wherein the input audio frame is derived from a mono audio signal, and wherein the at least one representation of the input audio frame comprises a representation of a clean reference input audio frame and a representation of a degraded input audio frame; and at least one fully connected layer configured to receive a feature map corresponding to the at least one representation of the input audio frame from the at least one inception block, wherein the at least one fully connected layer is configured to determine the indication of the audio quality of the input audio frame;

wherein the at least one inception block comprises:

a plurality of parallel paths of convolutional layers that operate on the two-dimensional spectrogram, wherein at least one layer of the parallel paths of convolutional layers comprises a horizontal kernel and at least one layer of the parallel paths of convolutional layers comprises a vertical kernel.

2. The system of claim 1, wherein the two-dimensional spectrogram is a gammatone spectrogram.

3. The system of claim 1, wherein the horizontal kernel considers longer temporal timescales of the two-dimensional spectrogram relative to the horizontal kernel, and wherein the vertical kernel considers timbrel features of the two-dimensional spectrogram.

4. The system of claim 1, wherein the system further comprises at least one squeeze-and-excitation, SE, layer.

5. A computer-implemented deep-learning-based system for determining an indication of an audio quality of an input audio frame, the system comprising:

at least one inception block configured to receive at least one representation of an input audio frame and to map the at least one representation of the input audio frame into a feature map, wherein the input audio frame is derived from a stereo audio signal comprising a left channel and a right channel, and wherein the at least one representation of the input audio frame comprises for each of a middle channel, a side channel, a left channel and a right channel a representation of a clean reference input audio frame and a representation of a degraded input audio frame, the middle and side channel corresponding to a sum and a difference of the left and right channels, and wherein the at least one inception block is initialized using one or more weight coefficients associated with a trained model used to process mono audio signals; and at least one fully connected layer configured to receive a feature map corresponding to the at least one representation of the input audio frame from the at least one inception block, wherein the at least one fully connected layer is configured to determine the indication of the audio quality of the input audio frame;

wherein the at least one inception block comprises:

a plurality of parallel paths of convolutional layers, wherein at least one parallel path includes a convolutional layer with an m×n sized kernel, wherein the integer m is different from the integer n.

6. The system of claim 5, wherein the at least one inception block further comprises a path with a pooling layer, wherein the pooling layer comprises an average pooling.

7. The system of claim 5, wherein the system comprises two or more inception blocks and two or more squeeze-and-excitation layers, and wherein the inception blocks and the squeeze-and excitation layers are alternately arranged.

8. The system of claim 5, wherein the indication of the audio quality comprises at least one of a mean opinion score, MOS, and a multiple stimuli with hidden reference and anchor, MUSHRA.

9. The system of claim 5, wherein the at least one representation of the input audio frame corresponds to a gammatone spectrogram with a first axis representing time and a second axis representing frequency.

10. The system of claim 9, wherein the plurality of parallel paths of convolutional layers includes at least one convolution layer with a horizontal kernel and at least one convolutional layer with a vertical kernel.

11. The system of claim 10, wherein the horizontal kernel is an m×n sized kernel with m>n, so that the horizontal kernel is configured to probe temporal dependencies of the input audio frame.

12. The system of claim 10, wherein the vertical kernel is an m×n sized kernel with m<n, so that the vertical kernel is configured to probe timbral dependencies of the input audio frame.

13. The system of claim 5, wherein the system further comprises at least one squeeze-and-excitation, SE, layer.

14. The system of claim 13, wherein the squeeze-and-excitation layer follows a last convolutional layer of the plurality of parallel paths of convolutional layers of the at least one inception block.

15. The system of claim 13, wherein the squeeze-and-excitation layer comprises a convolutional layer, two fully connected layers and sigmoid activation, and, wherein, in the squeeze-and excitation layer, the convolutional layer followed by a scaling operation with the two fully connected layers generates a respective attention weight for each channel of the feature map output by the at least one inception block, and applies said attention weights to the channels of the feature map and performs concatenation of the weighted channels.

16. A method of operating a computer-implemented deep-learning-based system for determining an indication of an audio quality of an input audio frame of a stereo audio signal, wherein the system comprises at least one inception block and at least one fully connected layer, the method including the steps of:

transferring one or more weight coefficients from an inception block associated with determining audio quality of a mono audio signal to the at least one inception block to initialize the at least one inception block for processing of stereo audio signals;

receiving, by the at least one inception block, at least one representation of the input audio frame comprising for each of a middle channel, a side channel, a left channel and a right channel a representation of a clean reference input audio frame and a representation of a degraded input audio frame, the middle and side channel corresponding to a sum and a difference of the left and right channels;

mapping, by the at least one inception block, the at least one representation of the input audio frame into feature maps; and predicting, by the at least one fully connected layer, the indication of the audio quality of the input audio frame based on the feature maps.

17. The method of claim 16, wherein the indication of the audio quality comprises at least one of a mean opinion score, MOS, and a multiple stimuli with hidden reference and anchor, MUSHRA.

18. The method of claim 16, wherein the system further comprises at least one squeeze-and-excitation layer subsequent to the inception block and the method further comprises applying, by the squeeze-and-excitation layer, respective attention weights to the channels of the feature map output by the at least one inception block.

19. The method of claim 16, wherein the at least one inception block comprises a plurality of parallel paths of convolutional layers, and wherein at least one parallel path includes a convolutional layer with an m×n sized kernel, wherein the integer m is different from the integer n.

20. The method of claim 16, wherein the method further includes after transferring the one or more weight coefficients, fine-tuning the transferred one or more weight coefficients associated with the at least one inception block.

* * * * *